US012128583B2

(12) United States Patent
Butler

(10) Patent No.: US 12,128,583 B2
(45) Date of Patent: Oct. 29, 2024

(54) ADDITIVE LAYERING SYSTEMS FOR CAST-CONCRETE WALLS

(71) Applicant: Michael George Butler, Fort Bragg, CA (US)

(72) Inventor: Michael George Butler, Fort Bragg, CA (US)

( * ) Notice: Subject to any disclaimer, the term of this patent is extended or adjusted under 35 U.S.C. 154(b) by 323 days.

(21) Appl. No.: 17/423,867

(22) PCT Filed: Jan. 17, 2020

(86) PCT No.: PCT/US2020/014215
§ 371 (c)(1),
(2) Date: Jul. 17, 2021

(87) PCT Pub. No.: WO2020/150682
PCT Pub. Date: Jul. 23, 2020

(65) Prior Publication Data

US 2022/0088822 A1 Mar. 24, 2022

Related U.S. Application Data

(60) Provisional application No. 62/793,868, filed on Jan. 17, 2019.

(51) Int. Cl.
*B28B 1/16* (2006.01)
*B28B 1/08* (2006.01)
*B28C 7/16* (2006.01)

(52) U.S. Cl.
CPC .................. *B28B 1/16* (2013.01); *B28B 1/08* (2013.01); *B28C 7/163* (2013.01)

(58) Field of Classification Search
CPC .............. B28B 1/08; B28B 1/16; B28C 7/163
See application file for complete search history.

(56) References Cited

U.S. PATENT DOCUMENTS

2017/0101792 A1 * 4/2017 Campbell ............. E04G 21/204

FOREIGN PATENT DOCUMENTS

WO WO-2018130913 A2 * 7/2018 ............ B01F 5/0473

* cited by examiner

*Primary Examiner* — Alison L Hindenlang
*Assistant Examiner* — Virak Nguon
(74) *Attorney, Agent, or Firm* — Larry Williams

(57) ABSTRACT

One aspect of the present invention pertains to methods of forming concrete structures. Another aspect of the present invention pertains to systems for forming concrete structures. Another aspect of the present invention pertains to devices forming concrete structures.

20 Claims, 28 Drawing Sheets top/section side section

TABLE C-C2.2
**Approximate Values of Effective Length Factor, *K***

| | | | | | | |
|---|---|---|---|---|---|---|
| Buckled shape of column is shown by dashed line. | (a) | (b) | (c) | (d) | (e) | (f) |
| Theoretical *K* value | 0.5 | 0.7 | 1.0 | 1.0 | 2.0 | 2.0 |
| Recommended design value when ideal conditions are approximated | 0.65 | 0.80 | 1.2 | 1.0 | 2.10 | 2.0 |
| End condition code | *Rotation fixed and translation fixed*<br>*Rotation free and translation fixed*<br>*Rotation fixed and translation free*<br>*Rotation free and translation free* | | | | | |

FIG 11

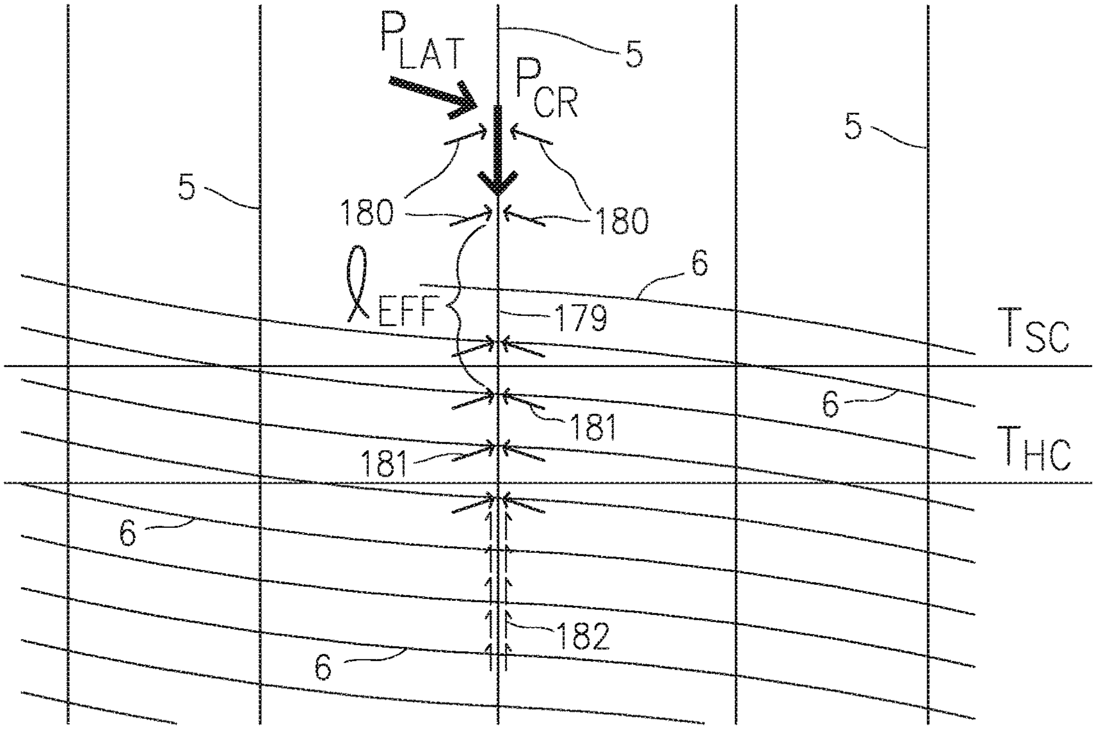

FIG 10

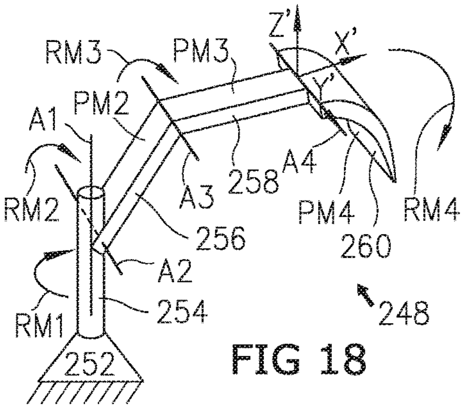
FIG 18
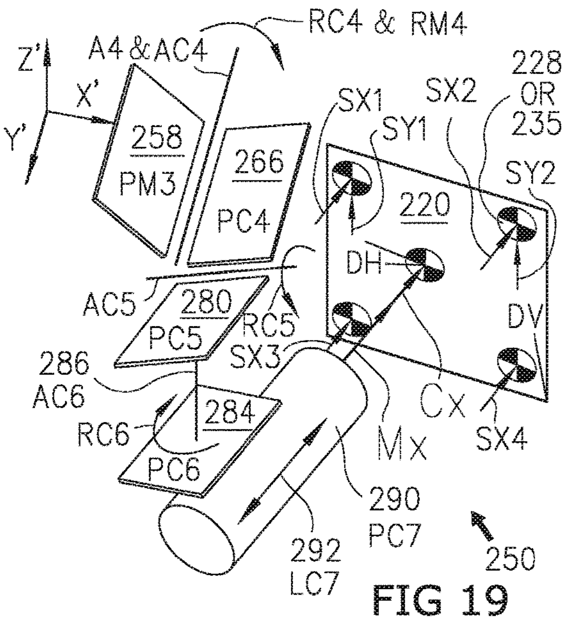
FIG 19
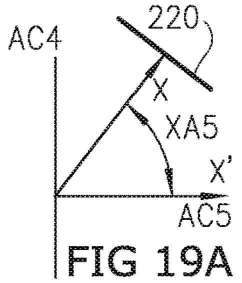
FIG 19A
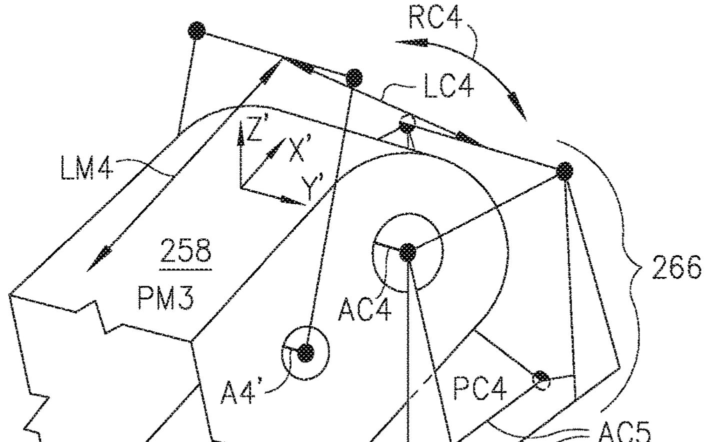
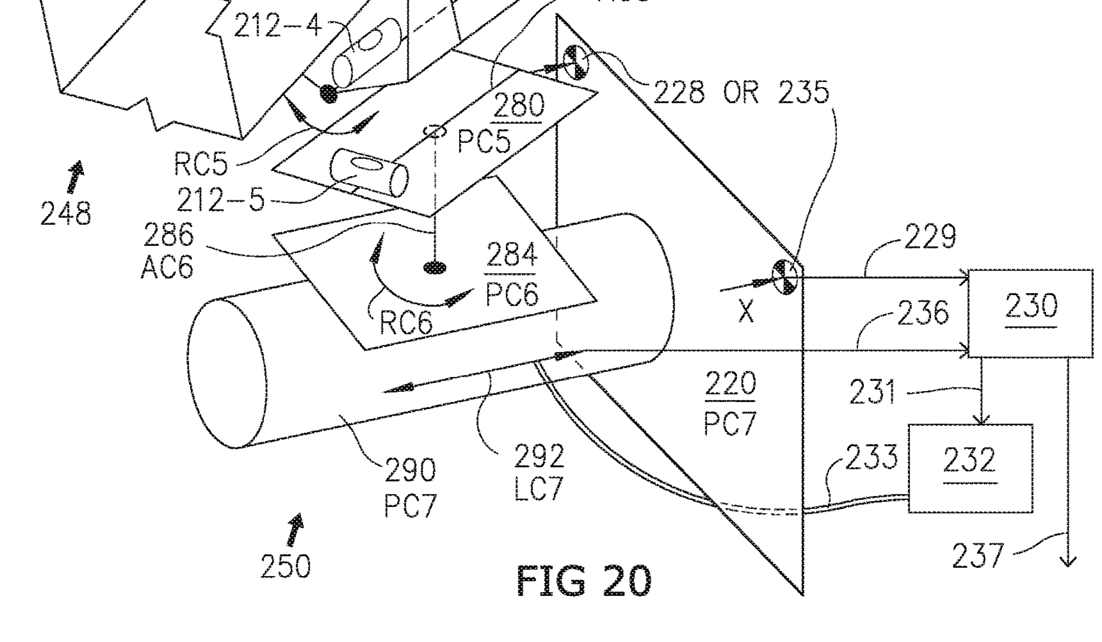
FIG 20

ADDITIVE LAYERING SYSTEMS FOR CAST-CONCRETE WALLS

CROSS-REFERENCE TO RELATED APPLICATIONS

The present application claims benefit of U.S. Patent Application Ser. No. 62/793,868, entitled "ADDITIVE LAYERING SYSTEMS FOR CAST-CONCRETE WALLS," to Michael George BUTLER, filed Jan. 17, 2019 and the present application is related to International Patent Application #PCT/IB2018/000301, entitled "APPARATUSES AND SYSTEMS FOR AND METHODS OF GENERATING AND PLACING ZERO-SLUMP-PUMPABLE CONCRETE," to_Michael Butler, filed on 16 Jan. 2018, U.S. Patent Application Ser. No. 62/446,443, titled "Method and System using a Volumetric Concrete Mixer to Make Zero-Slump-Pumpable Concrete," to Michael George BUTLER, filed Jan. 15, 2017 and U.S. Patent Application Ser. No. 62/446,444, titled "Methods and Devices to Make Zero-Slump-Pumpable Concrete," to Michael George BUTLER, filed Jan. 15, 2017. The contents of all of these applications are incorporated herein in their entirety by this reference for all purposes. All of these patent applications are commonly owned by the inventor, Michael George BUTLER.

BACKGROUND

One or more aspects of the present invention pertain to the technical field of construction. More particularly, one or more aspects of the present invention pertain to the field of structural concrete cast in-situ for walls and such. More particularly the present invention pertains to new devices, systems and methods of cast-concrete construction, where the conventional forming process may not be required.

SUMMARY

One aspect of the present invention pertains to methods of forming concrete structures. Another aspect of the present invention pertains to systems for forming concrete structures. Another aspect of the present invention pertains to devices forming concrete structures.

It is to be understood that the invention is not limited in its application to the details of construction and to the arrangements of the components set forth in the following description. The invention is capable of other embodiments and of being practiced and carried out in various ways. In addition, it is to be understood that the phraseology and terminology employed herein are for the purpose of description and should not be regarded as limiting

BRIEF DESCRIPTION OF THE DRAWINGS

FIG. 10 shows a free body diagram of a rebar support.

FIG. 11 is a table of accepted structural models of column buckling.

FIG. 18 is a diagram of an excavator mechanism manually-controlled motions.

FIG. 19 shows degrees of freedom of motions of an attachment to an excavator.

FIG. 19A shows some geometry for applied corrections to the device controls.

FIG. 20 is a schematic view of a numerically-controlled attachment to an excavator.

Figure 1:
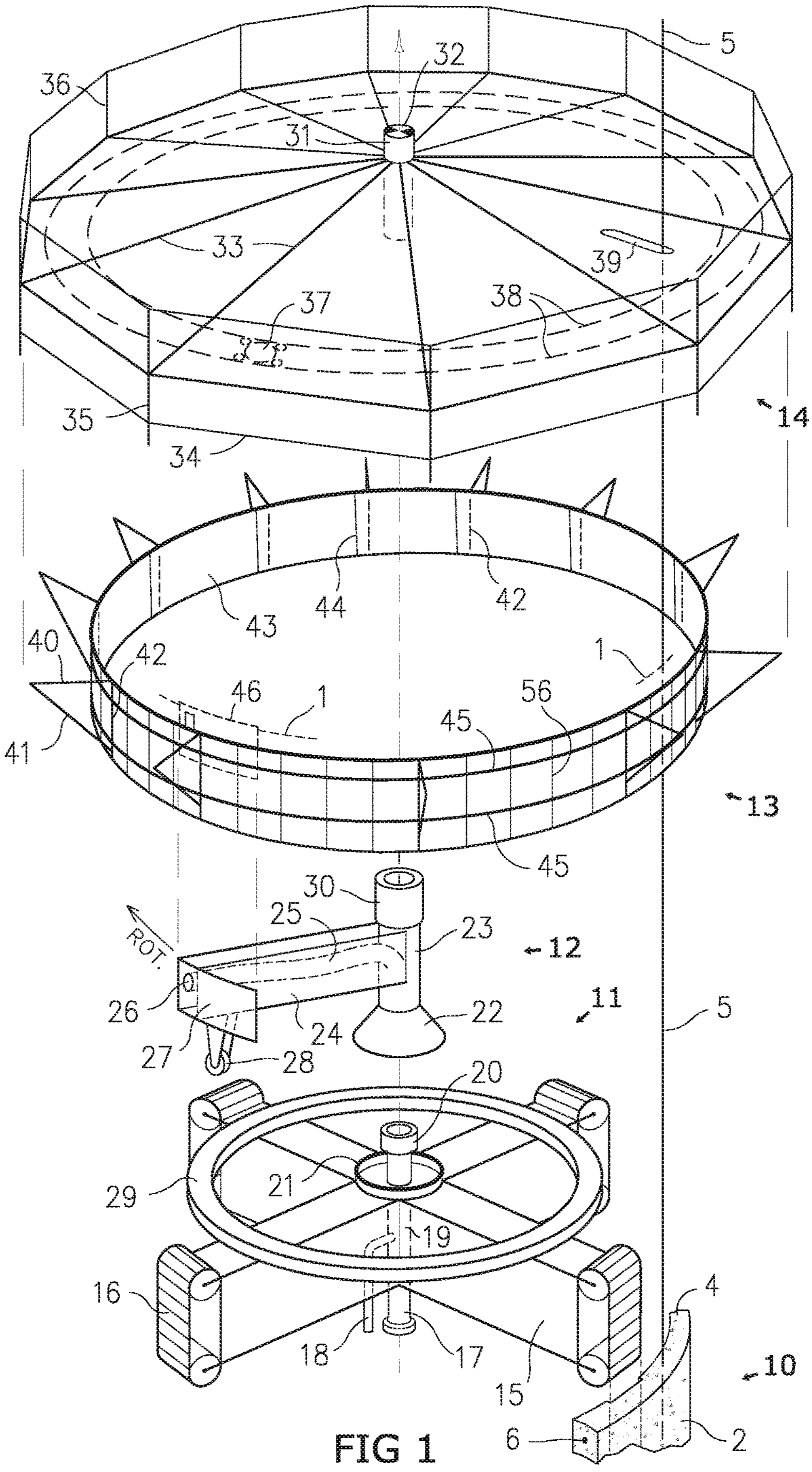
FIG. 1 is an exploded view of a cylindrical-tower casting device.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION

In the following description of the figures, identical reference numerals have been used when designating substantially identical elements or processes that are common to the figures.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

Various embodiments the present invention may include any of the described features, alone or in combination. Other features and/or benefits of this disclosure will be apparent from the following description.

The following patents are hereby incorporated by reference herein, in their entirety, for all purposes: U.S. Pat. Nos. 9,061,940, 9,266,969, 9,260,734, 9,238,591, 9,802,864, 9,643,888, 9,416,051, 9,266,969, 9,056,932, 8,882,907, 7,294,194, 5,753,036, 4,654,085, 8,864,905, 8,828,137, 8,764,273, 8,648,120, 8,491,717, 8,268,927, 6,221,152, 5,175,277, 9,505,658, 9,574,076, 9,199,881, 8,430,957, 8,545,620, 8,349,960, 9,040,609, 9,181,130. These patents disclose information about various inline-injected agents that modify concrete rheology to impart properties of thixopropy, where the at-rest shear strength is sufficient to allow vertical stacking of the concrete, with extreme shear thinning, so allowing pumping and then subsequent manipulation of the zero-slump mix. The term "concrete" as used herein indicates that beneficial cost-saving coarse aggregates can be used with this additive layering process, but they are not necessary. Most any cementitious mix of proper proportions, such as mortar, grout, etc, functions perfectly well with this process. Non-cement mixes, such as geopolymers can also function well, as they are effectively two-part-reactive mixes. Success with geopolymers depends upon the given geopolymer formulation, its ability to intermix the two parts inline, the set rate, etc. These formulations and proportions vary greatly, and many are proprietary, so the inline mixing conditions required would be tailored specifically for a given geopolymer.

It is to be understood that this invention is not limited in its application to the details of construction and to the arrangements of the components set forth in the following description. The invention is capable of other embodiments and of being practiced and carried out in various ways. In addition, it is to be understood that the phraseology and terminology employed herein are for the purpose of description and should not be regarded as limiting.

One or more embodiments of the present invention employ the use of automatic geometry control systems, to varying degrees, as a means to create the geometry of a cast-in-situ concrete structure, by several variations additive layering. Different types of onsite control signals can be utilized for the geometry controls, including gravity. These systems are able to create structures of conventional concrete with conventional reinforcing and to satisfy present conventional concrete building codes, but they avoid both the very expensive conventional concrete forming process, and the high cost and low production rate of present robotic construction systems. These systems do not require the creation of a digital model, nor the robotic systems that follow that digital model. Large robotic systems, meant for additive manufacturing with cementitious mixes for multistory buildings, can presently be found online at prices up to $5,000,000.00 US. The present systems can avoid these high costs of robotics, and the work can proceed at orders of magnitude faster.

All embodiments of the present invention allow the use of conventional plant-batched concrete, delivered to a jobsite by conventional mixing trucks etc, at a small fraction of the cost of the specialized and highly expensive cementitious mixes that are required for other "concrete" additive manufacturing processes. And, those mixes have to be batched onsite immediately prior to pumping, because of the need to maintain enough "open time" for pumping such a fast-setting mix is crucial. The onsite mixing process creates a health hazard from the generation of dusts, and requires extra labor, and presents a barrier to the "concrete" placement rate. The additive layering process allows for an effectively unlimited open time, as cement retarders are not a hindrance to the process, and the concrete is injected near to the discharge with a countering accelerator. The additive layering concrete placement and stack rate is many times over that of other "concrete" additive manufacturing methods.

An embodiment of the present invention provides for the construction of cylindrical towers of various diameters and wall thicknesses, and having taper of either or both. This can be for the construction of windmill towers, exhaust stacks, grain elevators and silos, etc; and most any types of reinforcing element can be straight-forwardly employed with this construction of these structures, and in all cases with integral reinforcing members of any length. Importantly this allows conventional engineering methods to be utilized for structural design, and existing building codes can be followed. Structures built with these methods allow the normal low cost construction materials and conventions to be followed.

Various configurations of the device for constructing these towers is automated, self-propelled, self-guided, and provides its own shelter, as it steadily progresses up the tower being built. This method is particularly well suited to relatively smaller diameter cylindrical towers, where available working space is minimal, and the lift rate needs to be very rapid. Importantly, these methods allow concrete towers to be constructed without assistance from a tower crane or the like; that is, these methods can allow all aspects of the concrete placement to proceed without the expense of a crane to be onsite even once.

Compared to conventional slip-forming, and continuous slip-forming, the vertical rate of progress with this method can be orders of magnitude faster, limited only by the rate of the concrete pump. This system is a fraction of the weight and so presents a fraction of the temporary load to be carried, so variations of it can even use the vertical reinforcing bars as a means of for support of the construction platform. Whether the temporary support is by conventional rods or reinforcing bars, a device for the articulation and translation of those support points where the tower is tapered and therefore the bar or rod providing support is not vertical; and where this device allows the means of support from the bar or rod to be below it.

Other embodiments of this invention provide for the construction of planar concrete walls also without the need to construct forms. Some of these methods include systems of motion corrections to these new concrete placement devices, where the arm of an excavator, a concrete boom truck, or even a robot, etc, is utilized to move the device close enough in position, and transverse to a proposed wall, so that the device systems can make final articulations and planar corrections, to create a finished concrete wall at a defined plane, without a need for robotics. Or where robotics are employed, the motion corrections with these onsite control systems, can add necessary axes to the robot for definition of finished concrete surfaces, and can adjust that digital model to fit real world onsite conditions—such as existing foundations, adjacent walls, etc.

For assurance of concrete consolidation with these placement methods using a mechanical arm, various concrete vibrating systems are disclosed. A conventional electric vibrator, or a specialized unit, can be used with these various devices that insert and retract the vibrator remotely, and concrete placement progresses.

The methods of in-situ concrete wall construction disclosed include the use of a lifting platform for guiding, and even defining, the concrete placement, for applications such as walls, elevator shafts, and even placement of full-thickness stucco. These additive layering methods have the benefit of creating a useful flat finished concrete surface, opposed to additive manufacturing without an articulating active-non-stick screeding surface, where instead a turbulent, less useful, and hard-to-clean surface remains. The active-non-stick surface technology that allows this creation of the flat smooth surface, disclosed previously, is improved here.

Various embodiments of the present invention may include any of the described features, alone or in combination. Other features and/or benefits of this disclosure will be apparent from the following description. The order of execution or performance of the operations or the processes in embodiments of the invention illustrated and described herein is not essential, unless otherwise specified. That is, the operations or the processes may be performed in any order, unless otherwise specified, and embodiments of the invention may include additional or fewer operations or processes than those disclosed herein. For example, it is contemplated that executing or performing a particular operation or process before, simultaneously with, contemporaneously with, or after another operation or process is within the scope of aspects of the invention.

For the following defined terms, these definitions shall be applied, unless a different definition is given in the claims or elsewhere in this specification. All numeric values are herein defined as being modified by the term "about," whether or not explicitly indicated. The term "about" generally refers to a range of numbers that a person of ordinary skill in the art would consider equivalent to the stated value to produce substantially the same properties, function, result, etc. A numerical range indicated by a low value and a high value is defined to include all numbers subsumed within the numerical range and all subranges subsumed within the numerical range. As an example, the range 10 to 15 includes, but is not limited to, 10, 10.1, 10.47, 11, 11.75 to 12.2, 12.5, 13 to 13.8, 14, 14.025, and 15.

The various elements of any of these devices disclosed herein can advantageously be combined with other devices in many different permutations. Generally, for the present disclosure, only a single example of each feature may be given, and any of the other combinations of the features is not also shown, as it is typically apparent that these other combinations of the features can be made by persons of ordinary skill in the art in view of the present specification.

FIG. 1

Reference is now made to FIG. 1 where there is shown a device, according to one embodiment of the present invention, for construction of a cylindrical tower of concrete in-situ. This cylindrical tower casting device is comprised of four primary elements, a crawling frame 11, a rotor screed 12, a slip form assembly 13, and a canopy structure 14. All of these elements work together to create a tower wall 10 by additive construction means to cast in-situ concrete. The crawling frame supports the entire device via indentations it makes into the fresh concrete, and moves the device up the tower as the concrete casting process requires. Other embodiments disclose other novel methods of device support and lifting. The rotor screed 12 rotates about the center of frame 11 to place concrete and define the interior surface of that cylindrical wall 10.

The slip form assembly 13 defines an outer finished surface of concrete 2. It is pulled from above by the canopy structure 14. Canopy structure 14 provides shelter from weather for the entire device, a working surface, support of various reinforcing placement means, and guidance for the additive layering process. A length of a vertical reinforcing bar 5 is cast into wall 10 and is extended to show the avoidance of interference with all the elements of this device, for reinforcement bars 5 of any length. Also a tension cable 6 is shown cast into the wall 10. Cable 6 can be conventional spiral or hoop reinforcement of conventional reinforcing bar or other material suitable for reinforcing concrete, or of the unspooled cable disclosed below. In any case, interference with prepositioned or simultaneously-place horizontal or vertical reinforcement is avoided with this device. And of course having continuous reinforcement cast within concrete structures is always preferable, as that is the way that concrete construction is performed with any other option may be available; any other arrangement, such as no continuous reinforcement or reinforcement external to the concrete, is a structurally deficient compromise.

All of these elements require an operational guidance signal. This signal can be provided by at a GPS/GNSS guidance system such as is utilized for GPS-guided concrete placements of highway barriers, etc., with a GPS roving transponder 32 at the top of a canopy mast 31. Alternatively the guidance signal can be provided by, or shared by, gravity systems, laser systems, inertial systems, etc. The crawling frame 11 is steered upward by GPS 32 or the equivalent, which can alternatively be an electronic 2-way level such as is utilized with rotating laser levels, or a 3-axis accelerometer. A combination of the types of devices can assist with telemetry of the system.

The crawling frame 11 has a number of a crawler track 16 to hold vertical position and move upward in a controlled manner as concrete placement allows. The upper portion of each track 16 is close enough to concrete placement that the track treads make an impression in the still-plastic concrete, and the bottom portion of each track 16 is then provided effective traction in the hardened concrete, making the vertical climb, or even beyond vertical as possible. Electronic control signals, based on positional information received, adjust each track relatively up or down to steer the system up along the projected tower location.

Each track 16 is preferably relatively longer in vertical dimension than depicted, for fast concrete placement rates, to allow the lower portion of track support to be in more-hardened concrete, as necessary for the total weight of the device. These drawings were compressed for fit on the pages. If the casting process needs to stop, the tracks should still be run up at the rate required to create the necessary impression while that concrete is still soft enough, and then run back downward for restarting the pumping process, or track impressions to be made by other means, as these track impressions are entirely necessary for supporting the imposed loads. Utilizing only normal/frictional forces on still-unhardened concrete to lift this device would cause failure to the tower wall from the normal force required for traction, without the tread impressions.

Crawling frame 11 spans across the tower opening with at least two of a box truss 15. Each box truss 15 is fabricated of lightweight tube-steel or the like to maximize strength and stiffness while minimizing weight. Each is logically made of a pair of planar trusses with sufficient stabilizing connecting elements to stabilize the top and bottom chords. Centered at the bottom of crawling frame 11 is a concrete pump line 17, where the concrete pump line attaches with a normal HD connection. As the tower construction advances, the significant weight of the concrete pump line will need to be supported. The majority of the pump line weight can be supported by cables etc attached to the tower, or by lengths of solid pipe attached to the tower, so that crawler 11 need only support the last length of hose. A means of lifting the pump line with the tower casting progress is disclosed in FIGS. 6 and 7.

An admixture line 18 is also at the bottom of crawler 13. This is for the line of pumped thickening/accelerating admixture, termed "liquid mixture" in patent application PCT/IB2018/000301 by this same inventor, that is injected into the concrete pump line at an inline mixer 19, and line 18 preferably includes a check valve to prevent backflow of cement paste. This allows conventional concrete to be pumped up the tower to then be converted into a thick and rapid-setting additive manufacturing type of mix, near to the point of discharge. Pumping concrete up significant vertical distances is very difficult because of the great material weight and accumulated friction. For a concrete mix that can hold a vertical shape immediately after placement, this extensive vertical pumping would be impractical or likely impossible, except that this method achieves the thickening and accelerating of the concrete at the top of the pumping line, with use of the injection point at the inline mixer 19. This allows a wet and relatively very fluid—and also hydration retarded—concrete to be pumped to the top where it is then thickened and accelerated as required to hold a vertical shape just as placed.

If normal concrete is pumped at a rate of at least 20 cubic yards per hour, where the tower bottom portion may be 20 feet in diameter with a wall thickness of 12", this calculates to a climb rate of at least 8.6 feet per hour, and allows concrete trucks to be emptied within acceptable times, at 2 trucks per hour. Common concrete pump and hose systems that are capable of 1100 psi or so, will not be able to continue pumping at that rate where the tower is approaching a few hundred feet high. At over 200+ feet of pumping height, an 1100 psi system may tend to slow to a rate as low as a few cubic yards per hour, depending on aggregates and mix design, etc. At this point, given a tower diameter of 15 feet and a wall thickness of 8", a pump rate as low as 3 cubic yards per hour calculates to a climb rate of 2.6 feet per hour; and so about 1 truck per 3.33 hours. This slower rate can be overcome with use of a higher pressure system that can maintain at least 10 cubic yards per hour at that height, and so a climb rate of over 8 feet per hour at that condition can be maintained, and 1 truck per hour turnaround. The higher pressure system is more specialized and therefore expensive, but such a system would be preferable for taller towers.

It is interesting that concrete pumping technology itself is more of a limiting factor to concrete tower casting rate, than is the novel additive layering methods disclosed herein and previously. Our testing has proven wall climb rates as high as 50 feet per hour with this method, where the climb rate is based on concrete rheology with the inline injection of the admixture disclosed. Concrete pumps don't go that fast.

The concrete pump line continues to a swivel coupling 20 that connects to the inlet of the rotating pump line 25. Swivel coupling 20 is the same type hardware utilized with booms for placement of concrete. It must be centered in crawler as the corresponding inlet at rotor 12 must also be, so that rotational action does not hinder concrete pumping. Inline mixer 19 can alternatively locate along a rotating pump line 25 to be closer to the point of discharge, but this complicates the plumbing line for the admixture because of the rotating action of the rotor screed 12; in this case, the admix needs to be supplied from above. Crawler 11 provides support and guidance for rotor 12 by means of a bearing raceway 21 and a rotor track 29.

Rotor screed 12 is receives all support and guidance, and in turn supports both slip form assembly 13 and canopy 14, only by means of a bearing array 22 and a support wheel 29. For this reason, bearing array 22 must be very heavy-duty. It is an array of many separate heavy-duty bearing assemblies, but is shown as a simple cone because of drawing scale. The diameter of array 22 and race 21 must be sufficient for both the vertical loads, and potential differential and lateral loads, imposed by the slip form assembly 13 and canopy 14 of a given device. The very low friction imposed by a special surface technology of the slip form assembly 13 makes this mechanism possible, but there will still be varied frictional forces, this can combine with potential wind load on the canopy, so each element of the bearing array must be designed for the resulting compression and tension forces. As the rotor screed 12 rotates at a relatively very slow rate, the bearings can be highly loaded with little risk of overheating.

The bearing array connects a heavy riser 23 to a rotor truss 24 and a bearing assembly 30. The rotor truss 24 serves to support the rotating pump line 25 that runs out to an outlet 26, and a curved screed 27. Rotor truss is similar to each box truss 15 but can be much lighter, because of much lighter loads and having support by wheel 28. Screed 27 is of the special non-stick surface, and has most of that surface area both behind the rotational movement of rotor 12, and below the outlet 26, where just-placed concrete is more likely to need temporary support—particularly if any vibrational action is utilized. Bearing assembly 30 is necessarily substantial for reasons cited for bearing array 22.

The slip form assembly 13 is comprised of several of an individual slip form 43. These slip forms 43 each have a suitable amount of curvature to match the cylindrical tower, and can overlap where they join. In this case, each overlapping edge 44 will make a visible step in the finished surface 2 of the concrete, but the overlap allows for adjustment in tower outside diameter. In this case, each edge 44 should be slightly sloped in the direction that prevents it from binding in concrete as the assembly is raised. Near each overlap is a spine member 42 that connects to an adjustable strut 40 and an adjustable strut 41. The geometry of these struts can vary from that shown, per subsequent figures for example. These struts serve to connect slip forms to canopy 14 at locations outside of reinforcement placing mechanisms, disclosed below.

Radial pressure on slip form assembly is addressed by at least two of a threaded band 45, which is threaded at least at one end for purposed of connecting and adjustment. This resulting hoop force is presented against a series of a fixed stave that spread that force over a greater height of each slip form 43. The interior surface of concrete 1 as defined by slip form is shown dashed where the relative position of rotary screed 46 is shown. Similarly, that surface 1 is shown relative to the shown preplaced reinforcing bar 5.

The canopy structure 14 is supported at the center by bearing assembly 30, which needs to rotate while canopy 14 does not, while canopy supports slip form assembly 13 about its perimeter. Each canopy frame member 33 utilizes a strut from below to make the cantilever span to the outside edge. Each of a vertical member 35 connects the corresponding member 33 to the corresponding strut 40, 41 of the slip form assembly 13. Canopy structure 14 also supports a set of a raceway channel 38 that serve to guide a spool shuttle 38. This is for simultaneous spiraling of cable about the vertical reinforcing elements, providing an efficient means of helical reinforcement.

Utility, communication and material supply lines as may be required to reach canopy 14 can run outside of the tower wall 10 to avoid interference with rotor 12. Canopy 14 can be an entirely flat working surface, with access from the inside or outside the tower.

Figure 2A:
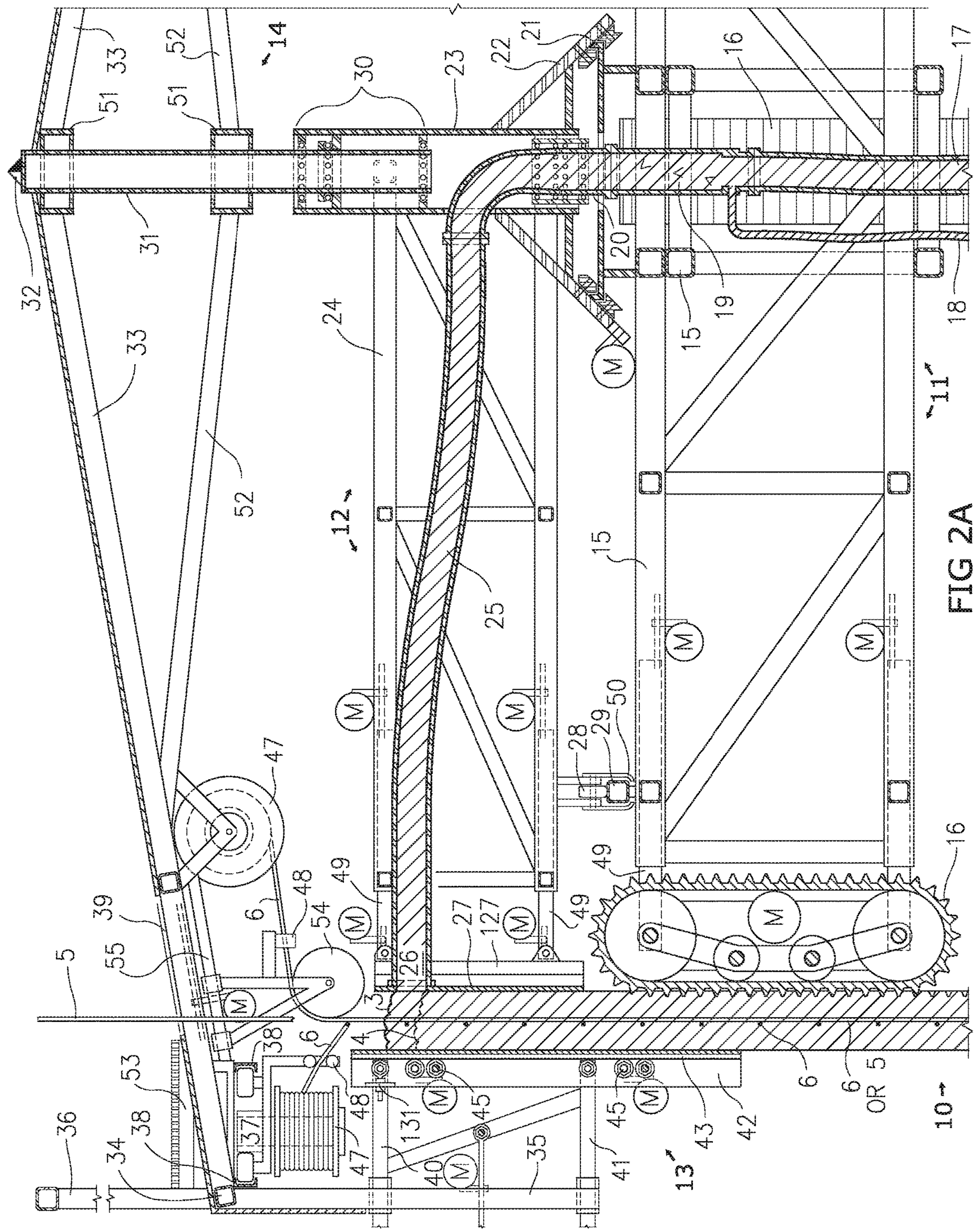
FIG. 2A is a section view of a cylindrical-tower casting device.
Figure 2B:
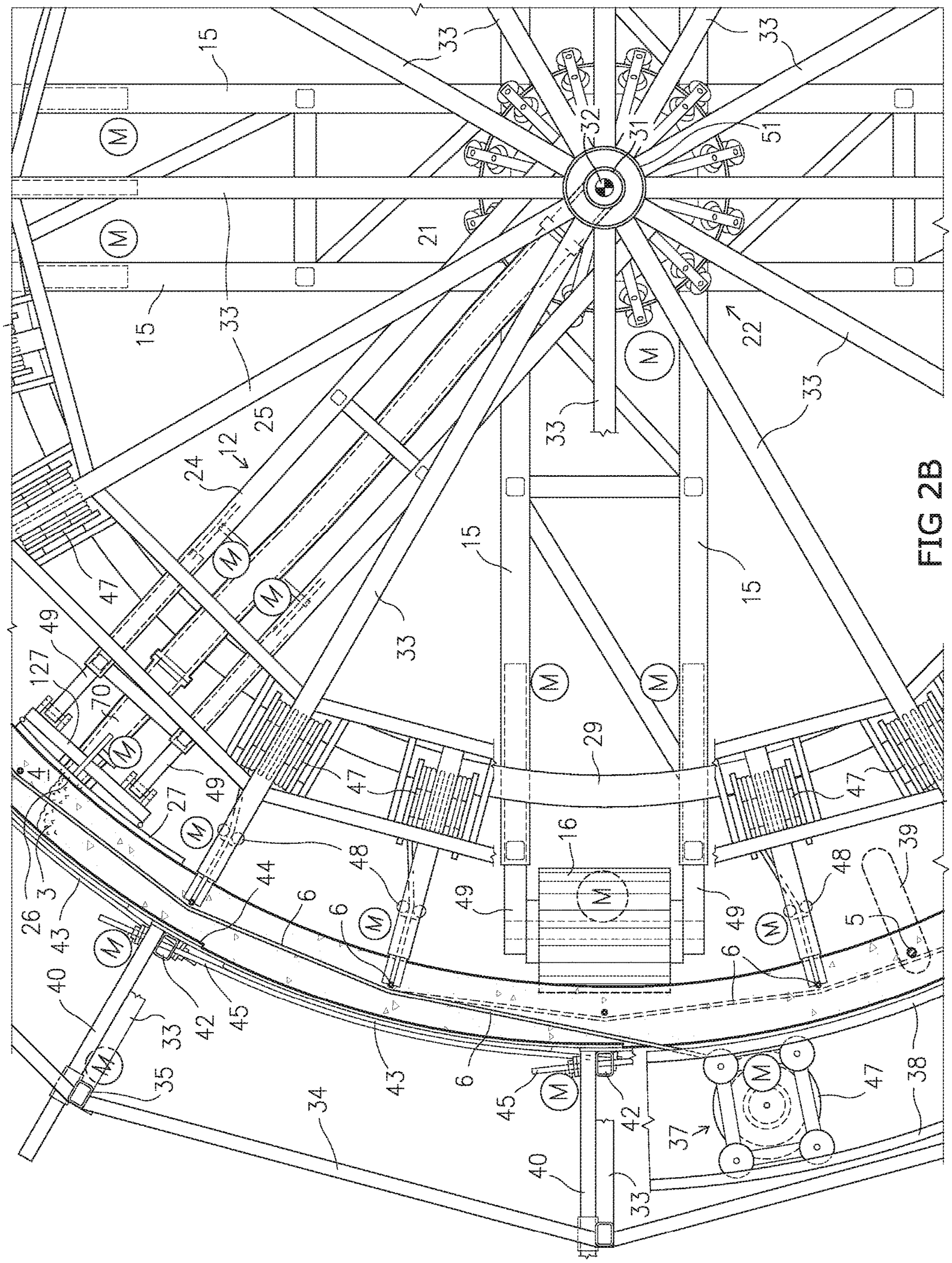
FIG. 2B is a top view of a cylindrical-tower casting device.

FIGS. 2A and 2B

FIG. 2A is a section view, and FIG. 2B is a top view (with the canopy cover removed), both showing more detail of the elements of the device. FIG. 2B shows the rotator screed moving clockwise and the spool shuttle moving counterclockwise. Each rotating counter to the other prevents the canopy 14 from rotating; the cable 6 can be utilized to prevent counter rotation from driving force on the rotor 12. Much of the increased detail is related to the components required to allow adjustments in the diameter and wall thickness of the cylinder being cast, allowing taper of the tower diameter and wall thickness to optimally suit design loads. These components are adjusted with servo motors or stepper motors, designated with the symbol "M" in the drawing figures. These can be inverter-driven 3-phase motors where a processor receiving signals from GPS guidance delivers a low-voltage control to the inverter. These can be hydraulically-driven motors with positional feedback control. The amount and rate of adjustment are both very low in most cases, so electric motors should be geared down very significantly to generate sufficient force, or any of them can be hydraulically powered. The starting positions are indexed and checked at the beginning of a job. The subsequent adjustment systems are positionally controlled electronically by a processor linked to the GPS guidance 32, or the like, and any supplementary guidance systems, such as near the each of each box truss 15, and supplementary leveling equipment, as appropriate. There are exceptions to this, such as the control of vertical movement and the rotation of the rotor 12 that are linked to the rate of concrete placement. This rate of progress then controls the other height-related aspects of the tower geometry, such as tower diameter and wall thickness.

With a linear taper, for a given height the tower will have a given diameter and wall thickness based on a linear formula, with the diameter (and wall thickness) inversely proportional to the tower height. The positions of all these adjustments can be determined solely by that present height of the tower under construction. For linear tapers, the exception to this rule is making directional corrections as the tower progresses, for possible variations in concrete hardness etc where the tracks make contact, slippage of any driving equipment, interruptions of the casting process, and wind loads on the canopy structure. Telemetry of the tower progress is constantly monitored and any corrections to path are preferably made immediately while the amount of correction is minimal and so do not significantly increase slip forming or screeding forces.

For example, a tower in question, or a portion of a tower having a concrete bottom portion and steel top portion, may be of a diameter of 25 feet at the bottom and 15 feet at the top (of the concrete portion). In this case each box truss 15 end would need to adjust by 5 feet during that casting process, and the rotor screed 12 and components guiding vertical reinforcement would both need to adjust correspondingly; and the slip form assembly, if of twelve modules, would then need to each shorten by about 2.6 feet of circumference. Taper of wall thickness is similar in adjustment of these components, but at a smaller scale. It is essential that tower taper be anticipated, in that these geometry-defining surfaces have the taper "dialed" into them at the outset, in that the top and bottom portions would be of different diameters corresponding to the taper. It is not expected that one can force a taper onto rapid-setting concrete by changing the path of the geometry-defining surfaces significantly toward that concrete. The taper geometry makes the slipping action on the concrete easier to do. For assurance of success, the device is preferably kept as lightweight as practical, and this means keeping the slip forming and screeding forces as minimal as possible. This slip forming is so short term, it is really a process of geometry definition, and acts as a confinement surface for placing concrete as it is initially consolidated. Vibrational attachments for this purpose are disclosed below.

The crawling frame 11 has each of the box trusses terminating at an adjustable end, where each steel tube chord of the truss inserted with an adjustable extension 49, which is of a length of steel tube corresponding to the inside diameter of the each truss chord, allowing for fit of bearing surfaces of Teflon or Delrin or the equal. Overlap of extension 49 with chord must be substantial and with the bearing surfaces separated as possible because this device carries all the device weight and slip form friction. If there are two box trusses 15 spanning the tower, such as this example with one with set of steel tube chords just below the perpendicular set, each end would have four of the adjustable extension 49, making a total of 16 of these sharing the total load. The motors adjusting these extensions can be stepper or servo or hydraulically powered.

Each extension 49 corresponds to an end of each primary axle of each crawler track 16. The upper ones are close to the curved screed 27, so that the upper treads of the track reach concrete that is still soft. The lower extension 49 and corresponding tread should be relatively lower than depicted—the tracks 16 should be longer—to be assured that at faster concrete deposition rates the concrete is hardened enough to support the device. This dimension is relatively compressed in the drawing figure in order to fit on the sheet. The adjustment of the extensions at the bottom of track have an exception to position solely in relation to GPS or other indication of tower height, in that load cell controllers should override that setting—if the side load should ever become insufficient to make sure the tracks always have sufficient engagement in their impressions to support the device. Track 16 can be one of many of those commercial available for crawling excavators, etc, suitable for the loads in question. The motor driving each track is very highly loaded, and so is appropriately hydraulically powered or geared if a stepper motor.

The plumbing is shown more clearly on FIG. 2B. HD flange couplings are shown, but the connecting clamps are not. The concrete pump line 17 can connect directly to the inline mixer 19, as does the admixture line 18. The inline mixer 19 can connect directly to the swivel coupling 2, which must be concentric with the bearing raceway 21. A 90 degree elbow can exit the confines of the heavy riser 23 above the bearing array 22. The rotating pump line 25 must allow for a change in length according to the change in tower inside radius. As the pumping pressure is lowest at this point in the entire pumping line, a hose can be lighter and more flexible than traditional concrete pump hose so allowing sufficient change in length. A set of pipe segments with elbow swivel fittings, such as are part of concrete boom trucks, is an alternative means to this end. A sealed-sliding connection at a length of pipe is another alternative to allowing the required change in length.

Rotor screed 12 also has adjustable extensions 49. These have much lighter loads than do the ones of crawler 11 and so can be much lighter duty. The position of extension adjustment is related directly to tower height. The rotor track 29 can be supplemented by an uplift bearing 50 to help with any wind uplift loads on canopy 14. Rotor rotation can be controlled by a motor or motors driving one or some of the wheels that seat to raceway.

The slip form assembly 13 has the option of positioning each slip form with direct horizontal adjustment at each spine member 42. In this example the slip form 43 is of material heavy enough that the staves 57 (shown in FIG. 1) are not required. In this case adjustable struts 40 and 41 are part of a braced frame attached to spine 42, and both move simultaneously with a motor attached to vertical member 35. Taper is addressed with a taper adjustment 131, which can be manually adjusted in advance for a given job. This method would be also suitable for the curved screed. Alternatively strut 40 and strut 41 could each have their own server motor. It should be noted that this adjustment system is not for the temporary slip form pressure, it is for positioning elements of the slip form assembly 13. The temporary concrete pressure force is taken by each of threaded band 45. More disclosure on the slip form assembly follows.

Figure 3:
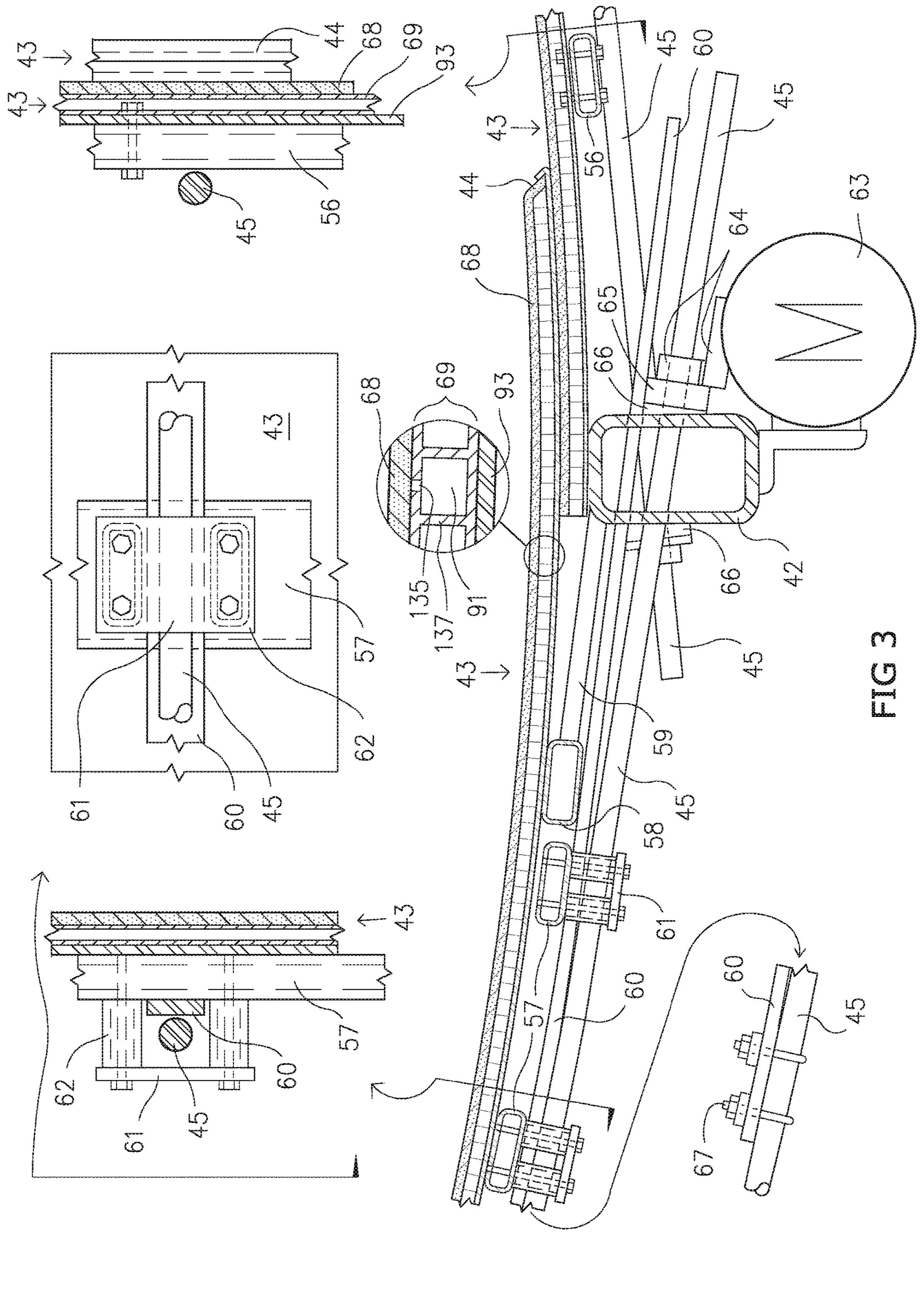
FIG. 3 shows detail of an adjustable cylinder slip-form system.
Figure 4:
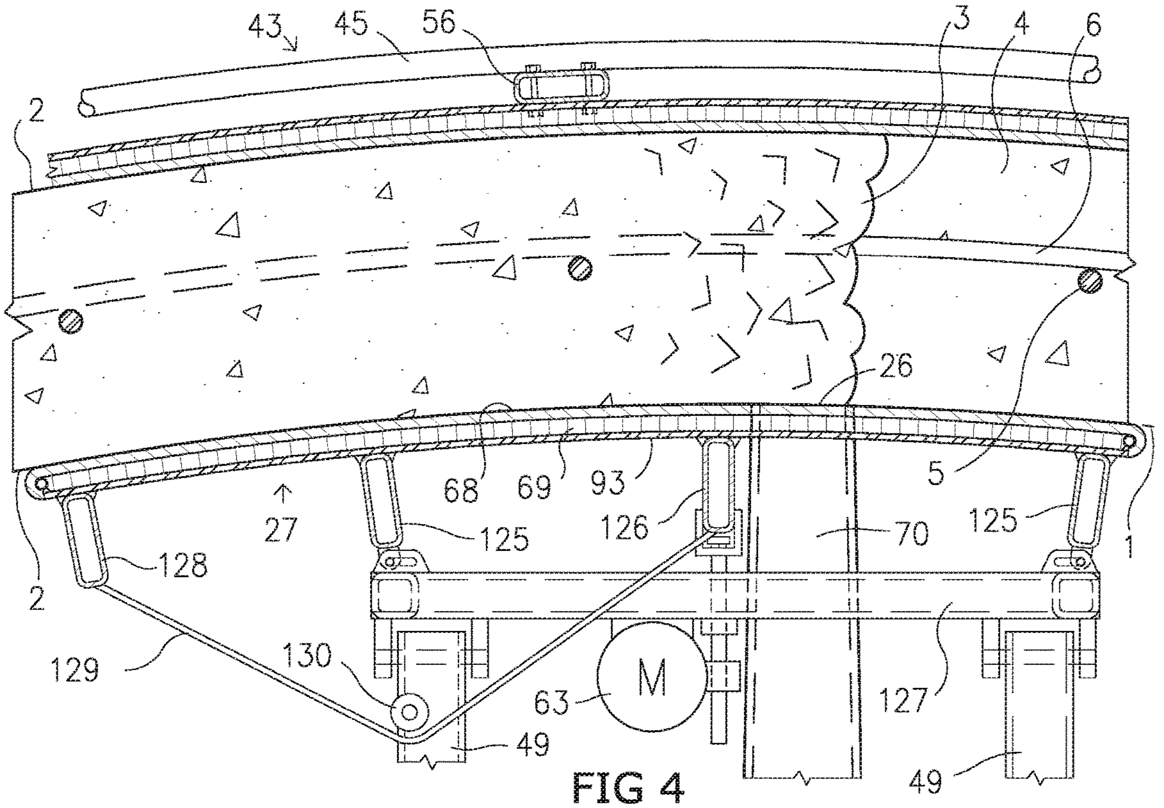
FIG. 4 is a top-section view of an adjustable curved rotating screed system.

Canopy structure is also utilized for positioning reinforcing elements. Spiral or hoop reinforcement, which can be a length of tension cable 6, or of a post-tension tendon, or lengths of conventional reinforcing bar that is pre-curved to the proper radius. In any case, spiral or hoop reinforcement is importantly placed outside of vertical reinforcement, as this is where a tension element provides benefit for cylindrical structures, so each raceway channel 38 is positioned outside of wall location for all tower diameters. For the example shown, a cable spool 47 is attached to the spool shuttle 37, with a cable unspooling assembly 48 suitable for the cable utilized. This can be 7×7 stay cable as is utilized for bracing power poles, etc; or it can be #2 rebar that is normally in spooled form; or it can be high-strength cable as utilized for post-tension reinforcing; or it can be synthetic cord such as carbon fiber, optionally resin-dipped as unspooled. The spool diameter may have to be much larger than shown; the drawing figure is compressed for fit on a sheet of paper. The helical wrapping process does not have to adjust diameter as the tower tapers; the point of contact with the vertical reinforcing changes with diameter. The resulting helical reinforcement can be of a pitch to suit structural requirements, so for example be set at 3" o.c. at the tower bottom and open up the spacing as suitable, moving up the tower. As the spooling process is independent of the concrete placement, empty spool replacements can be made while the concrete placement remains uninterrupted. Wire splices can be made with cable clamps as required, etc. For clarity, the spiral reinforcement is shown in FIG. 3 to be very flexible material that easily bends about each vertical reinforcement member, running straight between them. This spiral reinforcement can be a conventional helix of constant curve, as shown in FIG. 5.

Where unspooled vertical reinforcement is more cost-effective in saving labor, that reinforcing must be aligned with wall position. An alignment pulley 54 is adjusted along an alignment track 55 according to tapered tower height. The cable unspooling assembly 48 is shown attached to this device, but that can vary. This spool 47 is attached to a canopy strut 52, or a frame member or sub frame member as required. Where conventional reinforcing bars are preferred, these can be placed form above though a slot 39 in the canopy sheathing. The slot shape is to allow for the tower taper. That portion of the canopy, where reinforcing bar will project, can be essentially open with grate bar elements running radially for worker safety.

The connection of all canopy struts and frame members to mast 31 is shown with a weld hub 51 to simplify fabrication efforts. To allow dismantling of the canopy, these strut connections can all bolt to the hub. During normal operation, the canopy structure provides a safety function in that it extends beyond the periphery of the tower walls, and so will prevent a possible catastrophic free fall should the crawler tracks 16 somehow fail their grip. The connecting elements of the device, such as the bearing array 22 and the bearing assembly 30, are made for this load reversal. Upon completion of a tower, those extensive canopy members of the canopy can be made to disassemble in place, so that the entire device can back down the tower using the tracks with their treads in the grooves formed by the upward trip. During such downward movement the safety normally provided by the canopy is removed, and so should be replaced by a cable system attached to anchorages at the top of the tower, or the like. For windmill tower construction or other projects needing a crane to set large equipment onto the tower, that same crane can be used to remove this device.

FIG. 3

This is a sectional view of the overlapping portion of two slip forms 43, looking downward, with some enlarged details. This drawing omits the supporting struts for clarity, as the purpose is to show the overlap adjustment. Each curved screed 43 has at least two of the threaded band 45, each is a length of threaded rod, serving to maintain hoop force of the circumference of the entire assembly. The band 45 adjustment is accomplished by a motor 63 driving a worm tensioner 64 that tensions or loosens band 45 relative to thrust bearing 65 hillside washer 66, both connected to spine member 42 which is securely welded at the edge of the slip form 43, in this case. To prevent galling of threads that must run though this adjustment assembly, a protection band 60 is employed over this length of threaded band 45. The protection band 60 moves with threaded band during length adjustment so that the threads do not have to rub across any surface. Their mutual connection is made with some of a cable clamp 67 or the like.

Each fixed stave 57 is attached to the slip form with nuts welded to the inside surface of a backing plate 93, that is a piece of steel plate, ⅛" thick, or the like. As the slip form assembly 13 circumference reduces, there will be interference with some of the fixed staves 56, so that where it is required, a floating stave 57 is used instead. The floating stave 57 is not attached to the slip form; it is just kept from falling away by a combination of two of a keeper plate 61 and four of a spacer block 62 that encompass the top and bottom bands. Floating staves 57 are located at the necessary spacing at the start of a project, and as the circumference decreases, they either stay in place or move or slide closer together—either way is fine. There is at least one of an alignment stave 58, which is thicker than the other staves, to allow for the thickness of the adjacent overlapped slip form, in aligning both bands to go through the spine 42. The alignment stave 58 has at least two of a welded strut 59, to keep stave 58 in place, and keep the floating staves 57 away from the adjacent slip form 43 and threaded band 45. The holes in the spine 42 for the bands are generous in size, to avoid damage to the threads. This circumference adjustment relates to the height of a tapered tower.

Each slip form panel is made of three layers. The forming surface is a permeable non-stick cladding 68. Behind that is a cellular chamber 69, that has a series of a vertical cell 91 created by a series of a cell web 137. Each cell has a series of a pin hole 135 that connects to the cladding 68. The cellular chamber 69 is kept full of liquid—which can be plain water—from a reserve chamber not shown. The liquid permeates though and out of the permeable on-stick cladding 68, per Patent Application PCT/IB2018/000301 by this same inventor where more information on the system construction is disclosed. The effect of this liquid seepage from the surface of the slip form is to prevent fresh sticky concrete from sticking to it, and this effect is beneficial to the functioning of the tower casting device. The slip form 43 panel is completed with the backing plate 93 which is noted at steel plate in this case, but can be of any suitable material.

FIG. 4

This is a top-view partial-section of the curved screed 27, also showing a portion of the concrete wall and the slip form 43 on the outside. The primary object of FIG. 5 is to show the means of adjusting curvature in the curved screed. Taper of the tower interior surface is adjusted by the adjustable extensions 49. Curvature is adjusted by the thrust of an adjustable stiffener 126 by one or two of a servo motor 63 and worm tensioner 64. Restraint providing the increased curvature is provided by two of a pinned stiffener 65, that are free to rotate at their pinned/slide connection to the screed frame 127. The thrust of the adjustable stiffener 126 is mirrored by the retraction of edge stiffener 128 when the two are connected by a spline tie 129 that leads around a tie bearing 130. All of the stiffeners are securely welded to the backing plate 93 of the curved screed, to keep it straight vertically and give it a controlled spline curvature horizontally. Alternatively each stiffener 125 can be attached to the plate 93 with a continuous piano hinge or the like, welded or frequently fastened, and then may be attached to the top and bottom of frame 127 with non-sliding pin connections.

It should be noted that the screed 27 is not required to have any curvature to function, and that two such devices working together, one from each side of a planar wall, will function just as well, providing each has a source of pumped concrete and intermixed admixture as shown, and each has controlled guidance coordinated with the other. With this method, the slip form 43 is not required.

Figure 5A:
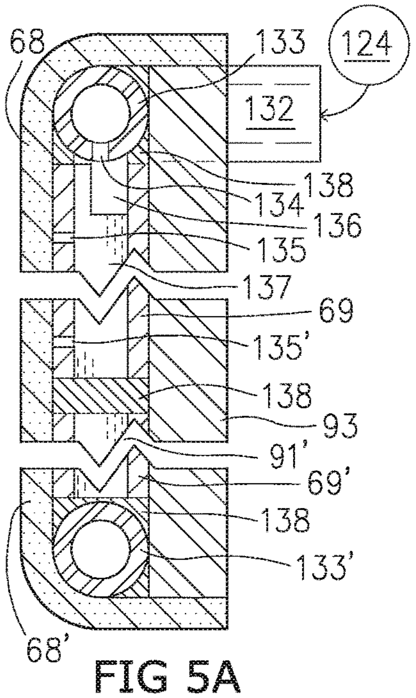
FIG. 5A is a section view of non-stick geometry-defining surface.
Figure 5B:
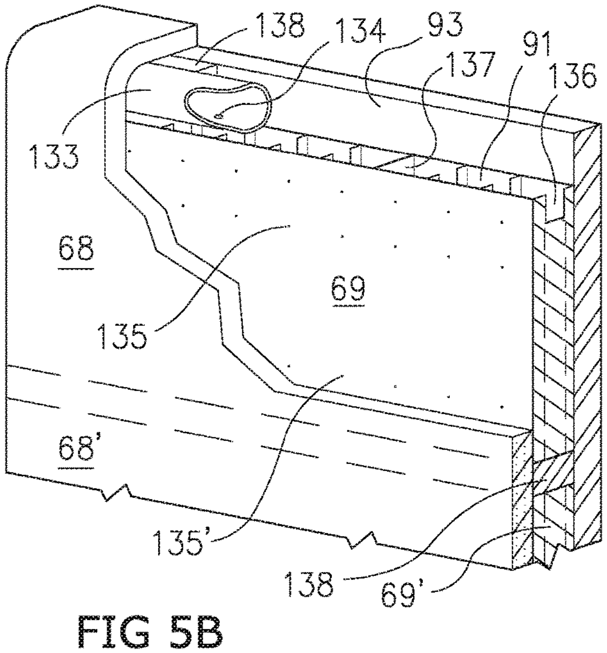
FIG. 5B is a partial view of a non-stick geometry-defining surface.

FIGS. 5A and 5B

These show detail of the non-stick screed or slip form surface system originally disclosed in International Patent Application file PCT/IB18/00301 by this same inventor, showing some more recent improvements. In this example the backing plate 93 is shown as thick steel, but of course this can be any metal such as aluminum, of composite construction, or plastic such as PVC. The cellular chamber 69 may be of 4 mm thickness.

The permeable non-stick cladding 68, as disclosed previously, is preferably wrapped over the top edge about a feeder tube 133, that is a length of tubing that also serves as a liquid conduit, having an inlet 132 that is supplied a liquid source 124, disclosed previously. Tube can be of stainless or hard copper to give better edge toughness to the device. It has a series of an emitter orifice 134; each orifice corresponds to a plenum compartment 136, which is a length of a channel created by making a notch along the top portion of a number of the cell webs 137, or removing the top portion of those webs, of the cellular chamber 69. Midway between each emitter orifice 134, one cell web 137 is not given the notch, effectively separating those two adjacent plenum compartments 136. To control the liquid flow, each emitter orifice 134 corresponds only to a given plenum compartment 136, and so it corresponds only to a specific range of the vertical cells 91. This feeder assembly is provided with a caulked seal 138 at all locations necessary for ensure this flow control. This feeder assembly then utilizes only the tube 133 for primary horizontal distribution of liquid, and so provides a means to limit the horizontal flow by making it possible to insert a fitting and removable plug at any location within the tube, or at the end of the tube, to control the horizontal distribution of the liquid.

This pattern of the pin holes 133 in the outer face of the cellular chamber 69, is preferably one where there is one or more of the holes near to the top edge—with one as near to the top edge as practical, and at least one near to the bottom edge, of any cell 91 that is in communication with the tube 133. Intermediate pin holes 135 are generally not beneficial for any may or may not be required, depending on the amount of preferred amount of liquid to be expelled, the vertical dimension in question, and the viscosity of liquid utilized. A surface area that is up to a few inches tall, for example, can function as a non-stick surface with no other intermediate holes. The intermediate holes are best above the midpoint between lower hole and upper holes mentioned. The liquid will always migrate downward within the permeable non-stick cladding 68 previously disclosed. Limiting the liquid flow rate is best done by limiting the number and size of the entire array of pin holes. For use of water as the liquid, each pin hole 135 diameter can be as small as about 0.010" as a means to limit the liquid flow rate, while allowing adequate seepage to dislodge wet concrete. Of course many other hole arrangements may be preferred for the many various applications where this type of device will be beneficial.

The result is a porous surface, with the supplied liquid expelling out its pores, so preventing adherence of the cementitious mixture, and so allowing still plastic and very sticky fresh cementitious mixture to be easily shaped. A filter is beneficially positioned upstream of a liquid inlet 132, to prevent the very small pin holes from getting clogged. When such blockages should occur, they can be cleared with high pressure water from the outside of cladding 68. The porosity of the cladding previously disclosed will allow enough liquid migration into a lower portion 68' for effective non-stick effect, where the cellular chamber 69 is replaced with a lower cellular chamber 69' that is sealed, and so has no liquid flowing in its cells. Any other suitable solid or hollow material may be alternatively be utilized in this case. The bottoms of the cells 91 above are given a caulked seal 138 or the equal to stop internal liquid flow at that point into chamber 69'. The bottom edge of the device can utilize the same toughened edge design whereby a length of a tube 133' is given a caulked sealed 138 all around to prevent unwanted collection and distribution of liquid that is better utilized seeping out of cladding 68'.

The flow rate can be controlled entirely by a limiting the supply flow rate if all of the pin holes 135 are at essentially the same height; that is, only a single row with none significantly higher or lower than the others, within about one inch during device operation. This arrangement avoids relatively higher pin holes acting as a source to feed liquid (by drawing in air) to the relatively lower pin holes. In this means of utilizing the liquid supply flow rate as a flow limiter, there can be multiple tiers of the pin holes, where each tier, at a specific relative elevation is entirely separated is hydraulically from every other tier, so that each tier has its own unique liquid supply. For example, the lower chamber 69' can then have a separate liquid supply and a single row of pin holes that can be controlled by the supply flow rate. This arrangement allows a vertical separation of pin holes while also allowing the flow rate to be controlled by limiting supply flow rate.

FIG. 6

This shows other embodiments of the tower casting device whereby the support of the device is made by elements projecting above the concrete casting process. These elements can be the rod-type elements that are commonly utilized with vertical slip-forming processes, or as those are improved here to also provide for continuous tension reinforcement of the finished structure; or the projecting supporting elements can be conventional reinforcing bars serving dual purpose of temporary support and reinforcement, with use of inventions disclosed herein.

Figure 6:
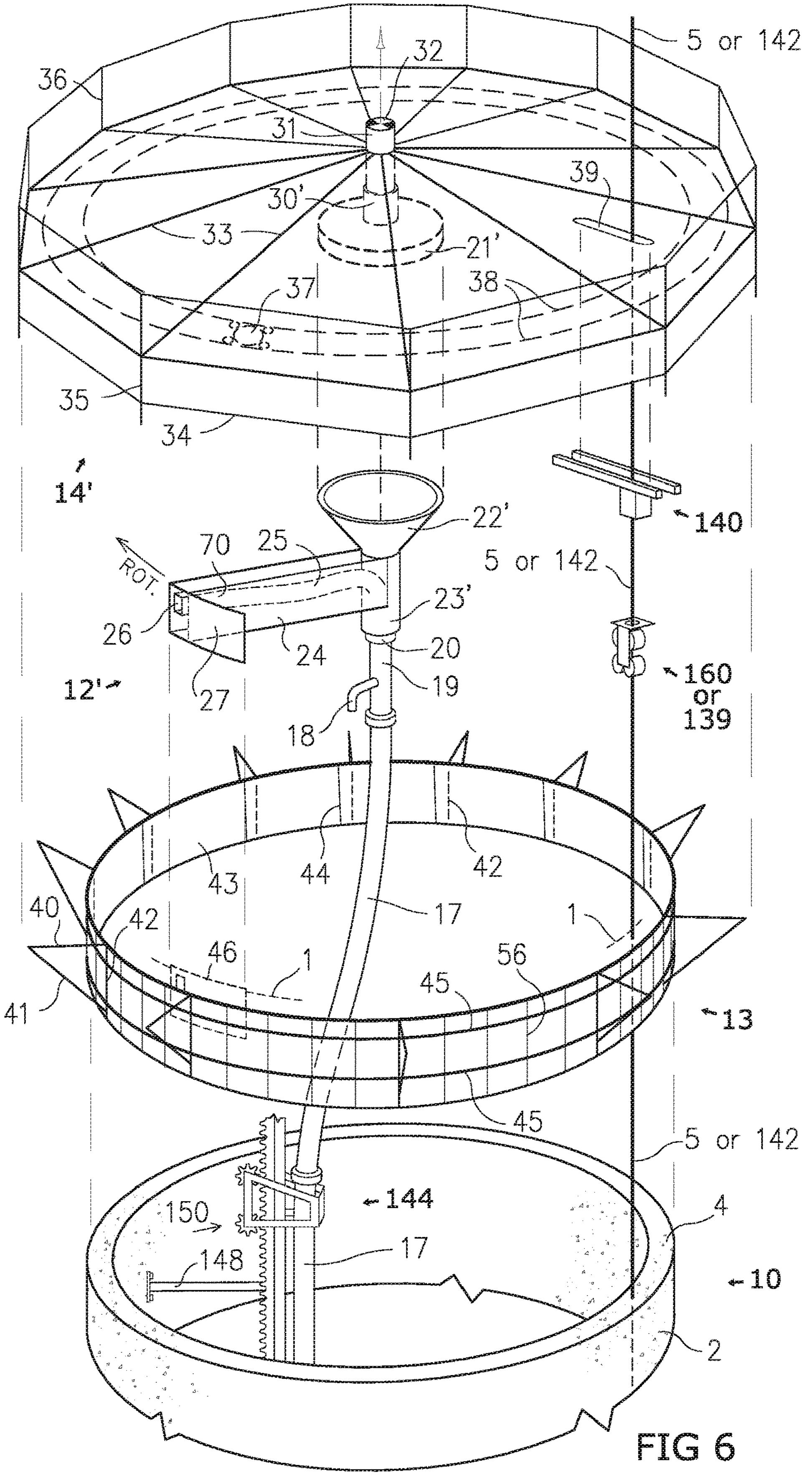
FIG. 6 is an exploded view of a cylindrical-tower casting device with support provided by elements projected above the concrete.

The cylindrical tower casting device shown in FIG. 6 functions the same as that shown in FIG. 1, with differences noted here. This device is comprised of four primary elements, a rotor screed 12', a slip form assembly 13, a canopy structure 14', and in lieu of a crawling frame 11 (of FIG. 1) various means of support described below, provided directly to canopy 14'. All of these elements work together to create a tower wall 10 by additive construction means to cast in-situ concrete. These means of support require elements that project above the concrete, such as conventional vertical reinforcing bar 5, or lengths of a jack pipe 142. Jack pipe 142 can be conventional solid steel jack bar, also known as climbing bar, as is utilized in vertical slip forming operations, or continuous vertical slip forming operations; or it can be steel pipe material, made of an outside diameter to match lifting jacks built for slip-on jacking.

If the projecting elements are lengths of jack pipe 142, then the supporting devices are an array of a slip form jack 139. If the projecting elements are of reinforcing bar 5, then the supporting elements are an array of a rebar climber 160. In either case, the support is articulated to the canopy 14' with a matching array of a lift aligner 140. These supporting devices are described in FIGS. 8 and 9.

Figure 7:
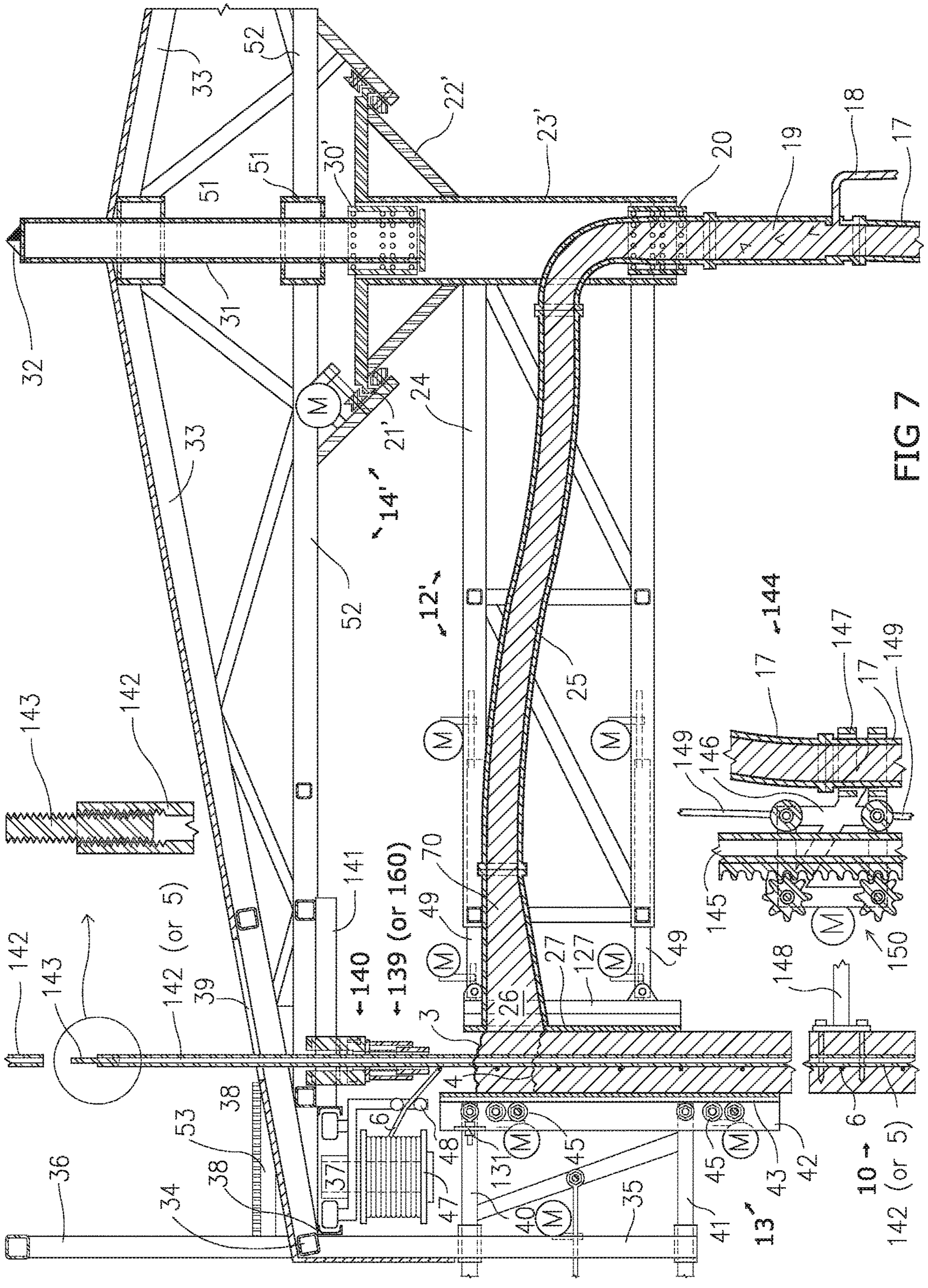
FIG. 7 is a section view of a cylindrical-tower casting device with support provided by elements projected above the concrete.

The rotary screed 12' obtains its support and guidance by hanging from a bearing array 22' that is an upside-down version of the array 22 of FIGS. 1 and 2, and is shown better in FIG. 7. Array 22' provides all the support for rotor 12' and its own supported length of concrete pumped line 17, but does not need to provide any support for canopy 14' or slip form assembly 13. So the overall load to array 22' and heavy riser 23' is much less.

Canopy 14' supports rotor 12' with a bearing raceway 21'. In this case, a bearing assembly 30' is optional additional support for rotor 12' relative to canopy 14'. As canopy 14' receives support nearly about the perimeter, the design is as a 3D truss spanning between those supports to support the rotor 12', and with the cantilever strength required to support corresponding portions of the slip form assembly 13. Canopy 14' does not have any cable spools 47 for vertical cables, as this version utilizes solid-bar vertical reinforcement. The weight of the concrete pump line 17 can be carried and lifted by a hose lift system 144, described in the disclosure relating to FIG. 7.

FIG. 7

This section view shows more detail of the casting device where a supporting element is the jack pipe 142, which in this case is left in the structure as a reinforcing element. To make that reinforcement continuous, each length of pipe 142 is connected to its adjacent lengths with an internal coupler 143, both shown in enlarged view. These threaded connections have a length of thread to provide the tension strength of pipe 142 net section area. What makes this unique compared to pipe couplings is that it allows for a consistent outside diameter is required for the function of slip form jacks, and this thread is a structural tension connection and so should not be tapered as is the case with pipe thread and with conventional jack rods where they have threaded connections. A standard machine screw thread is preferable, as is utilized for mechanical couplers.

For example if the pipe 142 is 1" schedule 80 (1.315" OD and 0.957" ID), a 1.25" threaded rod coupler 143 can be threaded on the pipe inside, while leaving about half of the gross sectional area of the pipe for net tensional area. These tapped threads would taper beyond the coupler for transition. Of course the pipe connections can be welded or glued with internal bar couplers, or if solid bar of the same threads that are used for rebar. Conventional jack rods can always be used, however this method allows use of lighter supporting elements because the total load is far less than traditional slip form platforms, and with traditional slip form methods a greater vertical distance of rebar must be made accessible to allow workers access to tie horizontal rears into place. With these methods that utilize the spool shuttle 37 (FIG. 7) for spiral reinforcing, very little vertical length of vertical supports is required, so they can each be more slender, or of hollow pipe rather than solid bar stock. More discussion on this follows.

FIGS. 6 through 8 show the orientation of the slip form jack 139 with its bearing surface at its top surface, whereas the traditional orientation is the opposite, where the jack is bolted to a heavy yoke in order to raise it higher. Jack modifications are required for this orientation. However, as the same worker access is not required with this method, it is then preferable to place the jack 139 connections to jack pipes 142 to be as low as possible, in order to shorten the unbraced column length of the jack pipes 142 as they are in compression. This allows much lighter sections to be utilized for support without increased risk of buckling, saving significant cost. Of course entirely conventional slip form jack methods can be utilized to support this tower casting system, if that should be preferable for any reason, such as utilization of hardware already on hand.

To allow lifting of the concrete pump line 17 up the tower at the vertical rate of the additive layering progress, the hose lift system 144 can be employed. This is one or more of a lift rail 145 is erected inside the tower, for installation of a rack and pinion assembly 150, as is commonly utilized for construction lifts and climbing scaffolds. In the case of windmill towers, these lift rails are frequently erected anyway for nacelle and blade maintenance, so in this case they serve dual purpose of also assisting construction.

Where the rail 145 requires bracing, a number of a support strut 148 is fastened to the tower wall 10. As this concrete may be temporarily insufficiently hardened for a full-strength anchorage, additional fasteners, beyond what fully hardened concrete require, are utilized. The thickening/accelerating admixture injected and intermixed at the inline mixer 19 is formulated to give sufficient concrete strength within as soon as a few minutes for the acceptance of mechanical fasteners. For example a number of a "Titen" fastener by Simpson Strong-Tie, having sharp threads made to cut into concrete can be utilized with smaller-diameter pilot holes if the concrete is softer, and double or triple the number of fasteners can be utilized, for example.

The rack and pinion assembly 150 attaches to a lift carriage 146 which includes a hose cradle 147 for attachment about a portion of the concrete pump line 17. This would typically be just below a coupling between two lengths of the pump line 17. An additional lift carriage 146 with cradle 147 would also be in operation below each coupling on down the line 17, at intervals of each length of hose, for example at each 25' concrete-pump-hose length. The carriages 146 preferably each control the lifting required for the weight of their own length of pump line 17, with work from the onboard motor shown. Vertical positional control can be as simple as the use of a static line 149 which toggle-operates the motor based on a tension force in the line 149, which can be adjusted to be shorter than its corresponding length hose. The top carriage 146 can be controlled by GPS, as can all of them, or by an uppermost static line 149' that is tethered to the swivel coupling 20. A power cord to each carriage motor can be adjacent to the static line.

The system 144 can use identical components to those found in "mast lift" scaffolding systems, where a scaffolding platform is hoisted to a desired elevation, by a rack and pinion gear system attached to a mast—often a light box column with internal webbing for stiffness—that is utilized in lieu of the lift rail 145. These systems are designed for slower rates of travel than elevators, as is the case here, and they can carry very high loads. To reduce the number of carriages required, longer lengths of hose can be hung from each carriage, with cable attached to that carriage and to the next-lower length of hose with a hose cradle 14. Of course these elements can be utilized in any combination that provides maximum utility.

Concrete discharge is improved for additive layering purposes if a nozzle 70 is employed. The nozzle 70 is a means of contouring the shape of discharged concrete to more beneficially place it for an additive layering process, particularly when the concrete is placed from the side. In this case, it is not meant for extrusion of concrete to a finished shape; rather because a rectangular shape fills an essentially rectangular void more efficiently, the vertical aspect ratio and a rectangular shape allows a pass of the rotor screed 12 to pump a higher lift of concrete with less voids. The idea here is to use the pressure of the pumping line to push the concrete under pressure into the space defined by the slip form 43 and the curved screed 27, and to feed this concrete from the side into just-placed concrete, so that air is displaced by rising concrete, not trapped by concrete conventionally placed from above.

Nozzle is attached to the curved screed 27, but it cannot fasten to the primary structure of rotor 12 because adjustability is required for tower taper, and it cannot attach to a screed frame 127, because of adjustability of screed 27 curvature, discussed in FIG. 2.

Figure 8A:
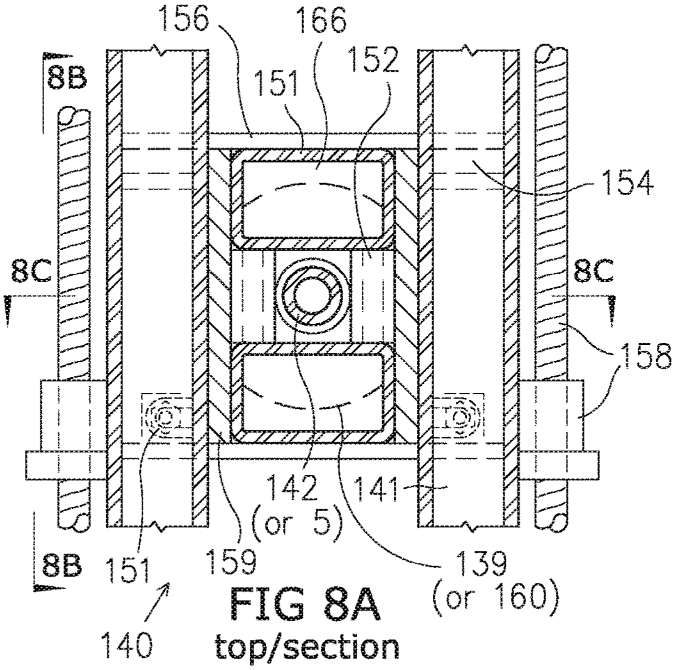
FIGS. 8A-C show three views of a lift aligning device.
Figure 8B:
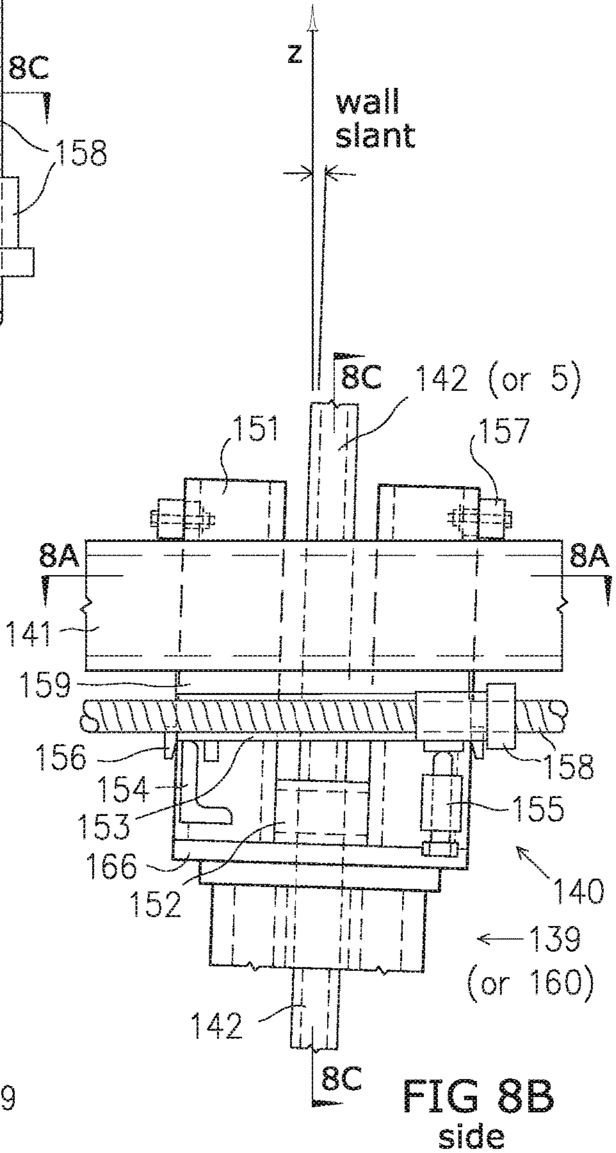
Figure 8C:
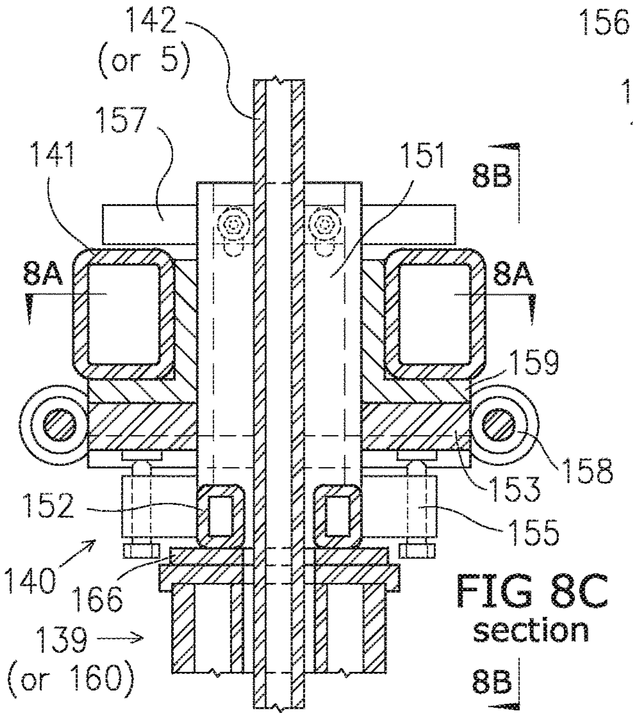
Figure 9D:
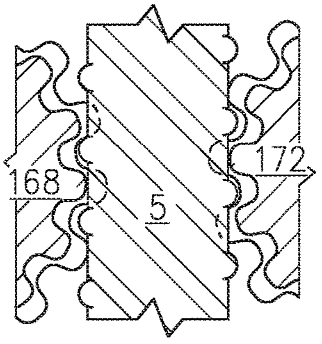
FIGS. 9A-F show several section views of a rebar crawling device.
Figure 9C:
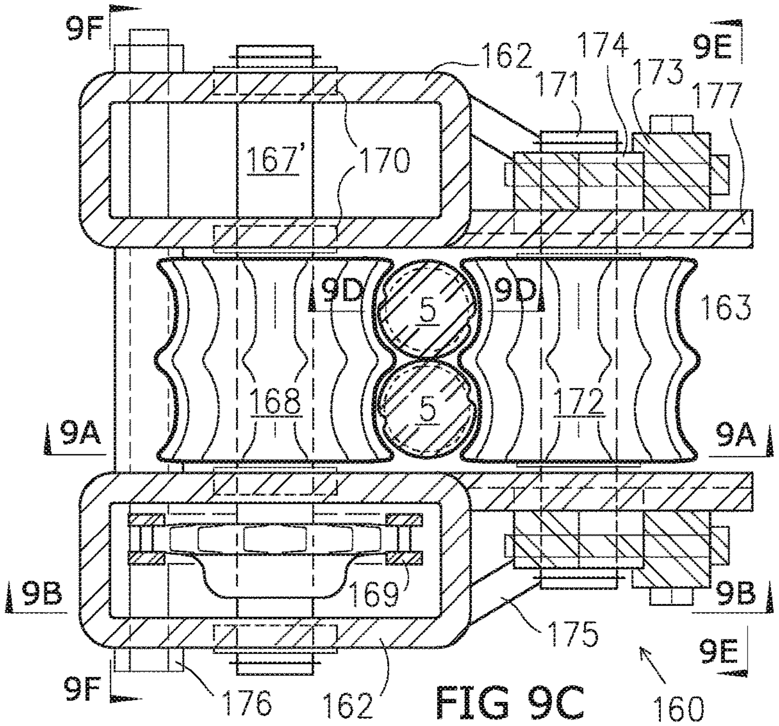
Figure 9A:
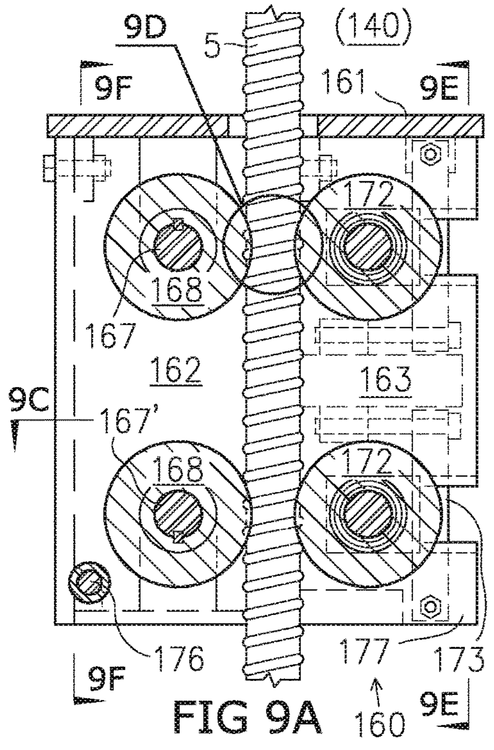
Figure 9B:
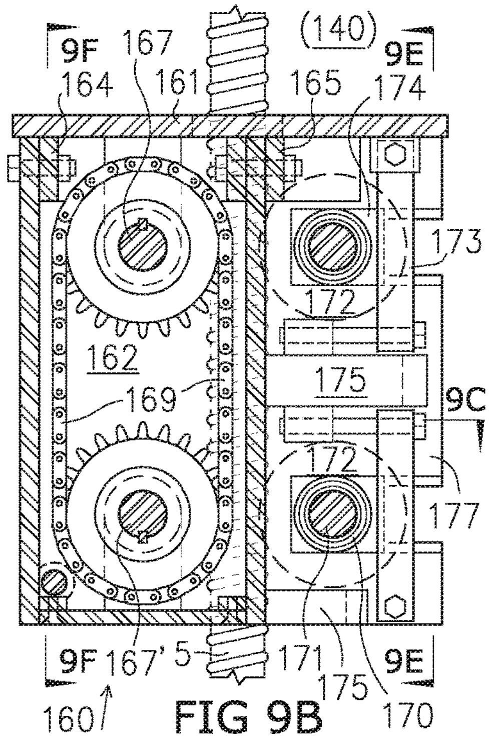
Figure 9F:
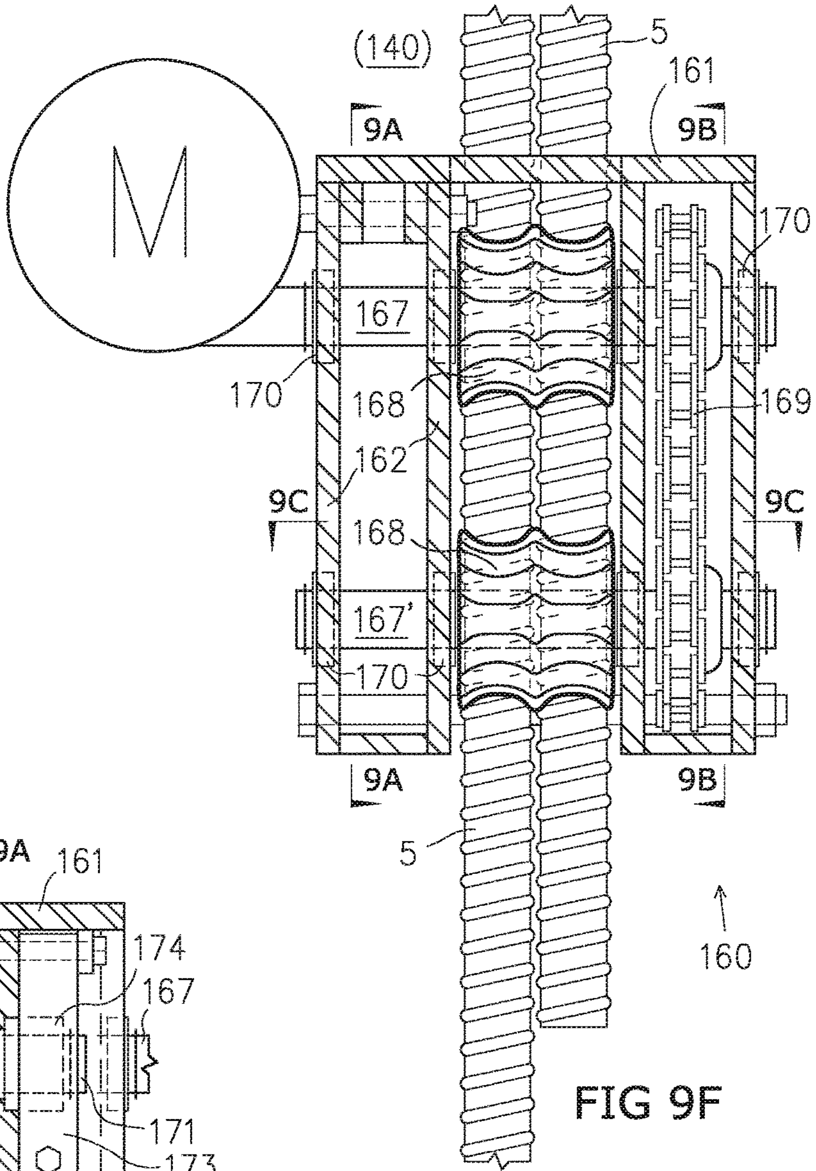
Figure 9E:
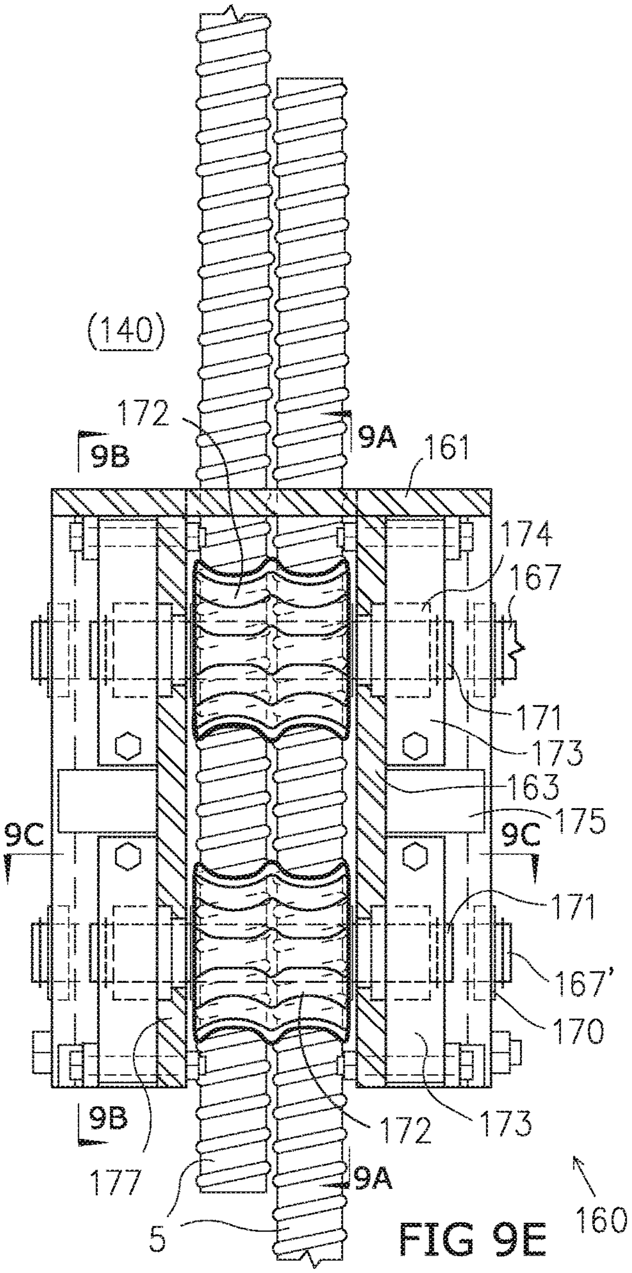

FIGS. 8A to 8C

This is three views of the lift aligner 140; each is utilized in conjunction with an array of others. The purpose of the device is to position the lifting mechanism, such as 139 or 160 that utilizes an element projecting, such as jacking pipe 142 or reinforcing bar 5, above the concrete wall 10 for support, whereby the projecting element is properly located relative to the defined surface of concrete 1 (FIG. 6) by the lift aligner 140, and the projecting element is also properly aligned for the projected slope of the wall.

A challenge with this lifting method is that the projected conical or cylindrical shape of the tower requires constant correction during the casting process, and those corrections must be made by the projecting elements having some unwanted flexibility, and also needing to remain in position within the finished wall. This challenge is known to slip formers. It is traditionally overcome by steering the working platform in the required direction by lifting one side of it higher than the other. In this case the aligners 140 can act as a group to make this correction, and further disclosure of this method is given with the description of FIG. 11.

The aligner 140 is self-located radially along its position on a pair of a travel bar 141, as its position is controlled by one or two of a linear actuator 158, which can be a ball screw assembly or the equivalent. Movement is allowed under load with presence of a pair of a plastic bearing surface 159, that can be an L-shaped section of Teflon or the equivalent low-friction plastic material. The surfaces 159 are each attached to a bearing plate 153. The bars 141 are fastened to the canopy 14' where supporting elements are preferred, and as such can be combined with required concrete reinforcement. These connection locations can be adjusted to suit, even as concrete casting is underway, if necessary. A rebar slot 39 (FIG. 6) or an equivalent penetration in the canopy 14' must be provided as required.

The aligner 140 provides alignment adjustment by use of a pair of a taper adjustment 155, which each consists of a set screw having and adjustable end that bears upwards onto bearing plate 153, and a female-threaded body that is welded to each side of a vertical tube 151. The set screws can be normal machine threads for manual adjustment, and include a lock nut, to lock the aligner at a given taper; or the adjustment can be made by a linear actuator. The pair of the vertical tube 151 are bridged with a bearing tube 152, where that assembly bears onto a bottom plate. This bearing assembly is supported one end by a pivot bar 154, each which is short length of steel angle bar, also each welded to each side of one vertical tube 152. The edge of pivot bar 154 that bears upwards against the bearing plate 153 is kept from sliding out of place by a retaining lip 156 on one side, and the equivalent small bar on the other side. This assembly creates a pivot axis for the adjustment to match the slant of the tower wall, where the slant angle is adjusted by the pair of the taper adjustment 155 assemblies. Of course taper adjustment and translational adjustment must be coordinated, and for a given set taper adjustment setting, a constant translational adjustment must be made as the tower becomes correspondingly narrower.

To prevent uplift failure from big wind events, and/or the upsetting of the canopy support should any linear elements begin to sway or buckle, two of a retaining bar 157 are fixed in place to slide just over each travel bar 141. These bars 157 are also an element of the structural design of aligner 140 whereby any eccentric load from the supporting device below must be taken by supporting connections—of supporting device to aligner 140, and of aligner to canopy 14' structure. Each bar 157 can be affixed according to the setting of the taper adjustment 155. Each lift aligner 140 provides the articulating bearing surface of the bottom plate 166 that securely attaches, typically by machine screws (not shown) to a supporting and climbing mechanism below the aligner, whether a conventional slip forming jack 139 that lifts on a length of the jack pipe 142 or the equal, or the rebar climber 160, disclosed below.

FIGS. 9A to 9F

These are various section views showing all or part of the rebar climber 160. This embodiment is one where conventional lap splices of vertical reinforcing bar 5 can be made, in that the portion of doubled-up rebars can be accommodated by the climber 160. Where rebars are joined by mechanical or welded connections, this feature is not necessary, but as simple lap splices are the least expensive and most common means of joining lengths of rebar on concrete, this embodiment is primarily disclosed.

The rebar climber has four wheels that make contact with the rebar 5. These wheels have concave and deformed surfaces shaped for maximum grip onto the deformed surfaces of typical rebar, and in this case for side-by-side lapped bars, that being the critical case to accommodate. Normally a single rebar would be present in one of the two concave-shaped portion of each wheel. The wheels can be made of steel, aluminum, urethane of a high hardness. Wear of a rubber or synthetic material is not a significant problem, as the wheels travel very slowly and not over a great distance, relative to similar wheels designed for rebar fabrication that need to be of steel to resist wear. The climber wheels can be of softer material, and this provides a benefit of achieving a much higher load capacity—grip and frictional force—for a given pinching force (normal to the rebar surfaces).

The climber preferably has two of a drive wheel 168 that both operate on one side of the rebar. Both drive wheels 168 are driven with a drive shaft 167 that is keyed into the wheel hub and is supported by a number of a roller bearing 170. These bearings are set into the machined recesses of a drive tube 162, with one tube for each side of the device. Drive tube 162 is a tube steel section in the range of at least about 4"×1.5" having about 0.25" wall thickness. Of course the appropriate dimensions will vary according to the design loads and size of rebar utilized.

A rotational drive system, such as a stepper motor with a significant worm reduction gear—up to 100:1, or a hydraulic drive, or the like, is engaged to one drive shaft 167 by conventional means. To engage the other drive shaft 167', a drive chain 169 system can be employed with two equal sprockets, both also keyed into their respective drive shafts. Chain 169 is roller chain that is preferably of at least size 16B or 60-1 US. This size depends upon the number of supports and load to each. It may have to be multiple-wide roller chain, etc.

Opposing each drive wheel 168 is a pressure wheel 172 that rides on roller bearings about a free shaft 171. This embodiment shows the pressure wheels to be unpowered, but they can also be driven; if not driven, they do not need the deformed surface shown, rather they can be smooth, but preferably with the concave recesses for the rebars. A normal force is maintained against rebar 5 with a pressure bar 173, which in this case is a tempered spring-steel material such as ASTM 1074. Bar 173 is made to deflect slightly in combination with wheels of a urethane material of about 90 Shore A hardness, while holding a high force against rebar 5. The combination of wheel compressibility and bar 173 flexure allow movement of each free shaft 171 so that variations in rebar 5 can be accommodated. If the wheels are made of steel such as are used with rebar fabrication, then a simple spring-steel bar system would not allow sufficient shaft movement to accommodate rebar variations, and a much higher pinching force would be required to maintain vertical support. The force from bar 173 is enabled with a pin connection for one end and an adjusting screw for the other end where pressure adjustment is maintained. Each bar 173 presses against a shaft block 174 that is made to fit within a shouldered horizontal slot in each of a vertical plate 177, as is common with machinery drive adjustments. Wheels 172 and shafts 171 can be removed by sliding blocks 174 out of vertical plate 177, by removing adjustment screws of bars 173, so that the device can be engaged or disengaged from rebar at any point along its length.

Each vertical plate 177 is welded to the corresponding vertical tube 162, and kept aligned with a number of a gusset bar 175, or the equivalent. These two halves of the vertical structure of the device are joined at a top plate 161 with two of a tube attachment 164 and two of a plate attachment 165. Top plate is preferably of at least 0.375" thickness steel as it must remain flat for the welded-on connector elements and to mate with the bottom plate 166 of the lift aligner (FIG. 8). These attachment elements are sized to fit snugly with the vertical parts for stability and strength. For example, the tube attachment can be of a tube section of a size that fits, or is machined to fit, the ID of vertical tube 162. The connections to vertical parts are bolted for disassembly of the drive wheel system, but the vertical load is borne upon the top end of the vertical members against the top plate 161. The bottom end of the vertical parts is joined with a link strut 176, which is a machine screw within a pipe of a length that fits between the vertical tubes 162. This can be repeated at the vertical plates 177 if necessary. A closure plate is shown at the bottom of the vertical tubes; this is primarily for purposes of keeping concrete out of the tubes and off of the drive chain 169, as the device is employed just above newly-placed concrete.

The rebar climbing device will function with only a single pair of wheels, and with that design the tower taper angle (FIG. 8) could be ignored if the wheels are aligned with the plane of the taper gradient. This simplifies much of the present design and manufacture cost, however the primary design challenge to make this system the most cost-effective is maximizing the column strength of the rebar. The required diameter of the supporting rebar is often based on Euler buckling of the effective unbraced length of the rebar at that moment. Calculations often show that this temporary construction loading can require a larger diameter rebar than is required for the design tension force attributed to that same rebar in the finished structure. This use of extra rebar material is not a net cost detriment, as the need for slip form lifting rod is eliminated, but any unnecessary cost is preferably minimized. To this end, the embodiment with a double pair of wheels is disclosed, as the two points of support create a fixed-end to the rebar column, so reducing its effective unbraced length; and because a lower set of chain-driven wheels can be extended further below the other components such as that drive motor, any alignment device, and the canopy, so that those lower wheels can almost be within the just-placed concrete. This allows reduction of the column length as it is then closer to the location where the rebar is tied to perpendicular reinforcing and/or is braced sufficiently in hardened-enough concrete.

Utilizing the rebar for support and lifting purposes can also be accomplished with slip form jacks that can also clamp to the rebar. There is a re-bar grip device marketed specifically for the purpose of performing pull tests for embedded rebar. It is marketed by companies such as WB Equipment, Corporation.

These types of construction quality testing devices can be combined with a slip form jack device in order to utilize reinforcing bar for lifting purposes. This would not be suitable for most slip form operations because the platform loads involved are too high for the buckling load of the rebar. Because these methods that can utilize a lighter platform, primarily because the forming operation is minimal, and because the method allows a much shorter length of rebar to be utilized for lifting operations, these methods make it feasible to utilize rebar for support and lift.

FIGS. 10 and 11

FIG. 10 is an approximated free body diagram of the forces and support onto a given length of rebar. The reactions supporting the bar are based on assumptions about the veracity of supporting conditions short of completely hardened concrete, however these assumptions are regularly made in determinations for removing supporting formwork. Also this model is based both on utilizing, and on not utilizing, some bracing support derived from tied connections to crossing reinforcing members. This analysis is just a simplistic check of column buckling to show the viability of conventional reinforcing members as slip forming supports. If conventional lap splices are to be used, the overlap distance must extend over the length required for this support to develop for the upper lapped rebar, which is going to be a longer distance than normal rebar laps. This overlap can be shortened or eliminated with welded or mechanical connections, but that is a separate calculation not made here.

FIG. 11 shows various support conditions for modeling an effective unsupported length to determine a critical force that induces column buckling (Euler buckling). All supporting rebars are considered self-bracing (subject to sway), and fixity is assumed at the bottom, so that the column models would be either (c) or (e). Model (e) is the condition where the rebar crawler 160 would have only one set of wheels; that model requires the actual unbraced length to be doubled due to sway. This is why a primary embodiment utilizes two sets of wheels, to provide the fixity at the top, to reduce the buckling length to that of model (c), which is the actual column length.

FIG. 10 shows Leff based on some distance into the portion of rebar 5 tied off to crossing bars 6, an assumption. It is into the top of the zone of concrete still being soft, Tsc, but above the top of the zone of hardened concrete, Thc. If #6 rebar is used:

E=29 000 000 psi 0.75" dia bar: I=0.25pi*r^4=0.0155 in^4

If this length L is 18" and the rebar is 0.75" diameter, the Euler buckling for that #6 bar, Pcr, is determined as:

Pcr 18"=pi^2 EI/L^2=17 469 lb

If the ties to crossing rebars 6 are ignored or non-existent, use L of 36":

Pcr 36"=4 367 lb

If #7 rebar is used: Pcr 18"=32 363 lb Pcr 36"=8 090 lb

If #8 rebar is used: Pcr 18"=55 210 lb Pcr 36"=13 802 lb

Appropriate safety factors must be applied of course, and the full effects of lateral loading must be incorporated, or resolved by separate bracing. A more accurate determination of stress to rebar would require other more-involved combined-loading calculations, or a finite-element analysis. As the total weight imposed by this device is in the range of 50 000 lbs, and it can be supported by one or two dozen rebars, the applied load to each is in the range of 4 200 lb to 2 100 lb each. One can see from this preliminary buckling calculation that the use of rebar for this method of slip forming support is entirely viable and practical.

Figure 12:
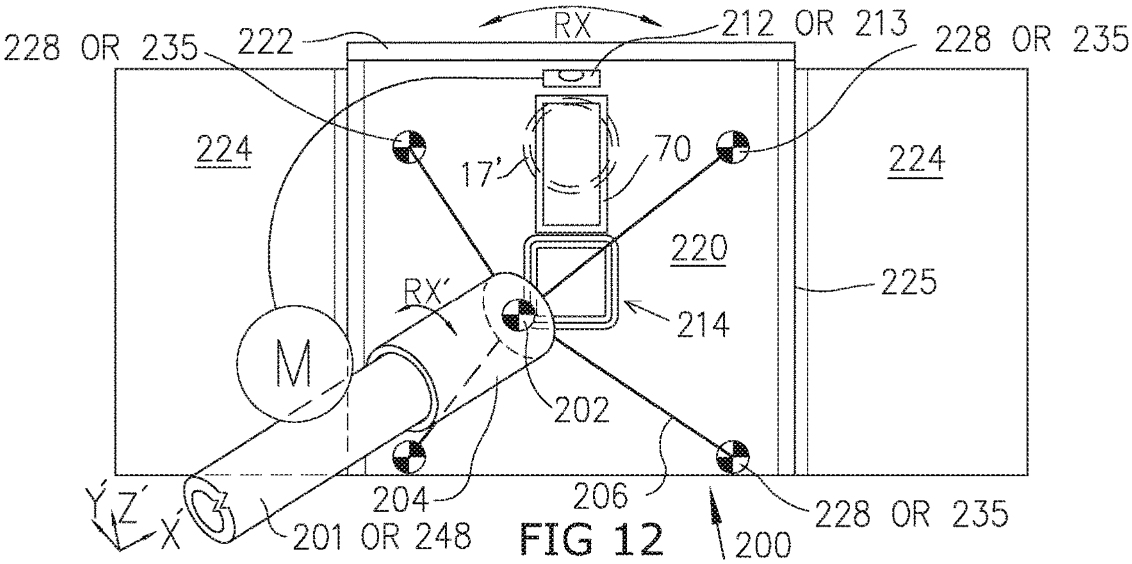
FIG. 12 is a schematic face-view of a positionally-controlled vertical-screeding device.
Figure 15:
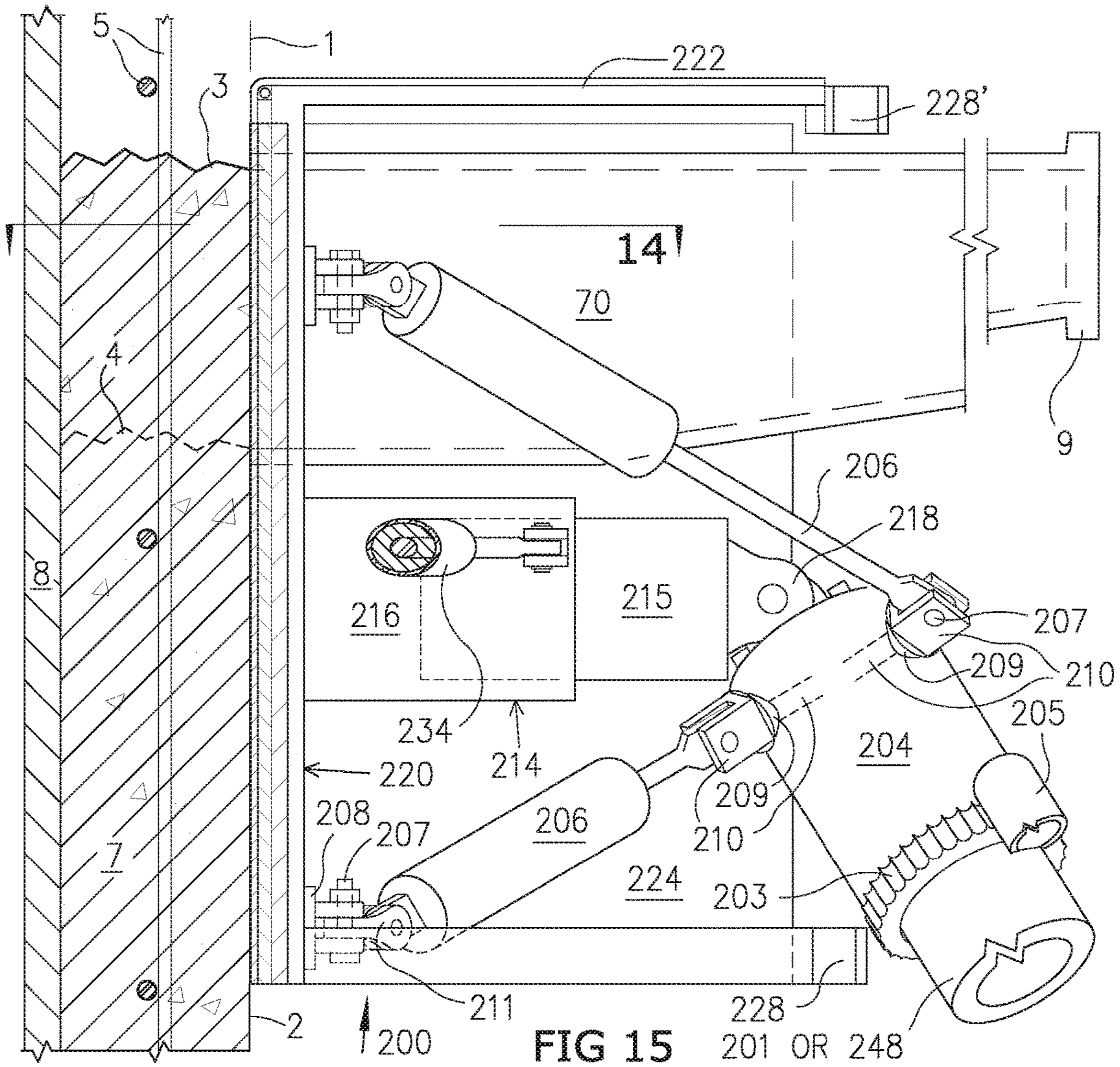
FIG. 15 is a side view/section of a positionally-controlled vertical screeding device.
Figure 13:
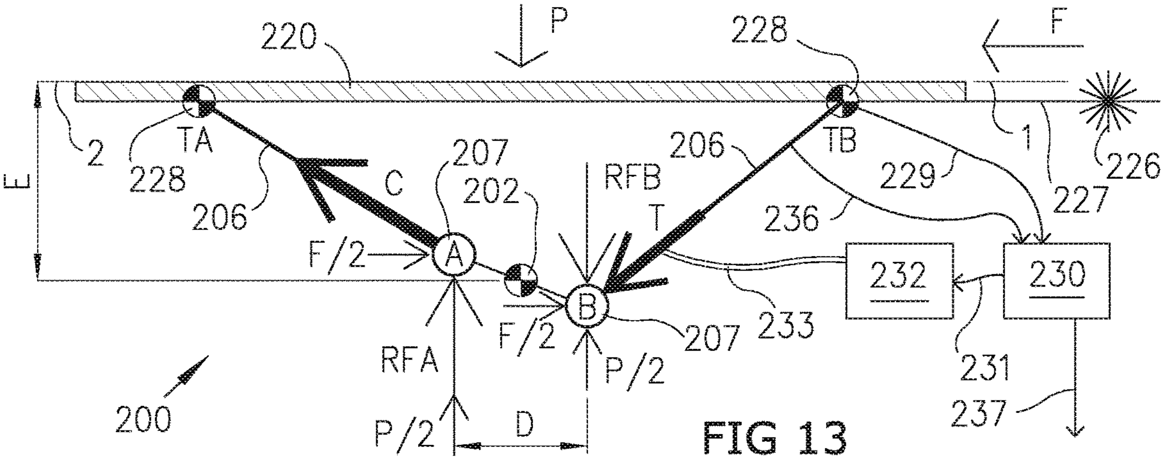
FIG. 13 is a free-body diagram of a positionally-controlled vertical-screeding device.

FIGS. 12, 13, 13 & 15 Overview

The vertical screeding device 200 is for in-situ casting of a concrete wall, where the device expels concrete under pressure into the wall plane from one side, confines the concrete utilizing the pump line pressure, defines the plane of the finished surface of that wall, while the concrete is being placed. The defined plane does not have to be vertical, nor does it have to be perfectly flat. The term "vertical" is to differentiate from the normal essentially horizontal definition of concrete slabs. The non-horizontal orientation of the freshly-placed concrete is made possible due to a rapid-setting concrete mix composition and method previously disclosed. This device, and other variations that follow, are unique to the industry in that, in combination with a rapid setting concrete, they place concrete from one side, and that they both place the concrete and screed the concrete surface, by use of an onsite control signal that does not have to be a digital model.

The device 200 attaches to a 3-axis rotational robotic arm 201, or similar numerically-controlled device, having 3 or more degrees of freedom in rotation (3 axis minimum); or a manually-controlled excavator arm 248 that has at least 3 degrees of freedom. The device can attach to the bucket of an excavator, where this fourth degree of freedom (axis) may assist necessary articulation of the device, and similarly can attach to the end of a robot with additional linear or rotational motions. Whether attached to a robotic arm or a manually operated arm, the device can provide the additional degrees of freedom and geometrical corrections required to continually provide a given defined planar surface, for example. Typically that arm 201 or 248 is required to be at various oblique angles in order to reach the defined plane, where the basis of the arm operation is originating from a temporarily fixed location. This is the case for excavating equipment in general, and for robots without a 3D gantry system. As this device effectively provides 6-axis functioning with a simple a 3-axis robotic arm, significant robotics cost is saved; and in the case of use with a manually operated arm such as an excavator or a concrete boom truck, no robotics or numerical control systems are necessary.

In the terminology herein, "controlled" means that the action in question is controlled by an electronic signal originating from signal input provided by laser, GPS, gravity, or gyroscopic/inertial forces etc, such as is used for measurement and control of civil engineering and construction projects, of technologies developed by others. This is opposed to "manual" control where the action is controlled by a signal originating from the operator of the equipment in question; or from the term "numerically controlled", "digital" or "robotic" where the action is numerically controlled from a signal originating on the basis of a digital model. The latter class of control is also called "3D-printing" or "additive manufacturing" and other terms. The embodiment of additive layering disclosed presently, is where actions of a geometry-defining device utilizes onsite signal information, controlled onsite, to control the necessary corrective movements, within a given limited range of motion, to make rotational and/or linear corrections to the larger arm movements, that are either manual, or robotic with fewer degrees of freedom. Initial indexing of the onsite signal with a digital model, and with existing foundations etc, is part of this process for integrating with robotic systems. When utilized with a manually-operated arm, the device 200 preferably has a larger range of motion. Conversely, a totally digital-model signal can be used for control with this embodiment of the additive layering process.

A rotationally-controlled collar 204 typically attaches to the end of the arm 201 where it will provide clearance for required movements. The collar 204 can be of a construction such as that of a vehicle axle hub, or that of the rotational bearing system typical of robots for this axis. The end of collar 204 connects to at least three of a linear actuator 206, where those actuators also attach to a screed panel 220; and with four actuators 206 being preferable with regard to support issues to panel 220, discussed below. The combined relative lengths of this set of actuators will define a plane. Where the arm location 202 is within a range of a given reference distance from a defined plane, the actuators can be numerically-controlled to maintain the surface of panel 220 in that plane, or a given plane, as arm 201 moves laterally or vertically to that plane. The plane can be defined electronically by use of a separate rotating laser control device 226 which creates a laser plane 227—that is set parallel to and a controlled distance from the intended wall surface. The panel 220 will have at least 3 of a laser receiver 228 to provide feedback information to the panel controlling devices. These receivers 228 are the type that send a control signal based on their position relative to a laser light plane, such as is utilized for laser-controlled grading equipment—often referred to as a "mast". Their attachments preferably all provide a means of adjustment for the laser guidance signal relative to the panel 220 screeding surface. Alternatively the panel can be fitted with at least 3 GPS locators 235 in lieu of the laser receivers, if a GPS/GNSS system with a reference station is utilized. This is what the references herein to GPS indicate.

Inertial sensor systems can provide the means of guidance for the device, particularly for work in tunnels etc, where GPS signals are not present. The symbol labeled 235 indicates a GPS or an inertial locator. To avoid misreadings from impact etc, these would preferably be fluid-suspended-damped, such as one of the LCF-500 series acceleration sensors made by Jewell Instruments, 850 Perimeter Road, Manchester, NH 03103. One or more such accelerometers can be mounted in place of the laser receivers. The simplest replacement conceptually is where at least 3 single-axis acceleration sensors each provide a control signal to maintain panel 220 in plane, and in this case the sensor's signal can be analog or digital. Another solution is to mount a single 3-axis accelerometer to the panel, so the 3-axis sensor can sense location and planar orientation of the panel to provide a digital signal for a signal processor that determines the control signal. The inertial systems can be very helpful in providing redundant signal information for reducing the oscillations that are prevalent in concrete placement booms, and where processing of digital signals from accelerometers can generate anticipatory responses, so that the effects of the oscillations can be cancelled in the positioning of device 200 and other motion-correcting devices disclosed herein. For this purpose, the redundant accelerometers can beneficially be mounted directly on the boom.

Generally the panel 220 is preferably kept in a level orientation for intended operations. For maintaining this orientation, a sliding torsion link 214 is employed to transmit the torsional control provided by collar 204 to panel 220. The input signal to collar 202 for maintaining level orientation is provided by a level sensor 212, which is the type of device utilized for leveling rotating lasers etc. In this case, the required accuracy and precision are far lower, and so sensor 212 can have a much broader range of tolerance for acceptable degree of level. This is a practical feature, in that lateral accelerations of the device 200 will affect sensor, potentially causing unnecessary corrections. Because of the likelihood of impact, fluid-damped-suspended mounting of the level, and/or delay of the signal to collar control, can be preferable for smooth function with fewer unnecessary corrections made.

As the points of attachment the links 214 to the collar 202 are generally of differing distances to a given defined plane, the collar 202 rotation generally does affect the required length of each actuator 206 to keep the panel 220 in the defined plane. Therefore, the control system preferably adjusts for a level orientation of panel 220, by rotation of collar 204, before controlling the adjustment of each linear actuator. In other words, the positioning of panel 220 is continuously updated by cyclical interactions of corrections, where each control cycle begins with adjusting to level by rotation of collar 204, then by adjustment of each actuator 206, based on the updated rotation, to maintain location at the defined plane, within tolerances.

FIG. 12

Figure 14:
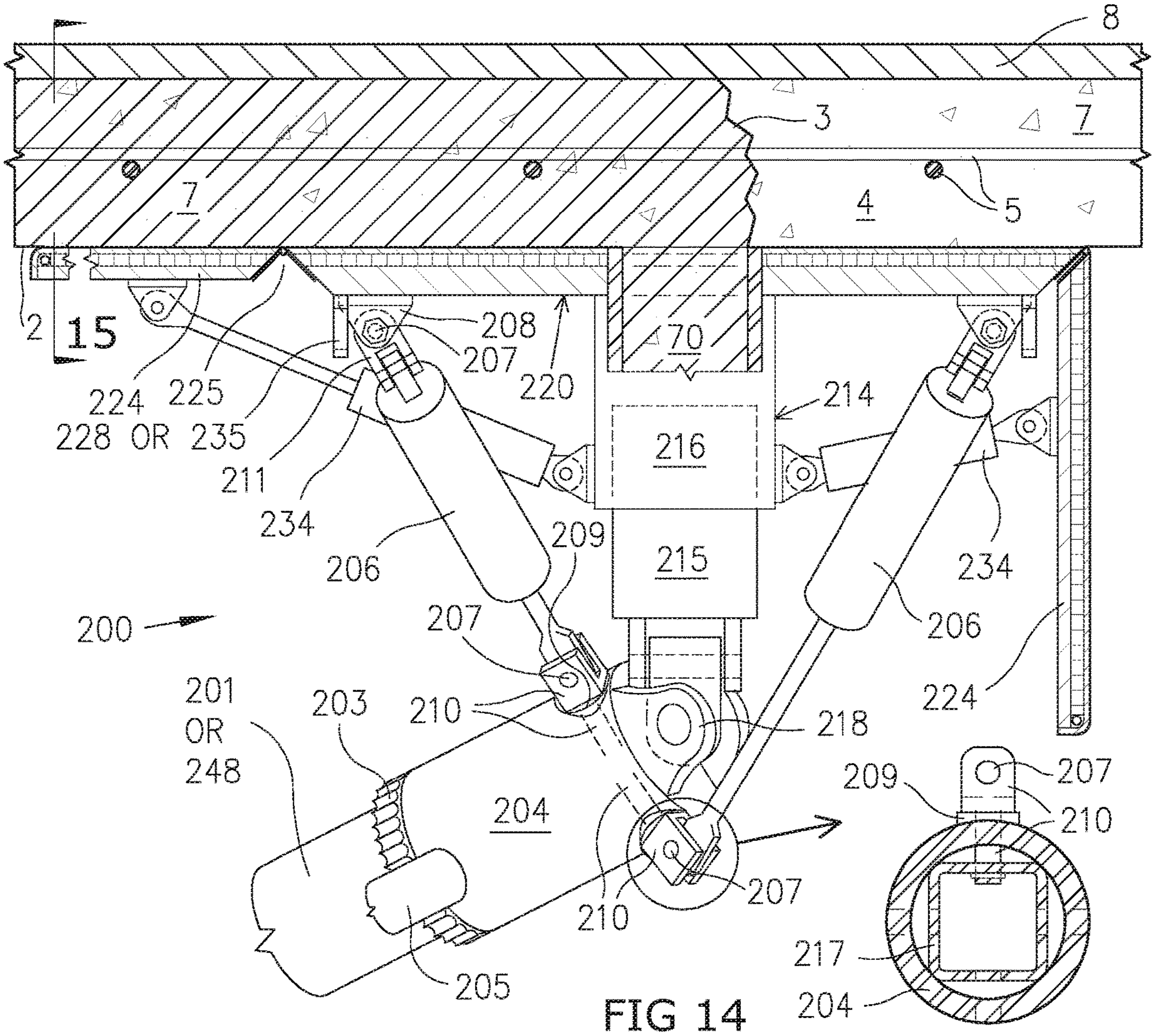
FIG. 14 is a top view/section of a positionally-controlled vertical-screeding device.

This shows the basic operational geometry of the device. During motions, the arm location 202 must be maintained in a motion parallel to the surface of the concrete wall, within the total limits of motion of the device 200 normal to that wall plane. These limits of motion can be built to correspond to the level of repeatable accuracy of arm motion, and so would be greater distances to correct for a manually operated arm, or to correct for oscillations of a longer arm, such as can be the case for concrete boom truck arms. Level sensor 212 effectively sends a signal to the motor operating collar 204 which is linked to panel 220 with a universal joint 218 (FIGS. 14 and 15). Any resulting rotational correction to collar 240 will also move the corresponding point of attachment of each linear actuator 206, so requiring readjustment to each. This is the preferred control circuit sequence noted above.

As the intended primary motion of the screeding device 200 is horizontal, then additional horizontal length is beneficial to provide confinement of the just-placed concrete that is to one side of the laterally-moving device. However this longer dimension can be detrimental to positioning the device close enough to an inside corner of the wall. The solution to this conflict is to provide a screed wing panel 224 on each side of panel 220, connected with a hinge 225—which can be a continuous piano hinge. Each wing 224 can be made to pivot under a screed lid 222, which is in place to prevent overflowing concrete from coming in contact with moving parts of the device. A nozzle 70 for discharge of concrete is adjacent to the sliding torsion link 214. The nozzle 70 is shown rectangular in section as preferable to the circular concrete hose 17', in that a rectangular shape fills a rectangular void more precisely, however the use of any type of nozzle is not required for this device. The discharge can be a portion of pipe as is used for pumping concrete.

FIG. 13

This shows a highly simplified free-body-diagram of the device, combined with a partial control circuit diagram. The free body diagram is looking downward and shows horizontal components of the combined forces onto the device.

It is presented primarily to show that the structure is stable, in this case within the horizontal plane, with only the set of linear actuators supporting the panel, and that the sliding torsion link 214 (FIGS. 14 and 15) is independent of panel support other than orientation in the defined plane. In other words, the panel can be driven by the actuators only, with each acting as an adjustable strut. If the panel horizontal orientation did not matter, or if it was a circular shape, the torsion link would not be necessary to the panel function. Accordingly, it is not present on this free body diagram.

In this 2D model, the imposed loads are the pressure P from concrete placement and the friction F from lateral movement. While P may be of greater magnitude, F is more complex to resolve, because of eccentricity. Of the 2D model, the two resulting theoretical strut elements (horizontal component) are each labeled 206', and their points of contact to the arm, which are pin connections, labeled A and B. Points A and B have a mean average position which is approximately the theoretical end of arm location 202, The force to A and B is from the concrete placement line pressure and temporary fluid pressure of the concrete in place, P, has shared reactions of approximately P/2 at both A and B.

The lateral force F is resisted by shared reactions between A and B, with each having reactions of approximately F/2; and the rotational force created by the eccentricity E between the line of force F and point 202, can be resolved because of the distance between A and B. This separation allows the stability of support for panel 220, and the rotational force F*E is resolved by the coupled reactions RFA and RFB, with the magnitude of these reactions is inverse to the distance between A and B. The vector sum of these reactions resolved along the line of each strut 206' is used to determine the working load that is required of each actuator to position the panel 220.

FIGS. 12 and 13

As 3 points define a plane, where the device has 4 receivers, any 3 of them need have unobstructed exposure to the laser signal at any moment, in order to have sufficient signal information to define a given plane, unless more complex signal input and signal processing is used. As it is common to have temporary obstructions from various objects that may be between laser and receiver, at least one redundant receiver is beneficial. Of course there can be additional receivers. Where a redundant number of receivers are finding a signal, there is a risk that the range of tolerance of defined plane for all is not identical, and that conflicting actions are made.

Besides including appropriate feedback signal systems to prevent damage to the device, it is also a simple measure to design sufficient flexibility into the panel 220 so that it can warp slightly out of plane, without damage and within tolerances of the concrete wall surface defined by the device. This literal flexibility can allow simpler signal processing, in that simple separate feedback loops can be created, where each given receiver 228 sends its signal to its adjacent actuator 206.

A solution is required when any receiver 228 is blocked from the laser plane, in that the corresponding actuator 206, does not know what length to be. If the actuator without a signal is redundant, it may tend to force the panel 220 out of the defined plane, possibly causing damage. Accordingly, any given actuator not receiving a signal needs to be provided with a replacement signal based upon integrated processing of the other receivers' signals; alternatively that actuator needs to have an ability to allow free motion when its corresponding signal is not present—though the latter solution requires the panel 220 to have the strength to manipulate an actuator that is not receiving a signal, on top of the normal loading from concrete placement operations. The former solution to this is shown on a schematic diagram in FIG. 13, where a receiver 228 is shown sending its sensor signal 227 to a system processor 230. The processor 230 evaluates what each of the actuator lengths should be, based upon the information received by the receivers having exposure to the laser defined plane 227, and sends that response signal 231 to a hydraulic control system 232, which is a manifold system controlling hydraulic fluid flow to each actuator 206 as needed, whether or not the receiver corresponding to that actuator has access to the laser plane 227.

To allow corrective action to be taken where the device 200 has reached its limits of motion and so will not be able to continue to define the plane of concrete, a feedback system is required. One version of this is where each actuator 206 is provided with positional sensing, and sends a positional feedback signal 236 to processor 230. Algorithms in processor have a point of determination where an alarm signal 237 is sent out. This signal can be one to an audible alarm to notify operators, or to the concrete pump control switch to stop concrete flow. When the arm system 248 is repositioned, or the arm system 201 is reindexed, or the problem is otherwise resolved, the concrete pumping can continue.

A solution allowing simplified circuit processing and a lightweight panel 220 is to always provide multiple laser control devices 226, so that all of the receivers 228 can be made to always receive the laser plane 227 signal. In this case, where an actuator 206 should be missing a signal, due to out of place equipment etc, then with a controlled delay, the system would sound an alarm, so that operators would understand that guidance is lacking and the obstruction must be corrected.

In the case where GPS/GNSS guidance is utilized for definition of the wall surface, the circuit processing system described above has less relevance, wherein two of a GPS receiver 235 is sufficient for positioning the panel 220, if it is kept in plane vertically with a 2D level sensor 213. This level is the type found in self-leveling rotating lasers used in construction and for the laser control device 226 of FIG. 13, but in this case a delay circuit is suitable as described above. The GPS receivers 235 can also be linked to one or more of a larger GPS receiver, such as on the excavator as is commonly the case with excavator GPS control systems, to increase accuracy and reliability, as needed. This technology is the same as is commonly used for GPS-guided highway wall slip forming. The panel 220 can be fitted with 3 or more GPS receivers in lieu of coordinating with an electronic level, and the level 212 and/or 213 can then be omitted.

Alternatively, all of the actuators of the screeding device 200 can be numerically controlled by enhancing the arm 201 control system, so effectively converting a 3-axis (minimum) robot to a 6-axis (minimum) robot. This approach avoids a need for any laser, GPS, and/or electronic level guidance, but it requires employment of an appropriate digital model of the concrete structure, with necessary dimensional corrections made for the geometry of the device 200 described here. These added axes allow the added articulation, so that a non-gantry robot that is so-modified, is able to both extrude and screed the concrete.

FIGS. 14 and 15

The top view, FIG. 14, cuts a section through the device at the top part of the panel 220 and through the nozzle 70, while the side view, FIG. 15, cuts through near the edge of the panel 220. The panel 220 construction can be of a non-stick assembly described previously, backed with a steel sheet in the range of 3⁄16" (4 mm) thickness, or aluminum or fiberglass sheet in the range of 3⁄8" thickness; with reinforced areas as necessary for higher load points. The concrete wall 7 construction is underway with the near side of the wall having a surface of concrete 1 defined by this device; and a far side of the wall being defined by the presence of a backing plane 8, which can be of a panel of rigid foam left in place for insulation, a removable panel repositioned as necessary, an earth embankment, a waterproofing panel, or a mirror image of this same controlled screeding system—with or without pumped concrete placement, or another screeding device disclosed herein, etc. There is concrete being placed 3 by a pump, over previously placed concrete 4, with reinforcing bars 5 in place. The concrete placement and screeding process is progressing from left to right, leaving a finished surface of concrete 2 on the left just outside of the left screed wing panel, while the right screed wing panel 224 is rotated back, allowing the nozzle 70 to place concrete closer to an obstruction, such as an inside corner of the wall (not shown).

The wing panels 224 are each positioned by a linear actuator 234. This is a 2-position toggle control system where each actuator positions the wing in the plane of the panel 220 in the deployed position, and approximately perpendicular to it in the retracted position. The location of a wing in the retracted position can be used to define a perpendicular wall, or it can be retracted simply to allow closer positioning to that perpendicular wall (or obstruction). The actuators 234 must be positioned to provide this 90 degrees of rotation for each wing, and this may require the connection at the wing to be relatively close to the hinge 225. This increases the load on the wing as it has surface area that largely cantilevers beyond the connection point, so the wing structure and hinge attachment must be designed to accommodate this loading. The actuator 234 attachment to panel 220 must be to a projecting element rigidly attached to panel 220, such as that part of the torsion link 214.

The collar 204 is driven by a sprocket gear 203 that is driven by a step or servo motor (not shown here) having a drive gear 205, which is the type found on engine starter motors. This motor action is controlled by a signal originating from the level sensor 212 (FIG. 12), or by GPS receivers, etc, as described elsewhere. A universal joint 218 connects torsional articulation of collar 204 to sliding torsion link 214. The universal joint can be that of automotive-drive scale, but it must have the ability to swing sufficiently while transmitting rotation, and this swing angle should be greater than 45 degrees, and is preferably closer to 60 degrees. This potential limiting factor can be mitigated in that the required amount and rate of torsional adjustment are both small. The only purpose of this torsional system is to keep the panel approximately level.

The sliding torsion link 214 preferably has the ability to adjust in the direction normal to the wall. The primary reason for this is to have the means to correct for variations in distance between the arm location 202 (FIGS. 12 and 13) and the laser defined plane 227. For robotic arms, there will in practice tend to be at least a minor discrepancy between a theoretical digital model and a field-defined laser plane. For a manually operated arm, of course there will be significant variations between these, and so the effective range of movement of the link 214 (and actuators 206) should be in the range of half of a foot. For entirely digital control of this device, based on a digital model, as a 6-axis robot, the link 214 does not need to slide at all; there can simply be a welded or bolted connection from the panel 220 to the universal joint 218. Where the link does need to slide, the design here is where a link tube 215 is fitted to slide within a receptor tube 216. Both of these are of square steel tube section, with wall thickness in the range of 1⁄4" (6 mm)l. The fit between them is preferably made with a bushing of UHMW-PE material, or the like, on all 4 bearing surfaces, so that less frictional force needs to be resisted in adjustment of actuators.

The actuators 206 are shown as hydraulic cylinders, double acting in that they provide working force in both directions; as this loading is relatively low for hydraulics, pneumatic cylinders can also be used. They can be ball screw actuator systems with servo or step motors, if the systems are protected sufficiently from contact with concrete etc. In any case, then must be able to perform in an environment that can be wet and dirty, and always involves concrete. The points of connection for each actuator requires 2-axis rotation. At the panel 220 this can be with a pin connection 207 in pivot bracket 208 for one axis, and with installation of a toggle fitting 211 as is used with marine rigging, for the other axis. These toggles must be of a geometry/stability that does not collapse in compression. At the collar 204, the 2-axis rotational connections can be a pin 207 in a pivot fork and stem 210; this is a high-strength steel unit having a pivot stem that extends into the interior of collar 204, to a bearing tube 217, for required support. The fork and stem 210 and its bearing connection surfaces can be case-hardened steel material such as is utilized for excavator pin connections, but smaller in size; or they can be of sealed automotive bearings pressed into the collar 204 and bearing tube 217. Alternatively, the stem fitting can have a single plate in lieu of the fork, where a fork on the actuator 206 makes the connection.

Generally the hydraulic pressure system operating the arm 201 or 248 will be sufficient to also operate the device 200. For this purpose a means to connect the hydraulic manifold/controller for the device 200 to the hydraulic pressure system of the arm. Where necessary or beneficial, a stand-alone hydraulic pump and pressure system can be utilized, per conventional practice. All the loads are dependent upon the overall size of the panel 220, and this can vary greatly per variables such as concrete mix design, additive dose, rate of placement, strength of supports, and whether vibrational consolidation is used. The panel dimension horizontally of the portion supporting concrete leaving the discharge opening should extend at least about 12" in that direction, and the portion below the discharge opening should extend downward at least about 8", or further if vibrational consolidation is used, so that it extends at least about 8" below the vibrator tip. The dimensions can be much greater, such as triple the arbitrary minimums given here. The dimensions both above the discharge opening and in the direction of lateral movement of the panel are less essential to temporary concrete support, so are not critical to the device, but can cause access issues if they are too great. A main purpose of the wings 224 is so provide extra panel surface where it is beneficial, and to remove it where it is not.

FIG. 15

The screed lid 222 provides protection to mechanisms from overflowing concrete, etc, but the presence of that surface and the wing panels 224 can significantly block access to the laser plane 227. To prevent this, the laser receivers 228 can be modified to extend beyond these obstructions. In the case of the lower receivers, this extension makes them vulnerable to impact, so the extension structure should be strong enough to receive some impact, while flexible enough to not break.

The arm 201 or 248 can also be that of an articulating boom that is used for delivery of concrete by pumping, commonly known as a "boom truck". A boom truck has the necessary boom motions, a powerful hydraulic control system in place, and conveniently also has a concrete pump and pump line to deliver that concrete to the end of the boom. In the case of device 200 attachment to a typical such boom, there will generally need to be a means of mitigating or dampening the oscillations that are common to such booms while concrete is being pumped. The boom can be one built heaver than normal; vibrational compensating or dampening devices can be added to the boom; or the concrete pump itself—or the pump line—can be modified to dampen the pump surges that tend to oscillate the boom. Alternatively the device 200 can be built with the necessary amount of motion to compensate for the boom oscillations combined with boom operation positional discrepancies. The total amount of action required for this correction is in the range of about one foot.

FIG. 16

This shows a very simple version of a rigid placement and screeding device 240. The rigid device is utilized in combination with an excavator arm 248 or similar. The simplest version of this device provides no positional control of the screeding surface 220, so in this most primitive case the concrete surface being defined is entirely up to manual control of the equipment operator. This low cost device is suitable where a concrete wall surface does not need to be precise, or where the surface is expected be re-screeded manually, or if it is to be a faux stone wall, etc, that can have surface irregularities. Device 240 also serves well for the construction of sloped concrete embankments, in combination with a tilting bucket attachment, discussed below.

The rigid device 240 has a rigid pipe conduit 246 that can be clamped into place between an excavator bucket 242, and a thumb device 244, which is a very common attachment to excavator arms. The controlling mechanisms for those elements are not shown, for clarity. These can vary; the most common is where the bucket 242 rotation is linked to another link arm (84 of FIG. 21), then to another link to the bucket, to increase its range of rotation. Any similar means of clamping rigid device 240 to an actuated arm may be suitable. The conduit 246 is heavy-duty enough to not collapse while being pinched, so is of material such as 3" schedule-40 steel pipe would be a reasonable minimum. It must be of an inside diameter of at least that of the inline mixer 19', this device having a number of an adjustable mixing vanes 238, disclosed previously, which in this case is combined with an elbow fitting, which can be of conventional concrete pumping hardware. This elbow fitting can also be a reducer fitting but placed in reverse, so that for example a 2.5" pump line 17 is increased to a 3" or 4" pipe for conduit 246. This diameter increase is to prevent any line blockages related to the effects of the inline mixing modification to the concrete, and because the device 250 can be handled by heavy equipment, the increased weight resulting from larger diameter pipe is not a problem.

Between arm 248 and bucket 242, there can be an articulation attachment 249. This can be an attachment that allows tilting of the bucket (or other attached device), known as a tilt coupler; or one that tilts and rotates the bucket, known as a tiltrotator attachment. Versions of the tilt coupler are made by Amulet Manufacturing Company, 6442 W. Boekel Rd. Rathdrum, ID 83858 and by Parker-Helac 225 Battersby Avenue Enumclaw, WA 98022, and many others. Tiltrotator attachments are manufactured by: Engcon, Industricentragatan 4, 833 93 Stromsund, Sweden, and Rototilt Inc, 22 Morton Avenue East, Brantford, ON N3R 7J7, Canada, and many others. These attachments allow articulation of the screeding panel 220 to align with a proposed concrete surface. If this articulation is combined with a device 240' that includes linear motion of the panel disclosed below; and in this case where that linear motion is normal to the defined plane, the screeding action can continue without repositioning of excavator.

The connections at either end of the inline mixer 19' can be conventional swivel couplings 20, or improvised swivel couplings 360, disclosed below. An admixture line 18 provides a concrete-modifying admixture, and a check valve for that line is shown near the connection to mixer 19'.

The panel 220 preferably has the active non-stick surface system disclosed previously. It has proportions such that there is a greater length in the direction it is being moved from—in this case moving right to left—in that the trailing portion is temporarily supporting the just-placed concrete and so benefits from a greater surface area. The leading portion of panel 220 is shorter to allow visual inspection of the concrete placement, and to allow closer proximity to obstructions and perpendicular walls, etc.

FIG. 16A

The alternative rigid placement and screeding device 240' has a rigid pipe conduit 246' that combines the functions of rigidly supporting the screed panel 220, with the inline injection and mixing process provided by inline mixer 19 or 19'. It is of a length that allows the projected portion of the adjustable mixing vanes 238, and the admixture line 18, to be clear of the clamping action by the heavy equipment holding the device. This device also has the asymmetrical proportions of panel 220, and is drawn with the intended motion to be from left to right as viewed here.

FIG. 17

This is an aerial view of a concrete wall casting process utilizing a backhoe-operated placement and screeding device, in lieu of forms. The vertical orientation of the freshly-placed concrete is made possible due to a rapid-setting concrete mix composition and method previously disclosed. In this example, the concrete wall 7 will be retaining a cut earth embankment 320, and is cast directly against that surface. Normal reinforcing bars 5 are in place; the vertical bars and can be previously cast into a concrete footing, which is not shown. The defined surface of concrete 1 is established and the concrete is placed creating a finished surface of concrete 2.

A concrete delivery truck 300 provides concrete to a concrete pump 302, which pumps concrete through the concrete pump line 17. Simultaneously, an admixture pump 304 pumps a unique admixture through an admixture line 18, and it is injected under that pressure into an inline mixer 19', previously disclosed, which in this case is combined with an elbow fitting, in order to facilitate concrete hose management. Concrete pump 302 and admixture pump 304 are both preferably controlled by adjustments made to a single control box 306, so that flow rates and admixture proportion can be regulated.

A backhoe or equivalent 308, has been set into position for this concrete placement, with outriggers 312 and loader 314 adjusted so that its primary axis 254 (A1) is at a preferred distance from the wall defined surface 1, and is parallel to that surface as practical, so that operation of arm 248, when parallel to the wall, remains at least near that required constant distance from the defined surface 1. This is the same technique that backhoe operators use for digging trenches—to first align pivot 354 with the intended line of arm movement, and so is a basis for the design of attachment 240. As the rigid attachment 240 has no integral positional correction, the accuracy of the finished wall surface 2 is entirely dependent on this careful backhoe setup and the operator's skill.

For use of a concrete placement and screeding attachment having articulation and position control motions, such as 200 of FIGS. 14 and 15, and 250 of FIGS. 20-27, this specific backhoe setup is not required. It is preferable in that it minimizes these required controlled motions of the devices, and keeps these within their effective range of adjustments to maintain surface 1.

In any case, the backhoe operator operates the arm 248 to make essentially consistent lateral movement; in this example provided guidance by a laser control device 226 that can create a vertical controlled laser plane 227. Where the rigid placement and screeding device 240 or 240' is utilized, and the wall surface 2 is then defined by manual control, so the laser receiver can be 228' can be identical to those of simple laser levels, where differing audible signals etc indicate which way to move. The device 200 or 240 or 250 is moved laterally along the wall surface at a rate determined by the concrete flow rate, and then this lateral movement is repeated for the next-higher layer of concrete. The hose 17 management can be assisted with a hose cradle 147', which in this case is attached to an appropriate location on the arm 248. As this process continues, with the surface of screed panel 220 finishing the just placed concrete, an in-situ-cast-concrete wall is built without forms.

Regardless of the type of device used for placing concrete, a good method is to first extend the device to the four corners of a given section of wall, to make sure the backhoe positioning is satisfactory before starting the concrete placement for that section of wall.

FIG. 18

This diagram shows the motions typical to an excavator arm 248 for purposes of establishing nomenclature for these motions, and for the motions added by a controlled screeding attachment 250. Providing that manual operation of the arm 248 locates the device 250 within its range of operation, the it then provides controlled motions that define a predetermined geometry, such as that of a concrete wall cast in-situ. The primary embodiment of the device is where it fits onto the arm of an excavator or backhoe in replacement of the "bucket" that normally exists there, and is connected, and can be manipulated, in the same manner as the bucket.

A reference base 252 is where the support to a primary axis 254 (A1) is attached to earth. An example is where a backhoe parks and lowers its outriggers. The rotation around this axis A1 is manually operated, and indicated as RM1, indicating Rotational Manual 1. The next axis that is perpendicular to this one is A2, allowing manual rotation RM2, and the resulting platform manual 2-degrees, PM2, labeled 256. At the end of PM2 is Axis A3 allowing rotation RM3, so creating platform manual 3-degrees, PM3, labeled 258. The end of PM3, with its motions x', y' and z' all based on rotational action, provides sufficient articulation for operation of the attachment 250. Some excavators also provide translational movement along PM3; this action is helpful but not necessary. In this primary embodiment, the device replaces the excavating bucket 260, which is PM4, with a motion RM4. This embodiment utilizes the articulation system in place for the bucket 260 for additional range of motion about that axis A4, so in effect it is attached to that platform PM4.

FIG. 19

The terminology explanation and disclosure above, for the vertical screeding device 200, is relevant to the following disclosure, and is not repeated below.

This is a schematic diagram of the platforms and the motions involved with the attachment 250, with all orientations arbitrary. The end of an excavator arm is platform manual 3-degrees 258, or PM3 (platform manual 3-degrees). This pins to platform controlled 4-axis 266, or PC4 (platform controlled 4-degree). This axis of rotation is both A4 and AC4 coincident to each other, in that the rotation of PC4 is both manual RM4, and controlled RC4. Perpendicular to axis A4 is axis AC5 which is entirely controlled by rotation RC5 for platform controlled 5-axis, or PC5. The control of PC5, about the combination of axes AC4 and AC5, keeps it in a level orientation, in typical operation. Shown below PC5, perpendicular to it, and vertical in typical operation, is axis AC6, with rotation RC6 articulation platform controlled 5-axis 284, or PC6. In normal operation PC6 is can face in any horizontal direction. To them locate that face at a given defined plane, a translational motion LC7 is provided to a platform-controlled-7-degrees 290, which is rigidly attached to a screed panel 220, which is also platform-controlled-7-axis, PC7. Panel 220 can then be articulated by control mechanisms to continuously define a planar surface as the platform PM3 is manually articulated. The manual articulation must be made so that the end of PM3 is a distance from that planar surface is within the limits of motion of device 250. The manual and controlled actions have components in the X direction that combine, shown as Mx and Cx.

FIGS. 19 and 19A

In this version the control signal originates from a number of a GPS receiver 235, normally with one corresponding to each corner of the panel 220. This can vary. The GPS can directly determine the distance to a predetermined plane. More information is required to determine how to correct misalignment of the panel 220, either vertical adjustment noted as DV, or horizontal adjustment labeled as DH. The system must be able to determine the proportional adjustment required between RC4 and RC5 to correct DV and/or DH. The measurement of the rotation angle of RC6 will provide the required information, as discussed below.

FIG. 19A shows a top view of the relative differences between the direction that arm (248) is pointing, labeled X', and the proper direction of LC7, labeled X, which is normal to the predetermined plane. Axis AC5 is parallel to the direction of X' and is more easily measured. The angle must be able to be measured by registering the rotation RC6, disclosed further below. A4 is perpendicular in direction to A5. Direction X is between these two, on either side of AC5. To correct DV, a proportional response is required between rotation AC4 and AC5, where the correction by RC4 is factored by sin(XA5) and the correction by RC5 is factored by cos(XA5). To correct DH, the correction by RC4 is factored by cos(XA5) and the correction by RC4 is factored by sin(XA5).

For this primary embodiment, the progress of the device along that defined surface is made by manual operation of axes A1, A2 and A3; but the motions about these axes can also have these same types of control systems.

FIG. 20

This schematic diagram is more specific to the geometry of one primary embodiment of the attachment 250, showing the relative orientation of the various axes and platforms. The end of a typical excavator arm 248 is a third axis platform PM3, labeled 258. In this case, a manually operated linear actuator LM4 connects to a end of a pair of a link arm 84 which pivot about axis A4'. The point of connection to link arms 84 is shared by a controlled linear actuator LC4, also connecting to platform PC4. The resulting rotation RC4, about axis A4, to platform PC4, also labeled 266, can be manually articulated with controlled adjustment to rotation. Axes A4 and A4' are parallel. This geometry utilizing link arms 84 is common for improving excavator bucket articulation to allow greater movement. The effect of having both LM4 and LC4 articulating PC4 is that the manual articulation gives the full range of motion, while the controlled articulation provides continuous corrections—maintaining level orientation of PC4 in this case. A level sensor 212-4 is can be the source signal for providing these corrections. This is the type of electronic level device used for self-leveling construction equipment. For this moving platform, damped behavior of the level sensor is beneficial.

Figure 17:
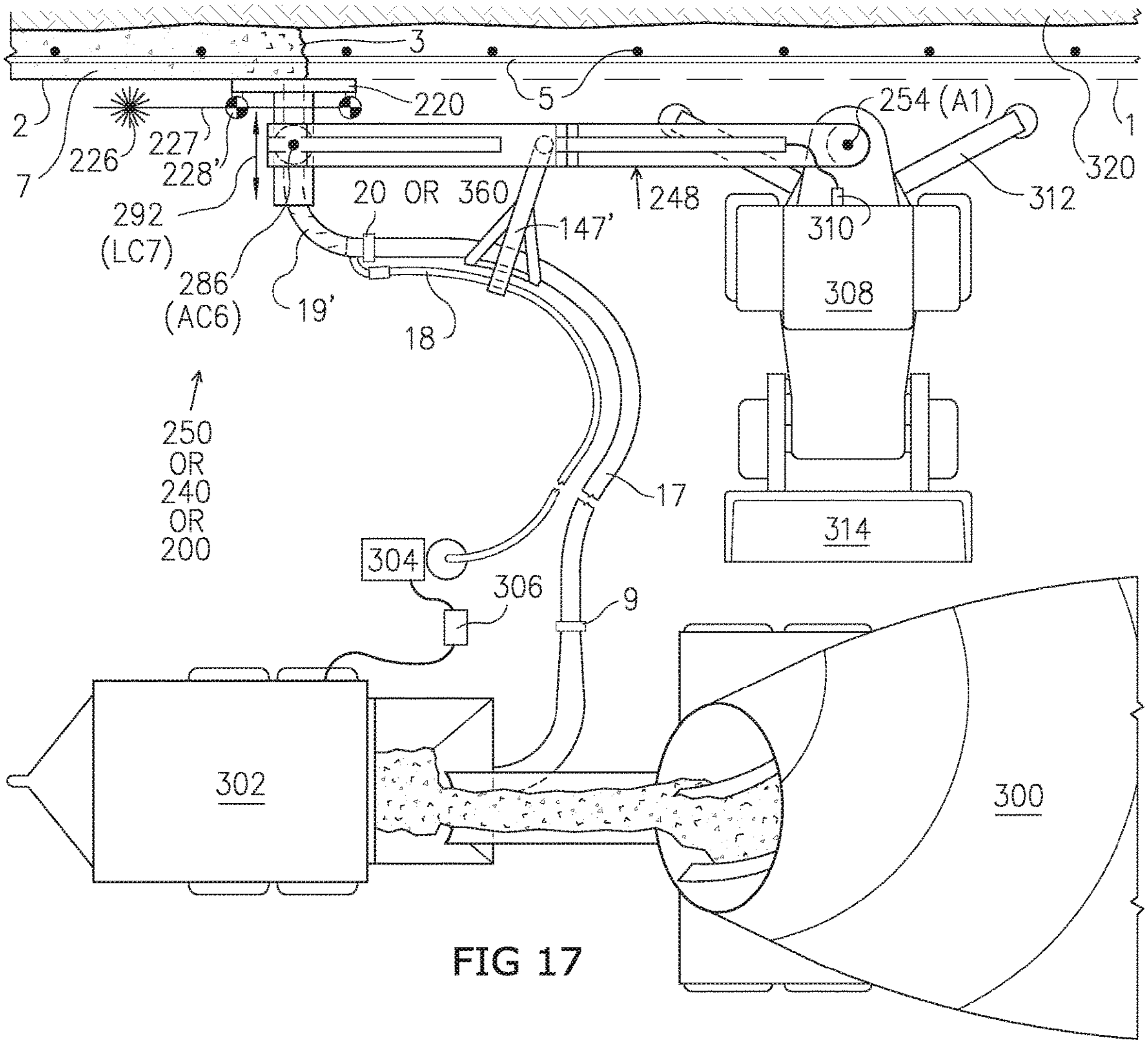
FIG. 17 shows a wall casting process as a backhoe is guiding a screeding attachment.

Centered at the bottom of PC4 is axis AC5, which connects PC4 to PC5. Control of PC5 by rotation RC5 about axis AC5, maintains a level orientation perpendicular to axis AC5. The source for this signal is level sensor 212-5, which can be identical to sensor 212-4. The levels are shown exposed here; they will normally be protected and out of sight. PC5 is a horizontal plane, so that axis AC6, normal to PC5 is vertical. Placing the level sensors, or inertial sensors, on these platforms simplifies the signal processing and avoids a need for positional feedback loops that drive the panel 220, such as per FIG. 17A. This solution provides that platforms controlling panel 220 will be referenced to level when articulating that platform, so that only two locating receivers, such as laser 228 or GPS 235, or inertial sensor, with sufficient horizontal separation, are required steer and translate the panel along a reference plane.

To allow corrective action to be taken where the device 250 has reached its limits of motion and so will not be able to continue to define the plane of concrete, an alarm system is required. One version of this is where position sensing is included with the platforms for their position within their ranges of action, as is typically the case with excavators with grade control systems, and which is the type of feedback system described for FIG. 19A for controlling articulation of panel 220. Or this can be where simple limit sensors are installed. In either case, when any platform has reached its limit of motion, a positional feedback signal 236 is sent to the processor 230. Algorithms running in the processor make a determination that the alarm signal 237 be sent out, which could result in an audible alarm, or in shutting off the concrete and admixture flows. After corrective action is taken, the concrete placement can proceed.

Alternatively, the receivers 228 or 235 can send an alarm signal when they remain out of range when controlled actions are attempting to correct that. Preferably this is redundant to the motion limit signals. This signal must be filtered from those arising from blocked receivers, and the algorithms at processor 230 can be written to distinguish a difference. Preferably this can be accomplished where the receiver's range of reception is increased so that the outer limits of the range result in an alarm signal 237.

FIGS. 21-27 Overview

The controlled screeding attachment 250 attaches to the end of an excavator arm 80 or the like. As that arm end 80 is manipulated, the attachment places concrete according to the arm motion, and also provides automatic control for the definition of that concrete surface, according to the disclosures per drawing FIGS. 17 through 20. This disclosure is for the mechanics of a version of the device where the control systems can be any of those disclosed in the previous drawings. This version is intended primarily for attachment that links that are common with existing control systems for excavators. Typically, one would remove the excavator bucket and replace it with this attachment, and use the same hydraulic controls to manipulate this attachment, and the same hydraulic power system could be utilized to operate the corrective control systems disclosed here. This can be by a common plug connection to the excavator's hydraulic system, that is commonly present on the arm for various attachments. In the case of most excavators, the loading on the attachment 250 is considerably lower than are the design loads for the excavation bucket, so the control mechanisms for the typical excavator bucket can be utilized for the attachment 250. Very lightweight excavators marketed to home-owners etc would require a scaled-down version of the device. Any of these corrective controls can be electrically powered with servo or step motors, or pneumatic cylinders, etc, in lieu of a hydraulic system, should that be beneficial. Where control cylinders are shown on this device they are double-acting in providing force in both directions. Where attachment 250 is hydraulically controlled, that line connection can be made at the unit, or with quick connections that engage when the unit is coupled into place, per existing technology, not disclosed here.

Figure 21:
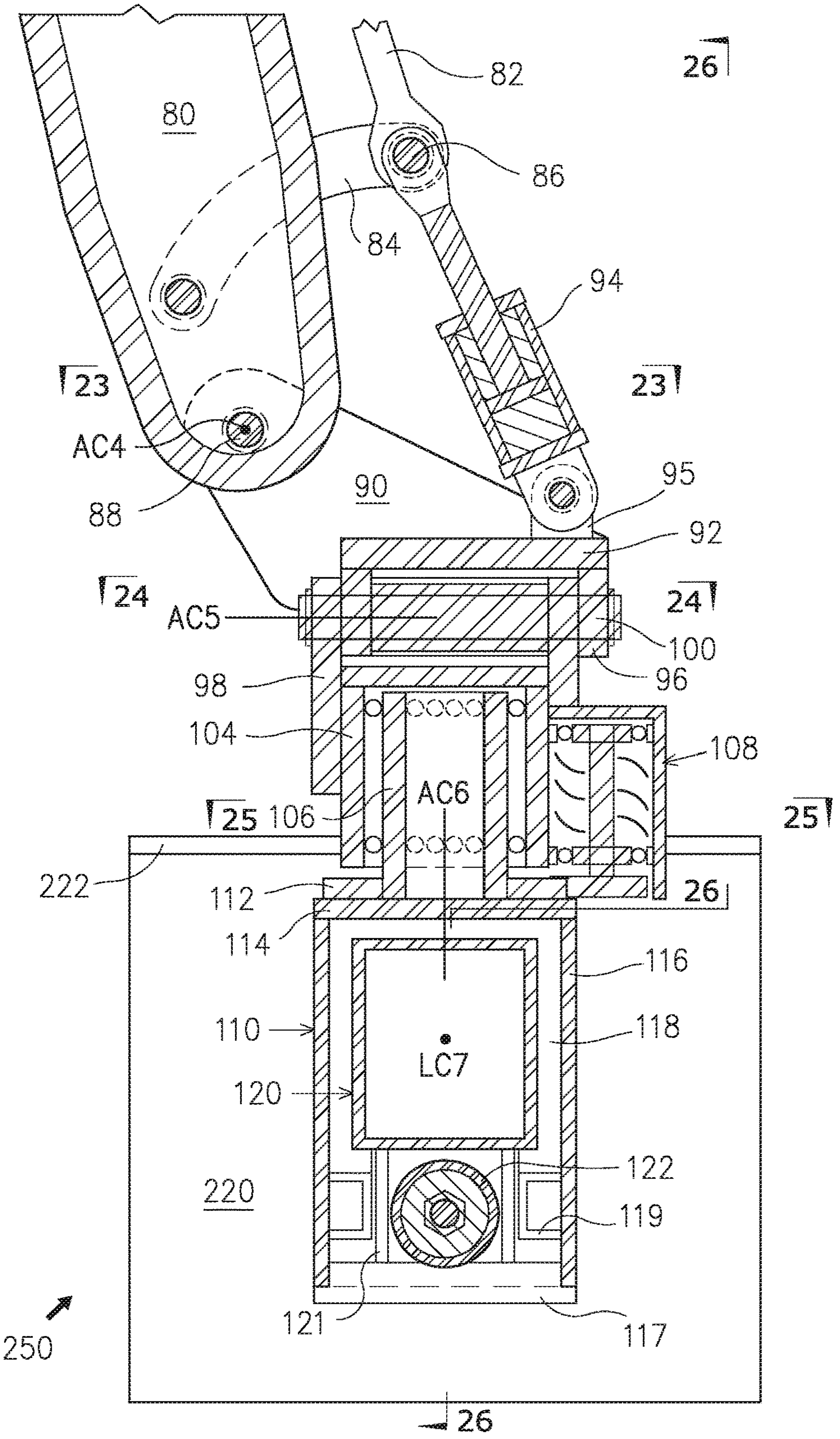
FIG. 21 is a section view of a controlled screeding attachment on an excavator arm.
Figure 22:
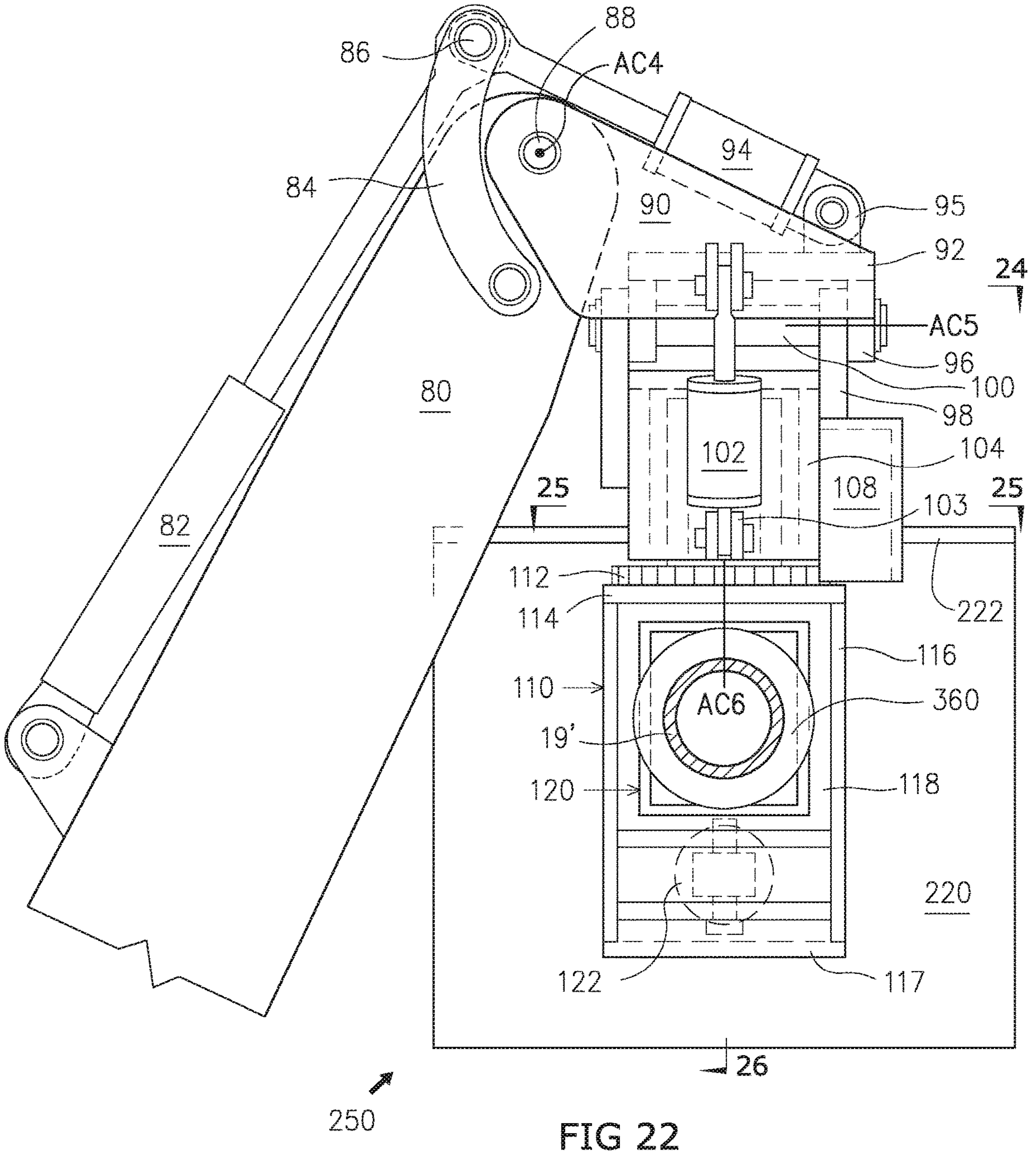
FIG. 22 is back view of a controlled screeding attachment on an excavator arm.
Figure 23:
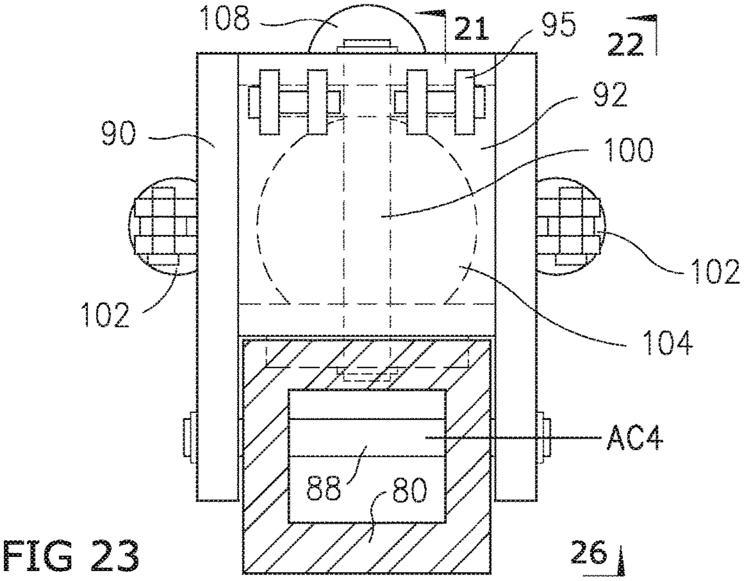
FIG. 23 is a downward-looking section of the device at the arm connection.
Figure 24:
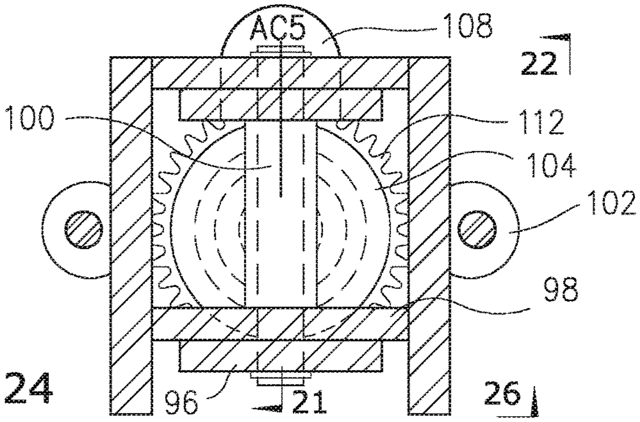
FIG. 24 is a downward-looking section of the device at a horizontal pivot.
Figure 25:
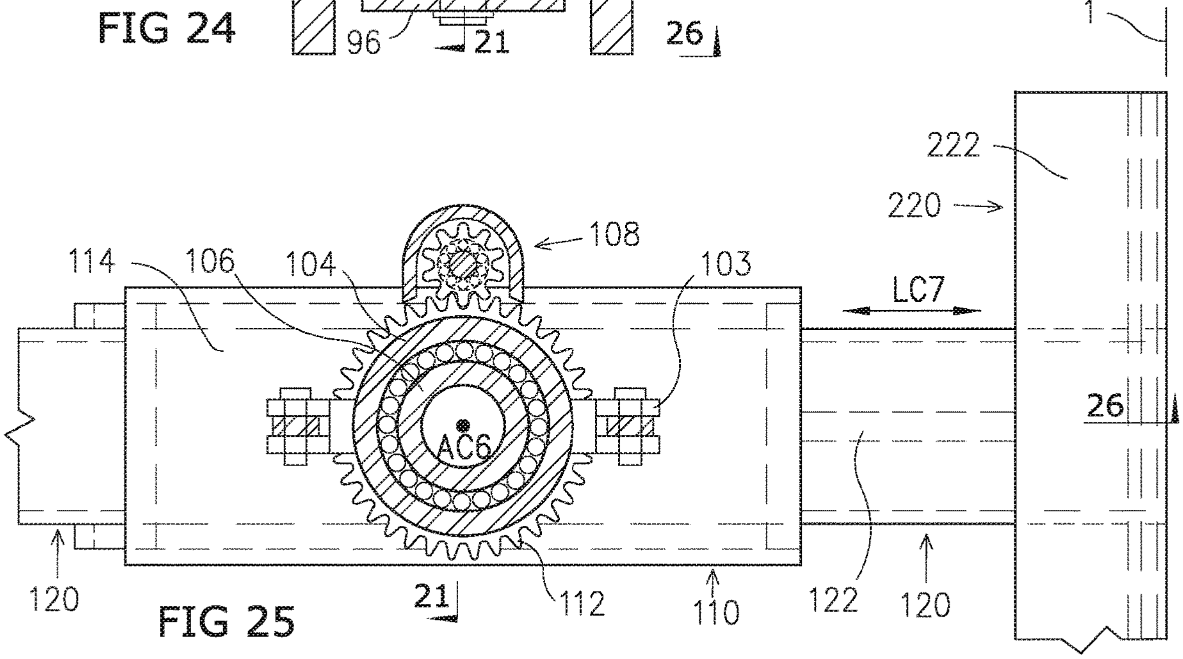
FIG. 25 is a downward-looking section of the device at a vertical pivot.

FIGS. 21 and 22

Figures 26, 27:
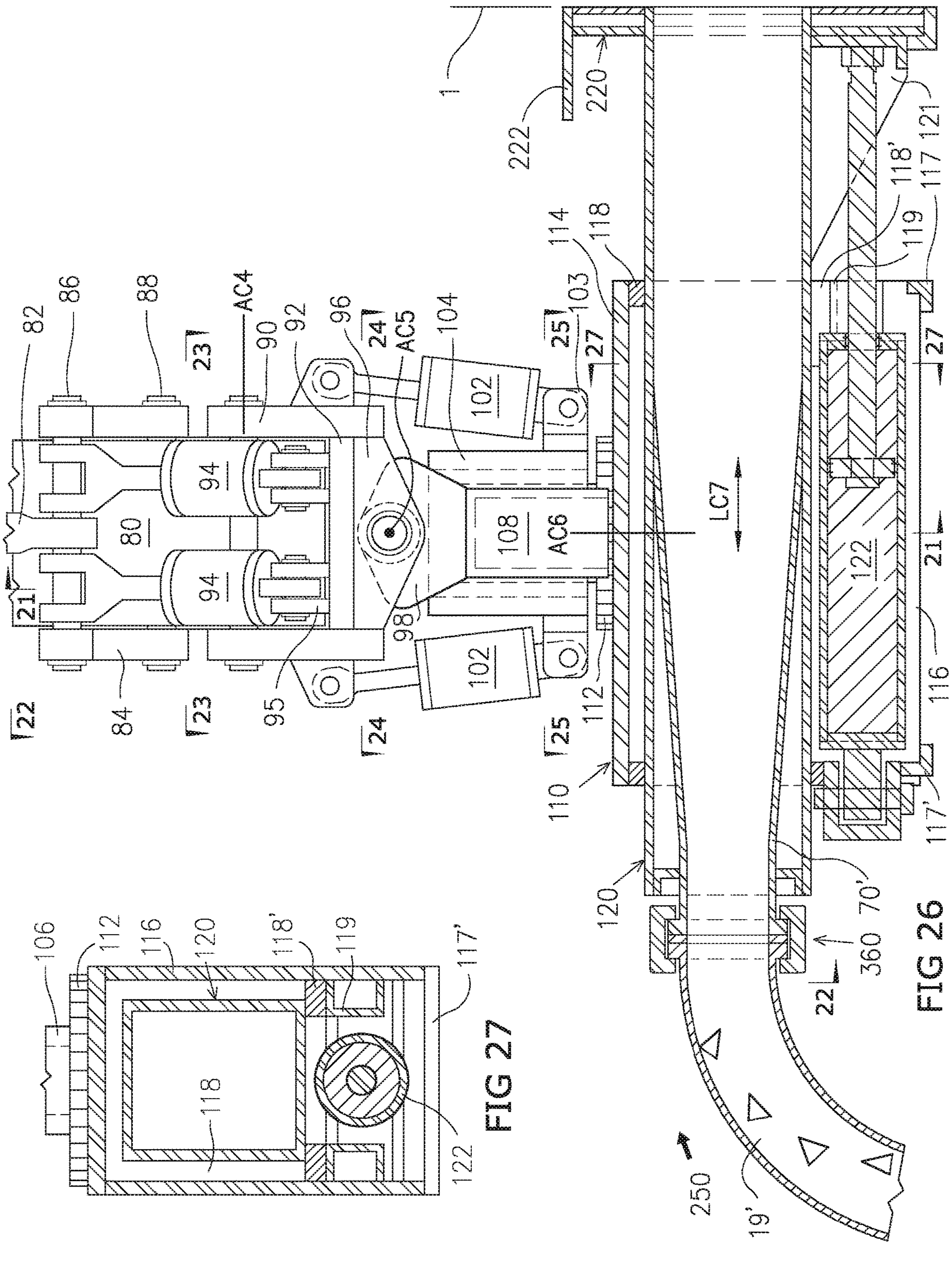
FIG. 26 is a partial-elevation and partial-section view of the device from the side.
FIG. 27 is a partial-section view of the device viewed from the front.

It is most helpful to look at FIG. 26 in conjunction with these figures. The section view (21) is from middle part of the controlled screeding attachment 250, looking in the direction of the discharge end of the device where there is the screed panel 220. The section cuts though the centerline of the excavator arm end 80, and of mechanisms that allow corrective motions of the attachment 250. The device connects to arm 80 with an arm pin 88 which is used for bucket attachment; and with a link pin 86, which pins the excavator's hydraulic cylinder 82 to a link arm 84, which is typical of excavator bucket control. Normally there is a link element that connects pin 86 to the bucket; in this case that link can replaced with one or two of a forward hydraulic cylinder 84. This replacement of the excavator's link element is an optional means of actuating controlled rotation about axis AC4. For this example, rotation of the attachment 250 about axis AC4 is made manually by cylinder 82 and with control systems by cylinder 94. Other variations are to provide signal control to cylinder 82, or to provide one or two of a cylinder 84' that are forward of the excavator link, and so do not replace it. Confinement of this motion to only rotation about axis AC4 is made by two of a mounting plate 90, which are relatively heavy steel plates, in the range of ½" thickness, creating receiving dimension identical that of to a bucket for the excavator in question, and have a bearing surface appropriate to the side loading to attachment 250. Both the plates 90 and a number of a forward connection 95 are attached to an upper plate 92, also of heavy steel, and it connects to two of an upper flange 96, also of heavy steel. These elements comprise platform PC4.

A horizontal pin 100 connects platforms PC4 and PC5, through the upper flanges 100 and two of a pivot plate 98, which are also of heavy steel, but not necessarily identical to each other. Pin 100 creates axis AC5 which is perpendicular to axis AC4. Controls can maintain platform PC5 continuously in a level orientation A hub casing 104 is rigidly attached to the pivot plates 98. It is a cylindrical steel casing for a hub axle 106. This casing and hub axle system can be that of heavy-automotive or robotic equipment that is capable of significant side loading combined with thrust loading. Hub axle is rigidly attached to a cover plate 114 and a sprocket 112. A gear motor 108 is attached to casing 104 and has a gear that engages sprocket 112, the same as a starter motor engages a flywheel gear. This motor can be hydraulic or servo type, in either case, the rotation of sprocket 112 may need to be registered if required for signal control, if sensors are only on the panel 220, per disclosure of FIGS. 17 and 17A. In any case the rotation cannot be endless because of attached control lines, so a stop at under 360 degrees maximum is required; unless a centered swivel connection is created for the control line.

The cover plate 114 is the top component of a lower assembly 110, which is platform PC6, and can face any horizontal direction, controlled by its attachment to hub axle 106. Lower assembly 110 is made up by two of a side plate 116, and two of a support channel 119, and related elements disclosed below. These elements provide supporting surface for a number of a sliding bearing 118. The sliding bearing can be of solid abrasion-resistant and low-friction UHMW-PE, or PTFE, HDPE, Nylon, or the like, provided at each end of the lower assembly 110, to provide support for all four surfaces of a delivery tube assembly 120, which is the last platform, PC7. A perimeter of the solid bearing material is fastened about the interior periphery at each end of the assembly 110. A hydraulic cylinder 122 provides the controlled linear motion LC7 to the delivery tube assembly 120, which has the panel 220 rigidly attached at the working end.

Two of a gusset plate 121 are rigidly attached to panel 220 adjacent to the attachments point of cylinder 122, and as they need to extend into the confines of lower assembly 110, the periphery of sliding bearing 114 material and so interrupt the support for the bottom of assembly 120, hence the portion of bearing material on each channel 119 must extend over a longer distance. Typically the bearing surface should be in the range of ¾" wide (contact area), but at this critical location it is preferably several times that amount of bearing "width" to provide sufficient bearing area. As grit from concrete placement will abrade these bearing surfaces, the solid bearings must be replaceable.

Discussion of FIGS. 22 though 31 avoids redundant text information even where related drawing item labels are provided.

FIG. 22

This view is in the same direction showing the exterior. A difference is that the excavator arm 80 is angled upward rather than downward. Both positions are drawn to show the necessary clearances. For example, the manually operated cylinder 82 must be activated to rotate the link arm 84, so the device can have a maximum range of motion about axis AC4. Cylinder 94 is offers only a limited range of motion in that the link it replaces is relatively short. Alternatively that original link can be left in place, and automatic control can be provided for cylinder 82. Alternatively a front control cylinder can be located where it pins to that link and to platform PC4.

FIG. 23

This section looking downward at upper plate 92 is made primarily to show the actions about axis AC4 that goes through the arm end 80. The section though cylinder(s) 94 is omitted to show their connection 95 to plate 92. The lower assembly is omitted for clarity.

FIG. 24

This section is made just above axis AC5. This shows a length of pipe about pin 100 fitted between the upper flanges 06 and the pivot plates 98, which is in place to lower prying loads on these elements. Cylinders 102 provide the rotation about AC5. Below is the sprocket 112 and the gear motor 108.

FIG. 25

This shows the mechanics about axis AC6 and action LC7. It is the hub axle 106 that extends down to support both the lower unit 110 and the delivery tube assembly 129 which includes the screed panel 220, and the loads imposed on that. Accordingly the hub axle, its attachment to the lower assembly, and its sets of bearings supporting it must all be sufficiently strong to withstand these eccentric loads without excessive deflection. Hub connection to cover plate 114 can be strengthened by combining that with the connection of sprocket 112. Side connections 103 rigidly attach to hub casing 104. A screed lid 222 returns back from panel 220 a distance that does not reduce the range of motion of LC7 before lid 222 interferes with any appendages on casing 104.

FIG. 26

Much redundant info is omitted here. This shows a front view of the upper pert of the attachment 250 and a section view down the center for the lower unit 110 (except sprocket 112) and the delivery tube assembly 120, including the screed panel 220. This design has a pair of front cylinders 94, plumbed to work in parallel, because the limited space allows only a smaller-diameter unit. Also two cylinders 102 are shown, one on each side, working in a paired unit. They are plumbed so that the extension port for one is paired with the retraction port for the opposite, and visa versa. The rotation about axis AC5 can be done with a single cylinder, but as space is tight for a larger cylinder and loading on the unit is lower with the working pair, it is a viable solution.

The delivery tube assembly 120 is made accurately and true enough to be used as a linear actuator guide along its entire length, within the periphery of bearing surfaces 118 at each end of lower assembly 110. Within the tube 120 is a nozzle fairing 70' to make the transition between a standard concrete delivery line at the swivel fitting 360 to the full extent of the rectangular tube 120. The tube is fed concrete from an inline mixer 19' that is combined with an elbow fitting. All these aspects of the concrete delivery that is through the means of linear guidance, and a means of linear guidance that uses the entire tube exterior, are choices. There are many other ways to accomplish these actions, just this example is illustrated.

Side plate 116 extends below cylinder 122 to protect it and so that transverse tie 117 clears below it and does not interfere with gussets plates 112. Tie 117 is critical as nothing below the cover plate 114 at the top connects the across front end of the lower unit 110. The outer end of cylinder 122 connects at panel 220 with a threaded connection to allow a greater range of motion for LC7. The panel 220 is the same composite construction disclosed previously, but in this case it is shown with both the lid 222 and a bottom angle of solid steel—and this can be true for both edges as well. This device will tend to get banged around a lot.

FIG. 27

This section looking back shows the two portions of the sliding bearing 118' that are lengthened as there is less surface to contact with the tube 120. This is because the two gusset plates (not shown here) must fit between the support channel 119 and the cylinder 122. A more precise mechanical drawing will show that the amount of bearing surface is greater then these clumsy patent drawings show.

Figure 16:
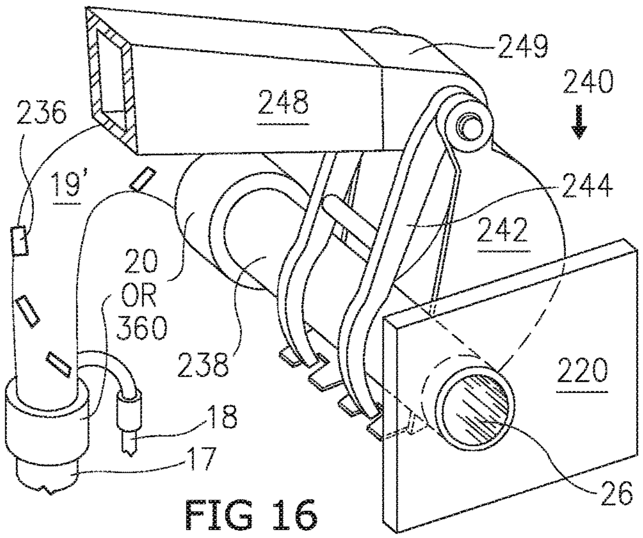
FIG. 16 shows a rigid placement and screeding device.
Figure 16A:
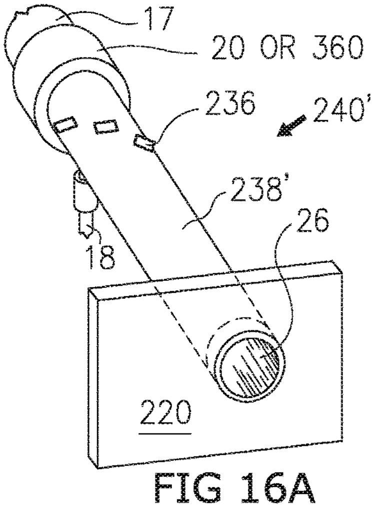
FIG. 16A shows a rigid placement and screeding device with an integral inline mixer.

The lower unit 110, including the delivery tube assembly 120, operating as an independent unit, with only the one linear action LC7, can function for this purpose without the other platforms and rotations discussed. If the independent unit 110 is then clamped or affixed to an excavator bucket (242 of FIG. 16), the control of action LC7 can be made with a single receiver (228 or 235 of FIG. 19). This arrangement will require the excavator operator to provide accurate manual positioning for planar alignment of screed panel 220 to the concrete wall surface, and any non-parallel alignment will cause corresponding inaccuracies of the wall surface definition.

It should be made clear that the axes, or degrees of freedom, shown for attachment 250 may not all need to be present in the device for the purposes of placing and screeding concrete. The tilttrator coupling, and other similar devices that are available, referred to previously, can be combined with aspects of this device, particularly the lower unit 110. The state of the art available rotational couplings are missing as a last motion the linear action L7, and this arrangement is necessary make positional control simple and low-cost as disclosed here, it is essential that the L7 action be at the end of the chain of actions, in that once the articulation of the arm is otherwise accomplished, the positional variations in the arm—present because of an imprecise set of the excavator, varying support conditions, and play in the arm rotational components, etc. The only way to make the resulting corrections required to accurately define the wall plane, without complex signal processing, is to have the site signal control—laser, GPS, or inertial—provide a correction signal to actuators that move normal to the wall surface. In other words, all the other axes of articulation can be manually controlled, with or without GPS guidance (such as Earthworks by Trimble Inc., 935 Stewart Drive, Sunnyvale, CA 94085), the motions of that arm can be combined with the final action L7, to efficiently define the wall surface. When these GPS such as Earthworks systems involve actual control of the arm, they become extremely complex and expensive, so at their present stage of development, would never be cost feasible for this application.

This method has a speed of operations limited by that of the concrete pumping rate, and the loads on this device are relatively very low, so the simpler device disclosed herein is low cost while more functional for the purpose of placing and screeding concrete.

Figure 28:
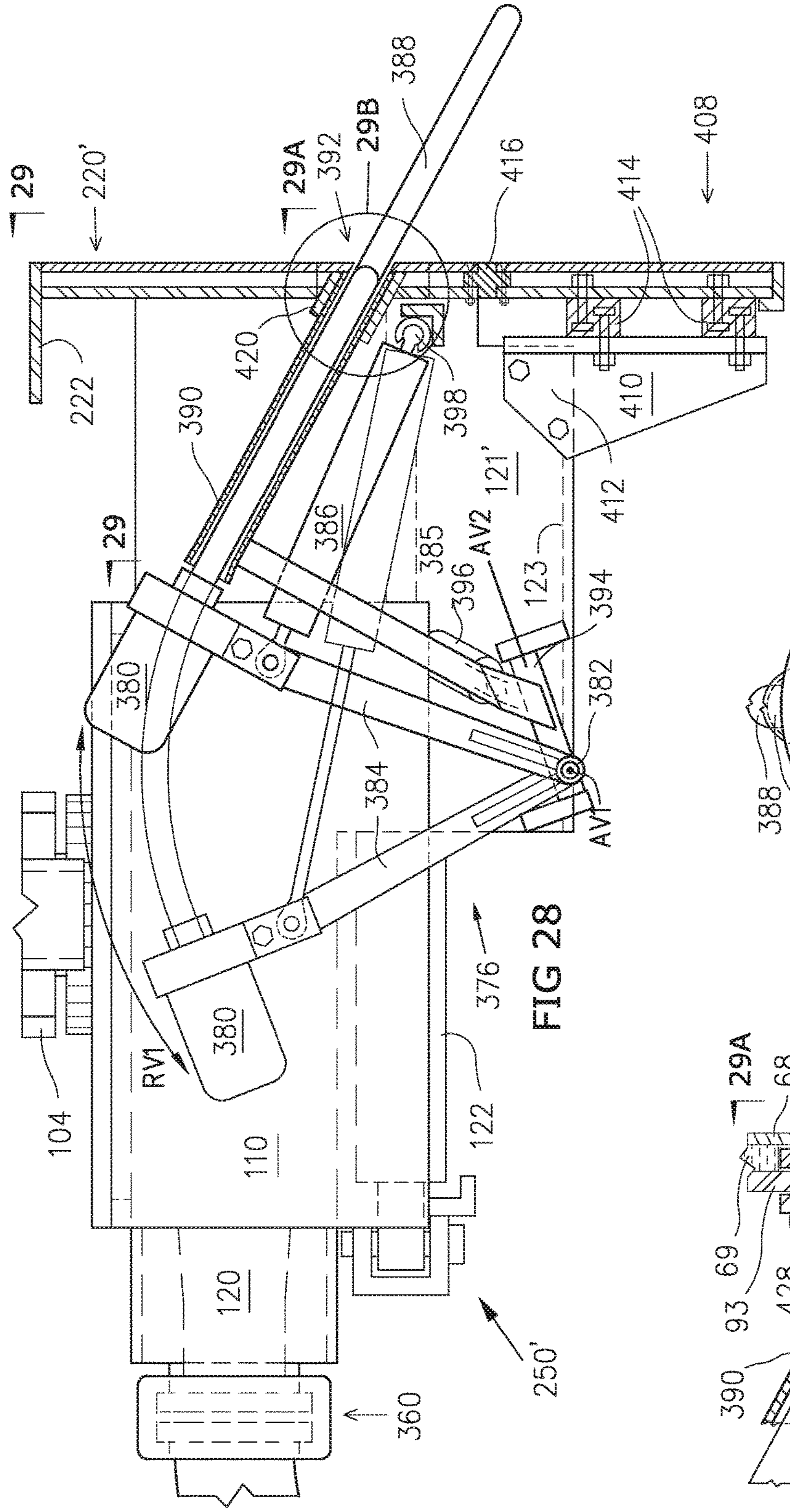
FIG. 28 is side view of the device with an actuated concrete vibrator attached.
Figure 29A:
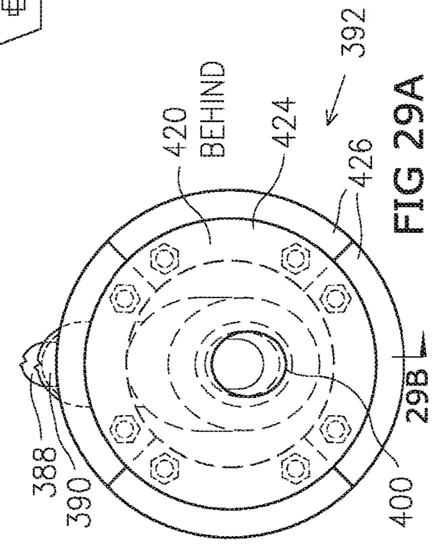
FIG. 29A is a face view of a pivoting insert for the vibrator penetration into concrete.
Figure 29B:
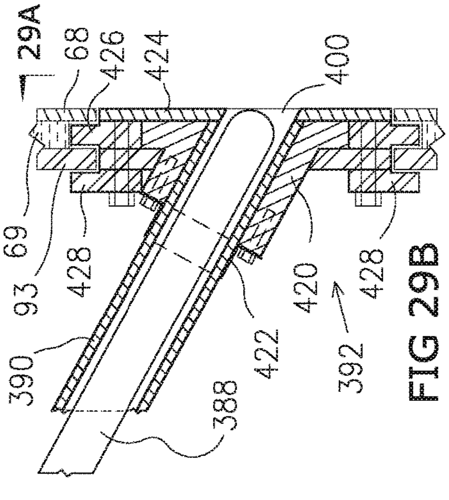
FIG. 29B is a section view of a pivoting insert for the vibrator penetration into concrete.
Figure 29:
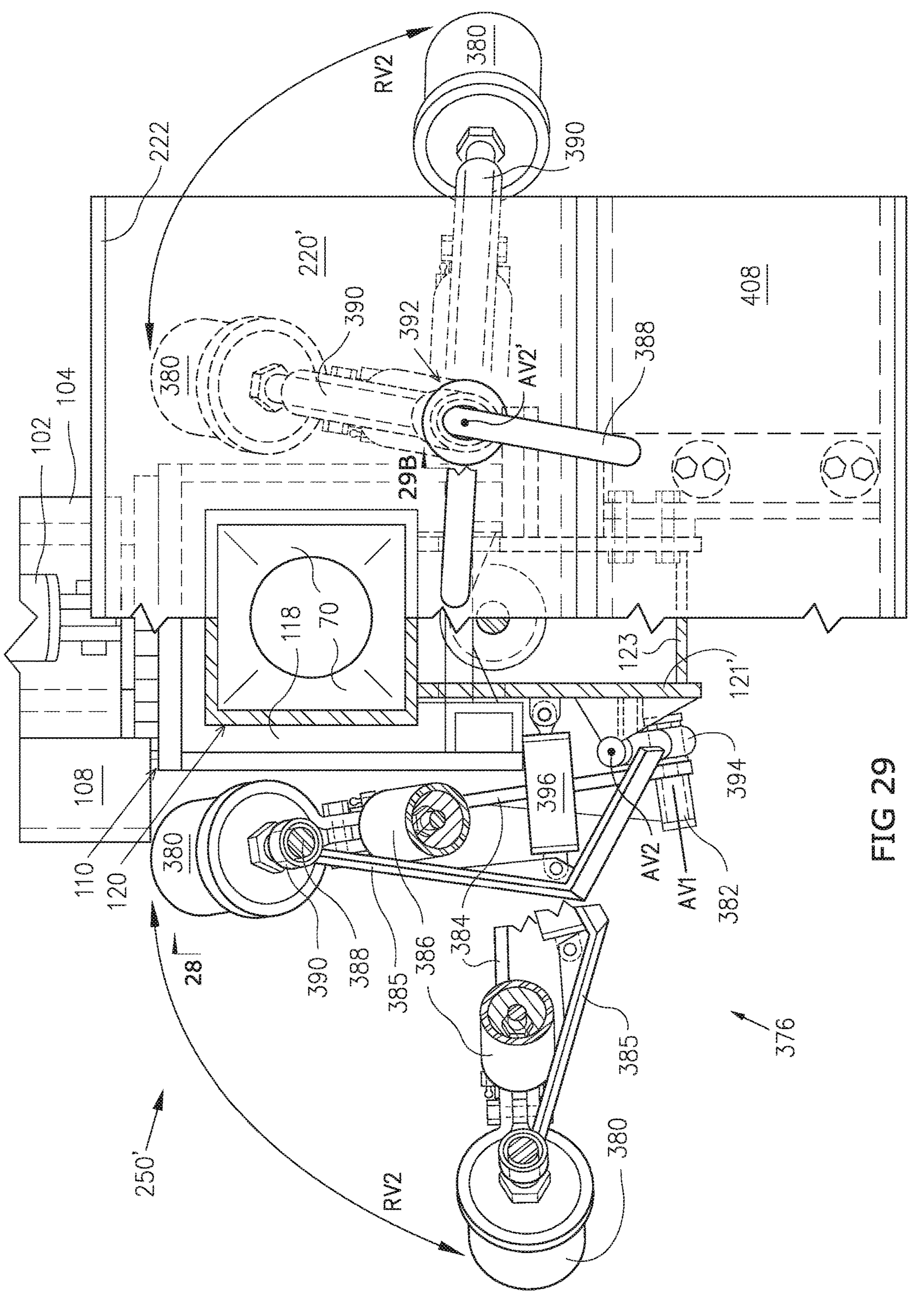
FIG. 29 is a front view of the device showing articulation of the concrete vibrators.

FIGS. 28 and 29

As it is not considered safe for workers to be riding on excavator buckets etc, several versions of a remote-control means of vibrational-consolidation are developed. The shear-thinning rheology control provided by the injected admixture creates a concrete that has a supporting shear structure, yet is very sensitive to vibration, but the range of effect is limited to a controllable zone; so that vibrational consolidation can be achieved without a big portion of the wall collapsing, providing that the vibrating is done where and while the concrete is confined. If the panel 220 itself is vibrated (at a high frequency), the concrete just below it will bulge out of plane; so the panel contact surface needs to be reasonably isolated from the high frequency vibrations. These devices can be combined with video to allow viewing of the concrete placement and consolidation by the equipment operator.

These show two views of a dual-action vibrator plunger 376, with one attached to each side of a modified controlled screeding attachment 250'. Alternatively they can be attached to function in the manner shown to any concrete screeding device or system disclosed. Each mechanism of plunger 376 provides two rotational motions to provide motional control to a plunging concrete vibrator. FIG. 28 shows the primary plunging rotation, and FIG. 29 shows the secondary rotation that changes the direction of the plunge. Both drawing figures carry over some redundant but helpful reference numerals discussed previously, and there are some modifications to attachment 250'. Two differences are that the gusset plate 121' extends at full depth all the back to a point of support for the vibrator axis AV1, and the lower portion of the screed panel 220' is vibrationally isolated from everything else—to avoid slumping of vertical concrete in this area.

As the vibrators are plunged relative to the concrete wall location, so then all the attachments relating to the vibrators must be made to the final platform PC7, which in this case is the modified delivery tube assembly 120'.

FIG. 28

A conventional electric concrete vibrator 380 is shown in both a plunged position and a retracted position. In this case the vibrator has a small-diameter cylindrical tip that matches the flexible shaft body diameter, so that there is compatibility in fitting into a cylindrical plunge tube 390, that has an inside diameter in the range of ⅛" over the vibrator tip diameter. The tube 390 can be of metal or tough plastic, and it preferably has a slightly flared or rounded opening to reduce wear on the vibrator flexible shaft body. The top end of tube 390 is affixed to a pivot arm 385, and the bottom end to an orifice boot 420.

The vibrator 380 is clamped by a swing arm 384 that connects to a primary axis AV1 that is itself attached to secondary pivot bar 394 that rotates about axis AV2. Primary rotation is actuated by a plunge cylinder 386, which pins to arm 384, and requires a 2-axis swivel connection 398 at the anchored end, or a toggle fitting at a pin connection, in that the cylinder has angular motion in 2 axes.

The bottom portion of screed panel 220' is an isolated screed panel 408, which is preferably of the same construction as panel 220, and has the same active non-stick surface system. Along its top edge it aligns to panel 220 with an isolation strip 416, which is an extruded rubber section, of about Durometer Shore A 40 in hardness, preferably an abrasion-resistant urethane material. Strip splines into panels 220 and 408 at the middle portion of their composite construction, but this can vary. Removable fasteners bolt the assemblies together along the splines of strip 416. Support to panel 408 is provided by at least two of a connecting bar 410, each which bolts to gusset plate 121' and connects to panel 408 with at least two of an isolation mount 414. This is that such as is used for mounting equipment requiring vibrational isolation, such as a Type A Cylindrical Bobin Mount 3020GU19, made by AV Products, Inc., 2352 Pendley Road, Cumming, GA 30041.

FIG. 29

This front view of attachment 250' shows the left side cut behind the panel 220', and cuts into the delivery tube assembly 120' as well as the cylinder 386, shown in 2 positions. Assembly 120' is modified as noted previously with the gusset plates 121' extended, and also strengthened with a bottom plate 123 for the loading from the secondary pivot bar 394 and the cylinder 396 attachments. Axis AV1 is attached to the secondary axis bar, 394, and as that bar is rotated about axis AV2, with cylinder 396 pushing arm 385, the resulting rotation of bar 394 also rotates swing arm 384.

On the right side, panels 220' and 408 are shown, with a face view of a rotating orifice insert 392, which allows the vibrator shaft 388 to penetrate panel 220' at the various angles, while supporting the lower end of the plunge tube 390.

FIG. 29A

This face view of the insert 392 shows a facing circle 424, that is preferably of the same facing material of panel 408 or 220. The primary support element behind it is the orifice boot 420, which is of cast urethane rubber, of about Durometer Hardness Shore A 70. It must be solid enough to accept threaded fasteners that attach a circular flange 422 which affixes the plunge tube 390. Insert 392 is keyed to panel 408 by means of three or four of an arc tongue 426 combined with one or more of an arc clip 428. Tongue is made to fit into the middle layer of the composite assembly of panel 408, with adequate space to slide in a circle. The parts bolt together with at least 2 bolts per tongue 426. The insert is located so that the orifice 400 aligns with axis AV2 within the range of flexibility of plunge tube 390.

Figure 30:
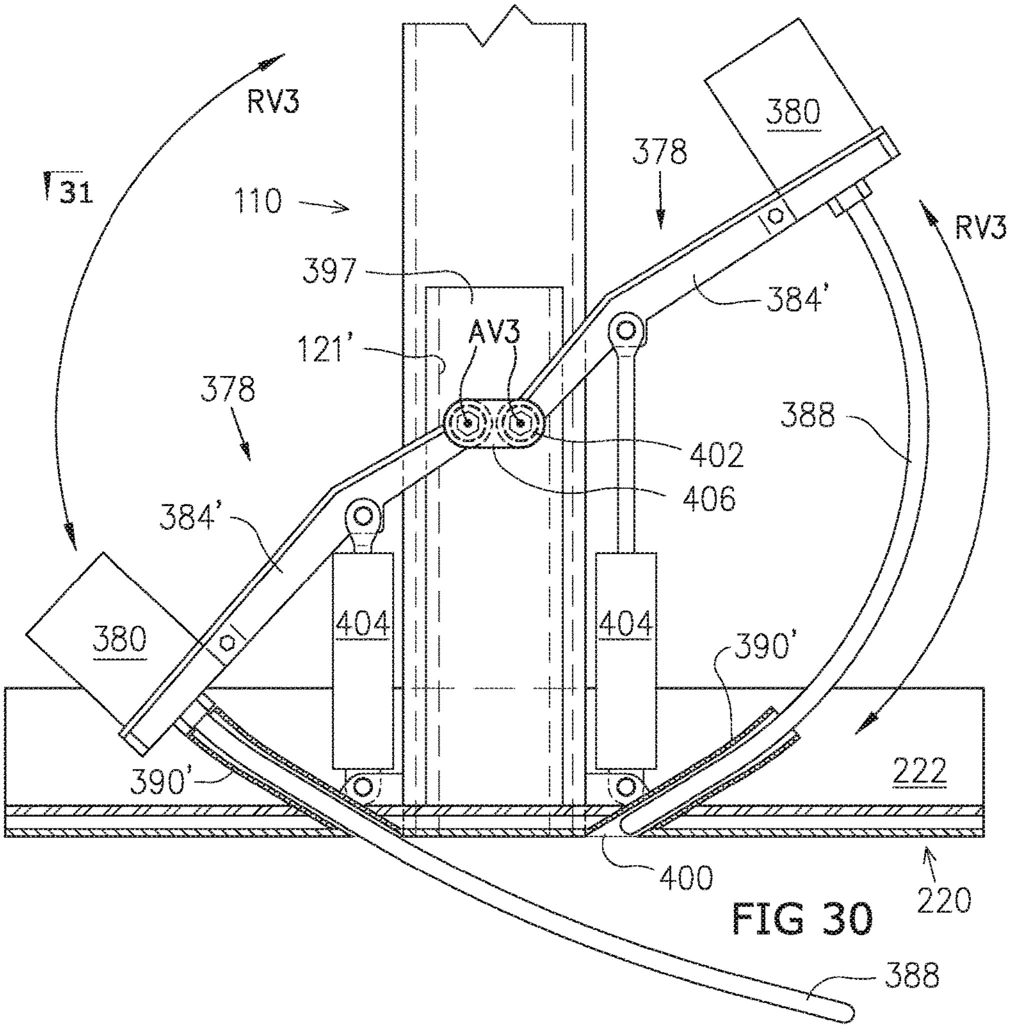
FIG. 30 is a view from below showing actuated vibrators on vertical axes.
Figure 31:
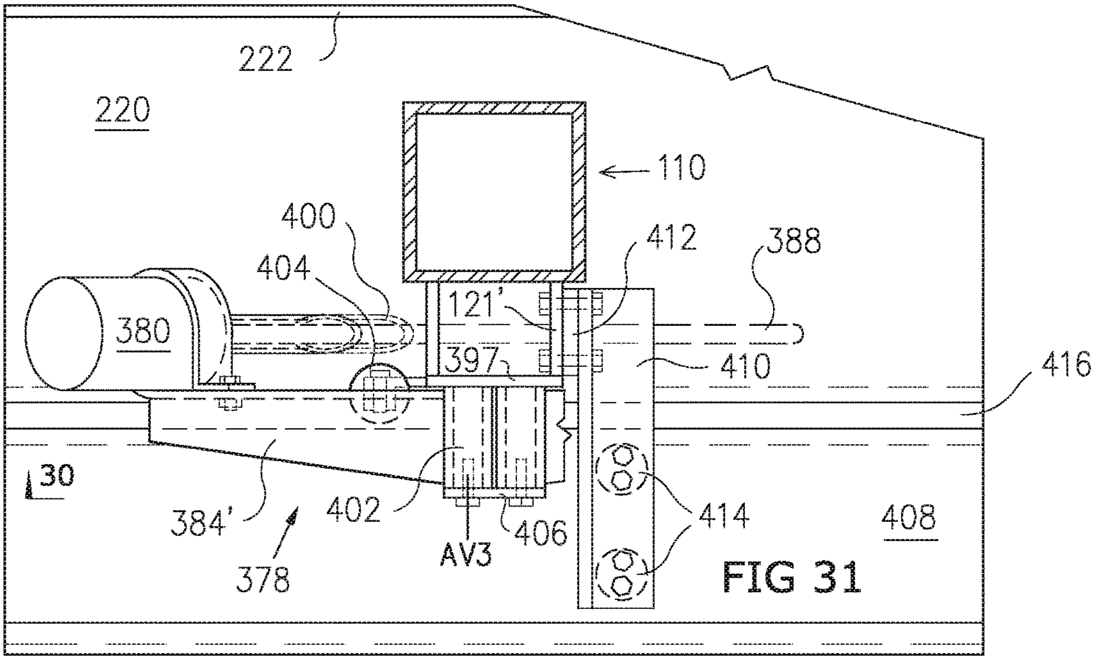
FIG. 31 is view from behind showing one actuated vibrator on a vertical axis.

FIGS. 30 and 31

FIG. 30 is upward-looking view at the bottom of a lower assembly 110, cut through the screed panel 220, where a single-axis vibrator plunger 378 actuates the vibrator 380, in a horizontal rotation RV3 about a vertical axis AV3, one for each side of assembly 110. FIG. 31 is a face view from behind the unit, with the left side showing the plunger, and the right side showing another view of the support for the isolated screed panel 408, disclosed previously. The single-axis vibrator plunger is similar to the previous disclosures, but is modified in that a single axis horizontal plunge, made just below the level of concrete placement, is a simple means of consolidating concrete just placed with that previously placed. Of course this plunge does not have to be exactly horizontal. A benefit of plunger 378 orientation is that the vibrator shaft 388 can be left in the plunged position—streaming away from movement, and vibrating, while the screed panel 220 is moving laterally, so providing continuous consolidation during concrete placement, and avoiding wear on the vibrator motor switch. This plunging device and orientation is also suitable for the other concrete screeding devices and systems disclosed.

Each swing arm 384' is supported at a vertical axis 402, which is substantial enough to provide lateral-torsional stability to arm 384' under loading from a horizontal cylinder 404 and that imposed by the vibrator 380 etc. Axis 402 can be a length of solid steel rod welded to a bottom plate 397 which must be stiff enough for that prying force, and is fitted concentrically with a length of pipe, welded to arm 384'. Arm 384' is affixed to axis AV3 by a link plate 406, affixed by two of a machine screw, one threaded into each rod. In FIG. 30, each plunge tube 390' is shown cut away, to show the fit with the vibrator shaft 388 and the panel 220. Tube 390' differs from 390 is that it must also assist more in support of shaft 388 weight combined with any tendency to buckle under compression load while plunging. The cylinder 404 is relatively lightly loaded and so can be pneumatic or other types of actuators other than hydraulic.

Figure 32:
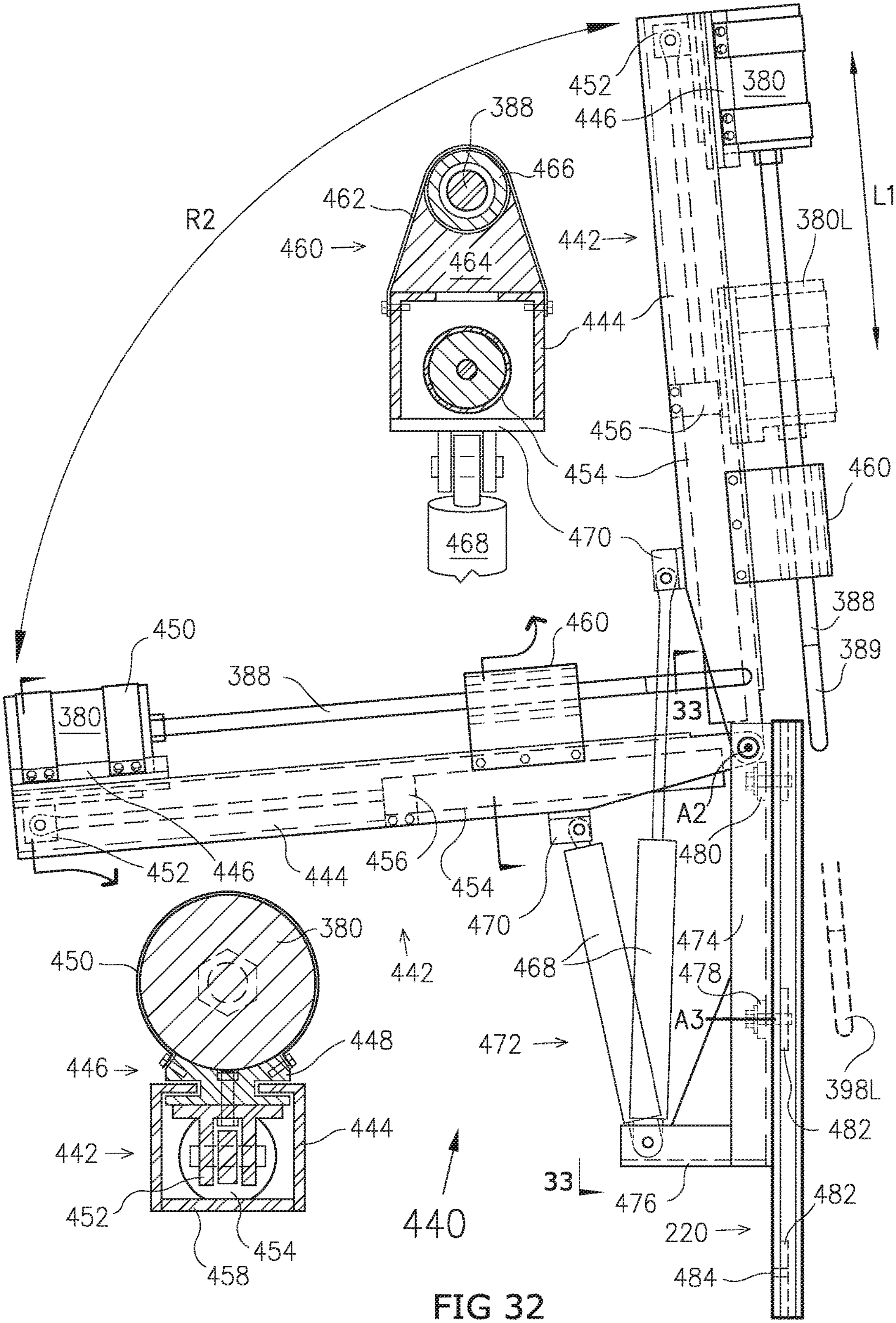
FIG. 32 is a side view of a screeding panel with a linear-plunging vibrator.
Figure 33:
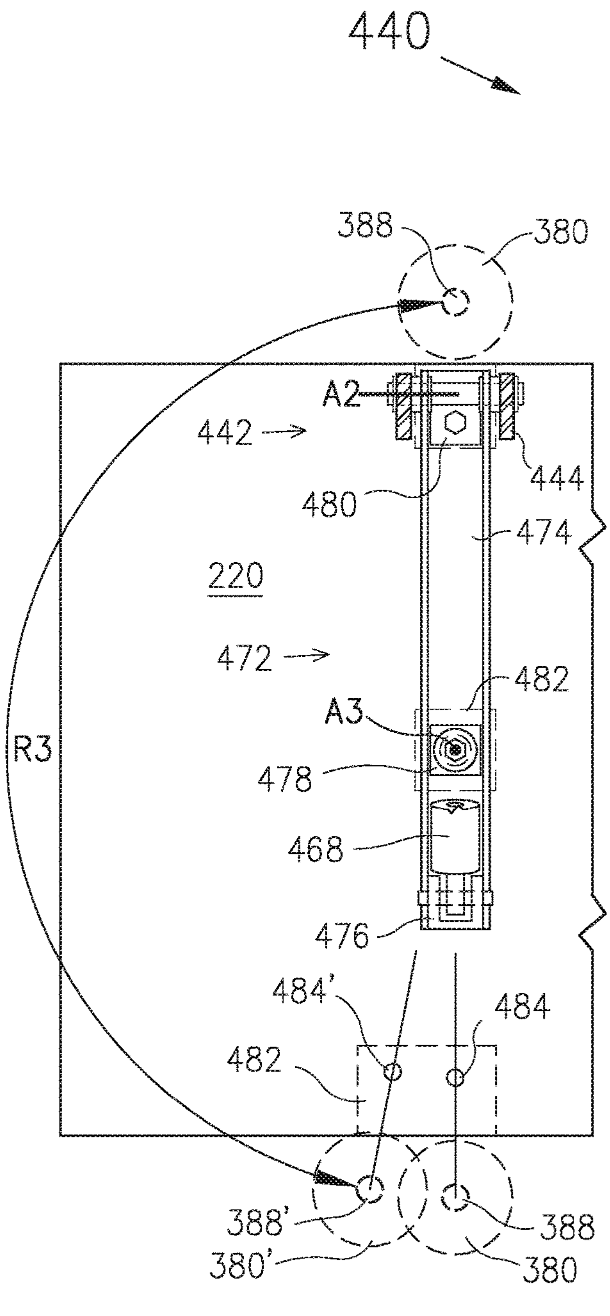
FIG. 33 is a face view of a rotating fixture for a plunging vibrator.
Figure 34:
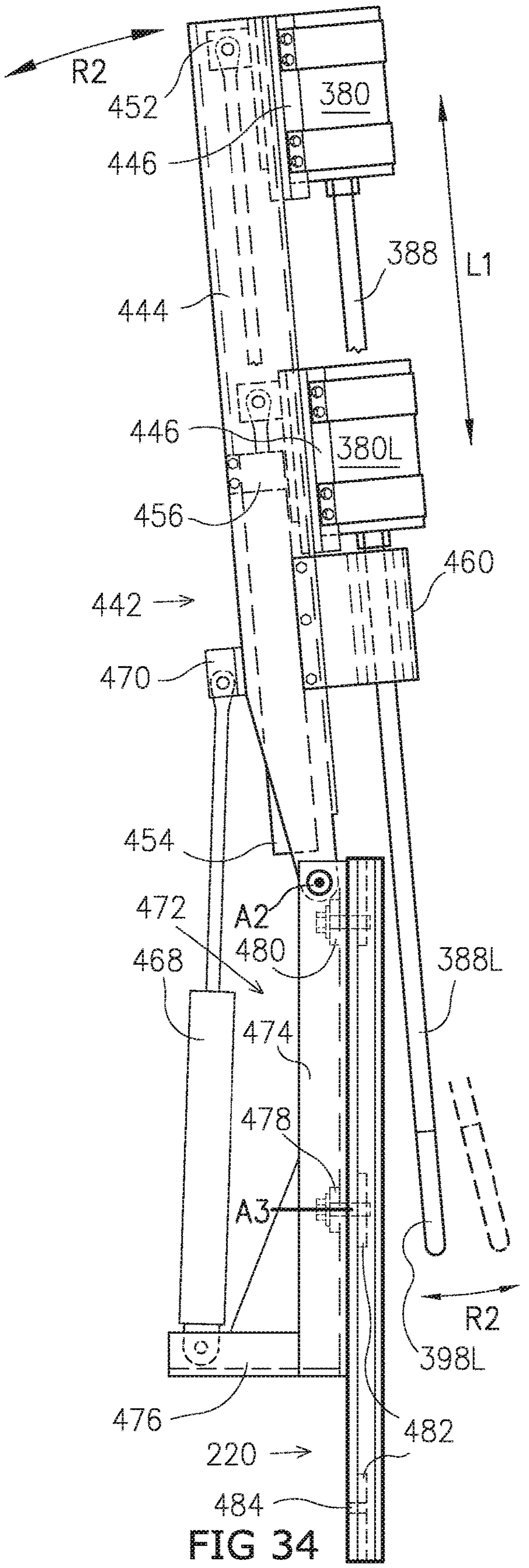
FIG. 34 is a side view of a screeding panel with a linear-plunging vibrator.
Figure 35:
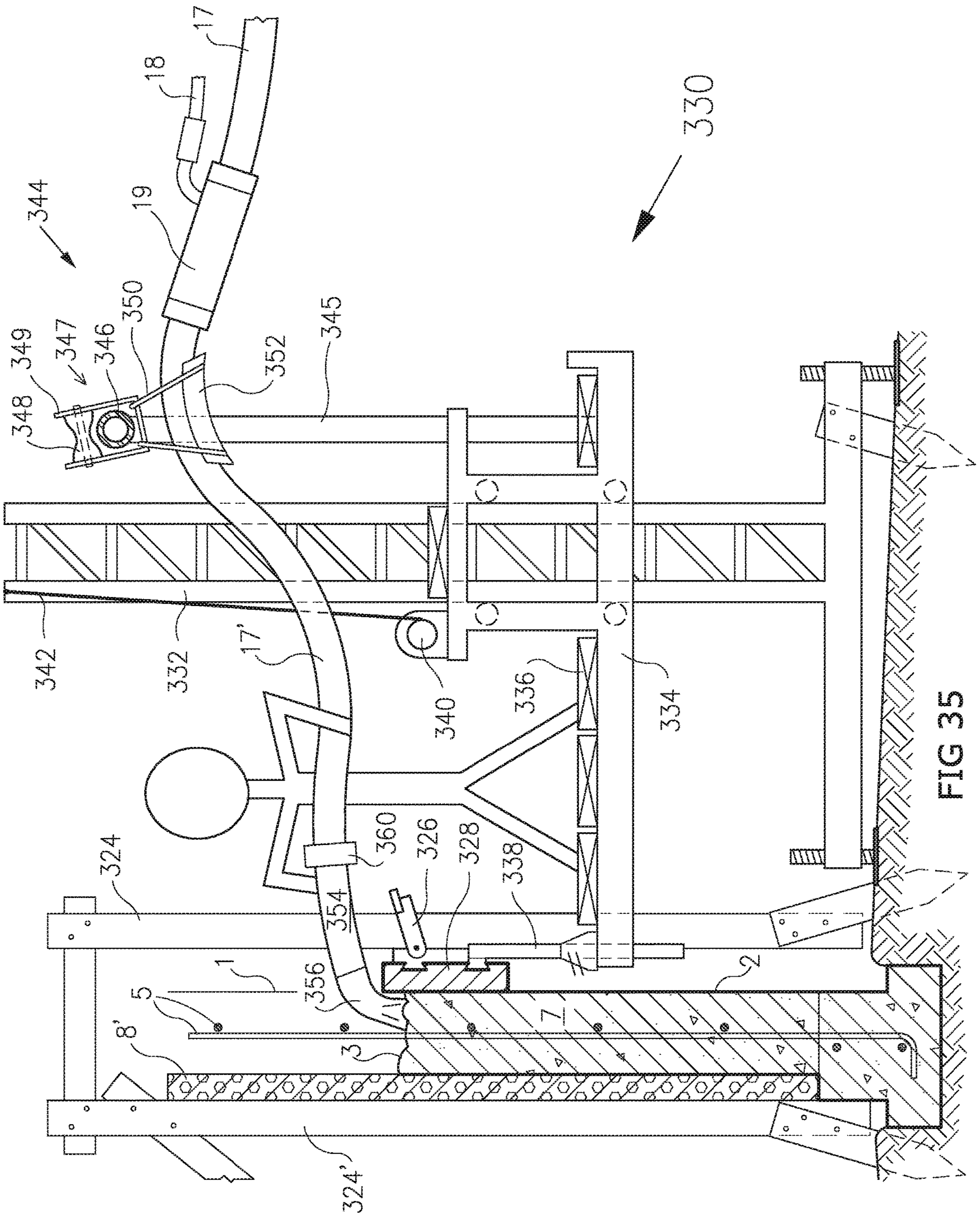
FIG. 35 shows a wall casting process facilitated by an elevating platform.
Figure 37:
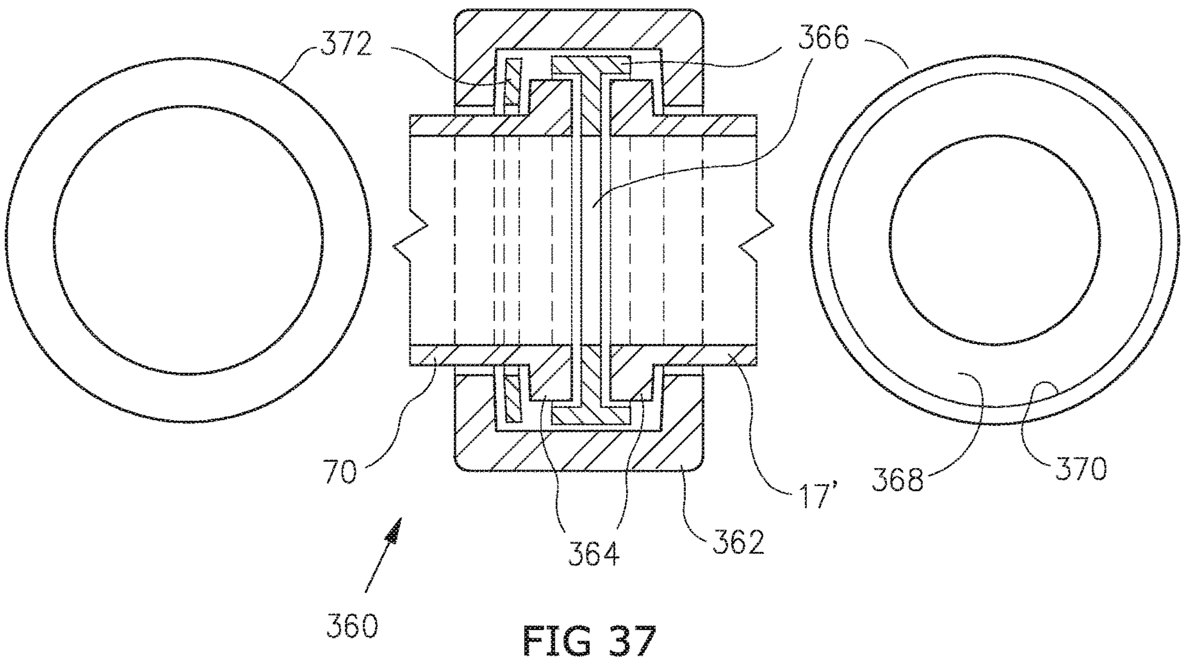
FIG. 37 is a section view of a low-cost concrete hose swivel connection.
Figure 36:
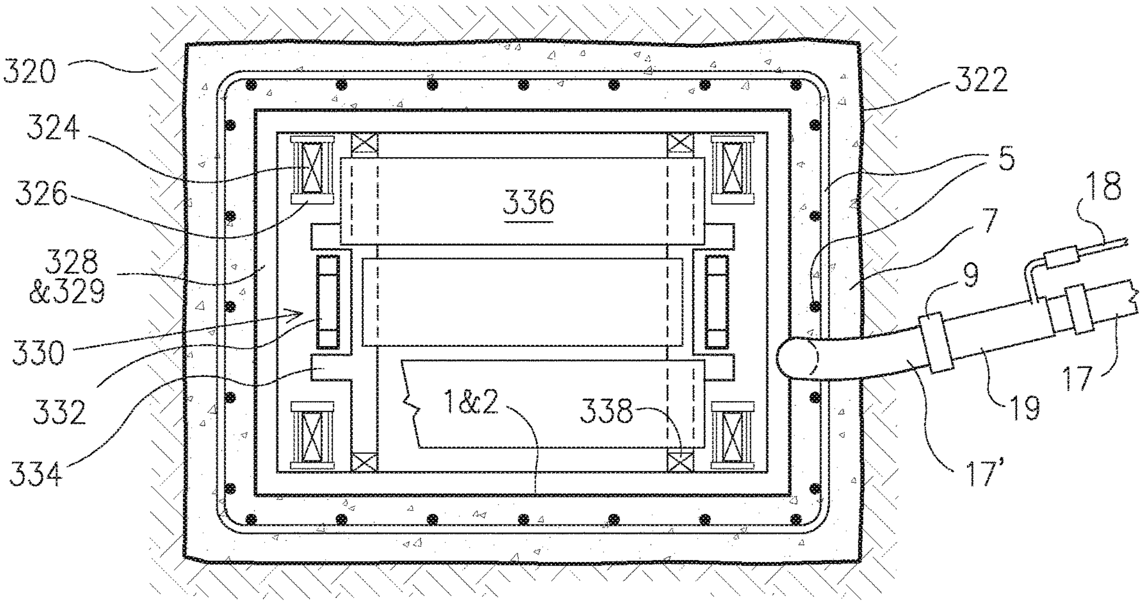
FIG. 36 shows a shaft wall casting process utilizing a guided screed and lifting platform.

FIGS. 32, 33, and 34 Overview

This is a linear vibrator plunger 440 in that the plunging action is linear, shown as linear action L1, coming from above, typically into just-placed concrete. The device also has 2 rotational actions as well, but these are not required for it to function. This device works with the other concrete screeding devices and systems disclosed. Rotation R2 about axis A2 allows the device to lie horizontally while not plunged into concrete, so that the screed panel 220 can move closer to obstructions above, etc, This R2 rotation also allows angular adjustment of the vibrating action to reach further into the wall thickness, or to be set to avoid reinforcing bars. The R2 rotation is preferably controlled by the equipment operator. The third action of the device 440 is rotation R3 about axis A3. The primary reason for this action is to allow the vibrator 380 to operate from opposite edges of panel 220, so that when panel 220 may be one that rotates 180 degrees for geometrical optimization, the vibrator can rotate to the other edge what then becomes the top edge of the panel 220. Rotation R3 is shown as a manual operation made by removing and then inserting a fastener, but this action can also be controlled remotely by the equipment operator per mechanisms disclosed previously herein, or by known technology. The rotation R3 can also be used to redirect the direction of the plunging action.

Linear plunger 440 plunges over the top of screed panel 220 rather than through it, so that the vibrator tip 389 does not have to come into contact with anything other than concrete. This minimizes the transfer of vibrations to panel 220, and allows use of a vibrator 380 having a tip 389 of larger diameter than its shaft 388. These loads are relatively low for hydraulic systems, and so the actuators can all be pneumatic cylinders or ball screws, etc. The vibrator 380 shown is a conventional electric concrete vibrator, but of course it can be a more specialized hydraulic or pneumatic unit compatible with the power systems of the excavator.

FIGS. 32 (and 34)

This is a side view of the linear plunger 440 shown in both the essentially vertical and horizontal orientations. It also shows two section views at key locations. A linear guide assembly 442 directs the linear plunging action of the vibrator. Two of a guide rail 444, that are of a steel angle section, each that extend the length of the assembly 442, to the pin at axis A2. At this point the top leg of each angle is cut away, and the remaining leg tapers to fit only as needed about the pin at A2. Additional thickening or doubling up of the single leg is included here, as required for loading. The pin connection at A2 is wide enough to provide the stability to the assembly 442, and cross bracing elements are added if required, providing interference with cylinder 468 action is avoided.

At the outer end of rails 444 there is a welded on cover plate 458 for maintaining alignment of the rails for an actuated carriage 446 which directs the vibrator for the linear plunge L1. The section view shows the carriage 446 is made up of a carriage extrusion 448, which is of a hard plastic extrusion or machined part, of material such as UHMW-PE, capable of accepting loaded threaded fastening, etc. extrusion 448 clears the leg of each rail 444 generously, such as 0.040" total, as play in this movement is not a problem, and wet concrete and dirt etc will be present while in use. The vibrator 380 is attached with two of a motor strap 450, which can tap into the extrusion 448. A carriage connector 452 bolts to extrusion 448 sufficiently, along with a long base, for the eccentric loading, and has a wide base to help support the extrusion flanges, and a pair of plates to pin to the active end of a linear cylinder 454. The head of cylinder 454 can be clamped to the assembly 442 with a cylinder clamp 456, as lateral movement is not required. The base of connector 452 must clear the diameter of cylinder 454 and the clamp 456 to allow maximum motion of L1.

A plunge tube assembly 460 is attached to rails 444 with threaded fasteners. If needed, it can be attached with isolation mounts. A tube strap 462 is of sheet steel such as 16 gage or 18 gage, preferably of stainless, and it confines the assembly that is of a shaped filler 464, which can be viseolastic urethane foam, of Shore A Durometer 20 or so, and a plunge tube 466, which can be of an abrasion-resistant hard urethane rubber of Shore A Durometer 80 or harder, or the like. Tube strap 462 can also have an additional sheet steel section about tube 466, spot welded to its cover portions, to help confine tube 466, which can be adhered with flexible urethane caulking to the sheet steel surfaces. The result is a device that directs the vibrator shaft 388 as required, but has flexibility to allow ductile deflection of the shaft direction, and dampening to prevent excessive vibrations reaching the panel 220, so that no other isolation elements are required.

FIGS. 32 and 33

A connection assembly 470 can be of welded assembly and be welded to the rails 444. It must span between them for the cylinder 468 loads. The lower end of cylinder 468 attaches to an attachment fixture 472, which also supports the pin for axis A1. Fixture 472 consists of an attachment channel 474, having a projecting channel 476 that pins to cylinder 468, and is given support by two of a gusset plate, as required. Channel 474 attaches to panel 220 at a pivot assembly 478, which is at mid-height of panel 220, so that vibrator has equal reference distance from opposite edges of panel 220, when fixture 472 is rotated 180 degrees. A substantial machine screw creates the axis A3 in being set in a locked manner into a threaded recess, such as 484, having a threaded backing plate 482, and having an oversized heavy washer, but with sufficient clearance to channel 474 when set tight to panel 220, allowing rotation. Where the panel 220 should have a backward-projecting lid, the clearances of this rotating mechanism must be made to clear it.

Connection to panel 220 at axis A1 is made by a connecting assembly 480, where in this case the threaded machine screw with an oversized washer, can be set tight to panel 220 and backing plate 482. Preferably, the assembly 480 is arranged to keep the machine screw in place within channel 474 when it is unthreaded from panel 220, as the same fastener can be utilized at other locations on panel. The alignment of fixture 472 need not be vertical, in that projection of the vibrator shaft 388 may preferably be tilted from vertical, as indicated at the lower part of FIG. 33, where the vibrator is shown in the retracted horizontal position. One or more of an additional threaded recess 484' aligns the vibrator 380 at a preferred inclination. Of course the connection made by assembly 442 can be made with a slot along that radius of rotation R3, and a sliding backing nut, so that incremental angles of tilt are possible, or the entire rotation can controlled by the gear and sprocket disclosed for axis A6 of the controlled screeding attachment 250, or other such available technology for rotational action by remote control. This rotation adjustment can help in compensating for any splay of the shaft 388, or to better locate tip 398, if the vibrator is kept in the plunged position while the panel 220 is moving laterally.

FIG. 34

This shows the plunger 440 with the assembly 442 in the essentially vertical position, to show the plunging action of the vibrator 380 via the carriage 456. The vibrational elements in the lowered position are noted with an L, such as 380L, 388L and 389L. Subtle adjustments to rotation R2 can be made by cylinder 468 to adjust the angle of penetration of tip 398L, for thicker walls or to plunge through a grid rebar, etc.

FIG. 35

This shows a wall casting process facilitated by an elevating platform 330. This can be a climbing scaffold system such as is manufactured by Non-Stop Scaffolding, Inc., 1314 Hoadley St., Shreveport, LA 71104. Their "standard duty" system is sufficient for this purpose. This is two or more of a scaffold platform 334, each guided by a corresponding tower 332, with cross bracing as necessary between towers for stability. In this case the distance between towers can be in the range of 10 feet, or as is optimal for a given application. Each platform 334 is supported by a cable 342, that can be a single run, or two-parts with a pulley at the top. A winch 340 provides a means of raising and lowering the platform 334. The winch is preferably motorized, as this wall casting process proceeds too quickly for the type of manual winch normally used with this scaffold system. The scaffold system also includes safety devices to prevent free fall of the platform should a cable support fail. Support for workers etc is made by a number of a support plank 336. Alternatively a motorized single-mast platform climbing system can be used for this purpose.

The concrete wall 7 geometry is defined with at least two of a guide post 324, where a climbing bracket 326, attaches to a slip screed beam 328, that confines the concrete being placed 3. The beam 328 preferably has an active non-stick surface system, as disclosed per FIGS. 5A and 5B above. These devices and systems are originally disclosed in the previous patent application by this inventor. The beam 328 can be lifted by a lifting strut 338, which can be adjustable in effective height relative to platform 334, with pipe-clamp technology, etc. The defined surface of concrete 1 and the finished surface of concrete 2 are both determined by the location of guide post 324. Alternatively, this plane can be defined by the scaffold platform 334, where the lifting scaffold system 330 is positioned and anchored carefully, so that the towers 332 are a consistent distance from the wall 7. Then the lifting strut can be rigidly attached to platform 334, and so the finished wall surface 2 is defined by the attached beam 328 as the platform 334 is lifted, and the guide post 324 is not required to be set.

The backside of the concrete wall 7 can be defined and supported by a backing plane 8', which in this case is a leave-in-place rigid foam insulation panel, supported by a number of an exterior guide post 324'. Or the support of the backside of the concrete can be made by a portion of the backing plane 8, that is temporary, and is moved for each section of the wall, or it can be the same slip screed beam 324' and system set up for the backside of the wall. The backing plane 8' can be a foam panel with wire-mesh-reinforcing near each face, tied together with welded diagonal wire ties, as is frequently used for wall construction, and the panel 8' can be a building where a full-thickness stucco is being applied in one pass with these methods.

Concrete is pumped via the concrete pump line 17, and the admixture line 18 injects the thickening and set-accelerating admixture into the inline mixer 19, where the now-modified concrete continues though the line 17'. To help with the concrete hose handing, a hose carriage system 344 can be employed. This consists of a travel bar 346 of the length between each, that can be of 2.5" steel pipe or such, and two supports posts 345 of similar material, that are also braced by the platform structure; and a carriage 347 that supports the hose 17' and travels along bar 346. Other support of hose 17, not shown, may also be required. The carriage can be made up of one or two of a rubber roller 348, which is a hard rubber "bow roller" as used for boat trailers, but for this purpose is given a tight-fitting pipe bushing for a higher load capacity, and a steel pin in the range of ¾" diameter. The pipe bushing is made longer than the roller 348, to minimize friction with each of a side plate 349, which can be 3/16" plate steel or the like. Below and attached to the side plates are two of a support bridle 350, of 5/16" 7×7 steel cable or the like. Supporting the hose 17' is a support cradle 352, which is an effectively saddle-shaped stiff-polyethylene-plastic panel, or the like, that is strong enough to support the concrete hose weight, and stiff enough to spread the load over a distance of hose so that it does not kink from the concentrated load. Cradle 352 can be ⅜" PE panel material pressed into the required form and preferably has anchor points for each cable 350, or it can be lighter PE material with 2 beam elements included to spread force from the cables. As the hose carriage system 344 lifts with the platform 334, the heavy hose can always be kept at a most convenient working height.

FIG. 36

This shows a shaft wall casting process, utilizing the guided screed method and the lifting platform, and uses much of the same method and system disclosed per the previous drawing figure. This process would be suitable for the casting of below-grade elevator shafts, etc. An excavation is made, and if it is precise, the concrete can be cast against the excavation, with a waterproofing membrane 322 put into place first. The membrane can be of EPDM sheet material, or such as the Architect specifies, where it is a fabricated unit, having watertight seams, made to fill the void loosely. A concrete slab is then placed at the bottom to provide a working surface for the scaffold system 330, disclosed previously, and as an anchor point for the vertical reinforcing bars 5, and for the guide posts 324, if they are used. Four slip screed beams 328 can be assembled to make a slip screed frame 329, that matches the shaft dimensions. Rigid connections between the beams can be made as required to keep the frame square. The frame screeding surfaces 329 can have the active non-stick system as disclosed per FIGS. 5A and 5B above.

The concrete is delivered and modified as disclosed herein. The frame 329 is lifted as the concrete placement progresses. The lifting of frame 329 can be accomplished by the lifting of the platforms 334, via the lifting struts 338. The guidance of the frame 329 for surfaces 1 and 2 can also be made by the platform 334, if the towers 332 are properly aligned for that purpose, and the struts 338 are rigidly attached.

FIG. 37

This is a section view of a very-low-cost concrete-hose swivel-connection 360, which can be used near the end of a concrete pump line, where the line pressure is relatively low. This improvised swivel connection 360 utilizes the same components of a standard concrete hose couple connection, with two novel differences. The same hose coupling clamp 362 is used to connect a pair of the HD flange 364. The standard soft rubber gasket, sized to seal the connection between the flanges, is replaced with a connecting bushing 366, made of hard low-friction plastic, such as HDPE, UHMW-PE, or similar. Preferably a low friction washer 372, of a reinforced PTFE, or a very tough and low-friction material, or the like, is present for at least one side of the connection. This would then be at the component that more easily rotates. Reinforced PTFE etc is indicated, because the softness of plain PTFE tends to gall as the clamp 362 connection is made. Washer 372 can be installed as part of the fabrication process of a nozzle 70, or the makeup of a hose 17 end, etc.

The bushing 366 is made with a bearing surface 368 and a flanged rim 370. The rim 370 is sized to allow clearance at the outside surfaces of HD flanges of at least about 0.020" total, or so; and to clear the clamp 362 by a relatively large amount, in that the clamp 362 is typically of cast steel construction, without subsequent machining. Accordingly, the clearance at the outside of rim 370 must be determined by a trial for a clamp of given manufacture. The thickness of the bearing surface 368 is also determined by a given manufacture of the clamp, allowing for thickness of washer 372. The washer 372 needs to be kept thin, to allow for sufficient thickness of the bearing surface 368.

FIGS. 38, 39, 40, and 41 Overview

For all embodiments of the vertical screeding device 200 or controlled screeding attachment 250, such as all shown in the previous drawings, where is included substantial vibrational action for the consolidation of placed concrete, a vibrationally-isolated portion of the device is necessary. This is because vertically oriented just-placed concrete consolidates by gravitational force on the concrete while temporarily liquified by the vibration imparted. Any vibrator attached will impart vibration to the device. This can be minimized by the use of a plunging vibrator where the vibration is concentrated at the plunged tip, but when the device is retracted and still vibrating this can make the entire unit vibrate enough to slump concrete below the screeded surface. An embodiment of the vibrationally isolated lower portion of the screed, the isolated screed panel 408 is depicted in FIGS. 28 and 29, where the discussion of vibration begins in this disclosure. In the case where vibrating units are attached to the screeding device in order to vibrate the device itself for purposes of consolidating the concrete, having a vibrationally isolated lower portion of the screeding device is paramount; otherwise the vibrated concrete immediately below the device will slump from that vibration. Then the concrete temporarily confined by a vibrating device will slide out of and below that confined space. The portion of wall immediately below the device will bulge out of plane, if not collapse. A non-vibrating confining surface below the area of vibration is the only way to seal off the bottom portion of the confined concrete being vibrated. Without this feature, a vibrating screeding device, with vibration energy sufficient to consolidate concrete, will not be able to define a vertically oriented concrete surface. The more extreme the vibration imparted to the concrete in the temporarily confined space, the more quickly the concrete consolidates, and so the faster that concrete placement can proceed. My testing has found that the efficiency of the vibrational consolidation is the critical path to the placement quality and also the placement speed. In other words, the speed of concrete placement by these methods, using inline rheology modification, is not limited by imparted rheology, or pump capacity, but by the efficiency of the consolidation process in the very limited time that concrete is temporarily confined. The more effective the vibration, the faster the screed can move, and the more solidly the concrete is placed—with less tendency to subsequently slump.

Figure 38:
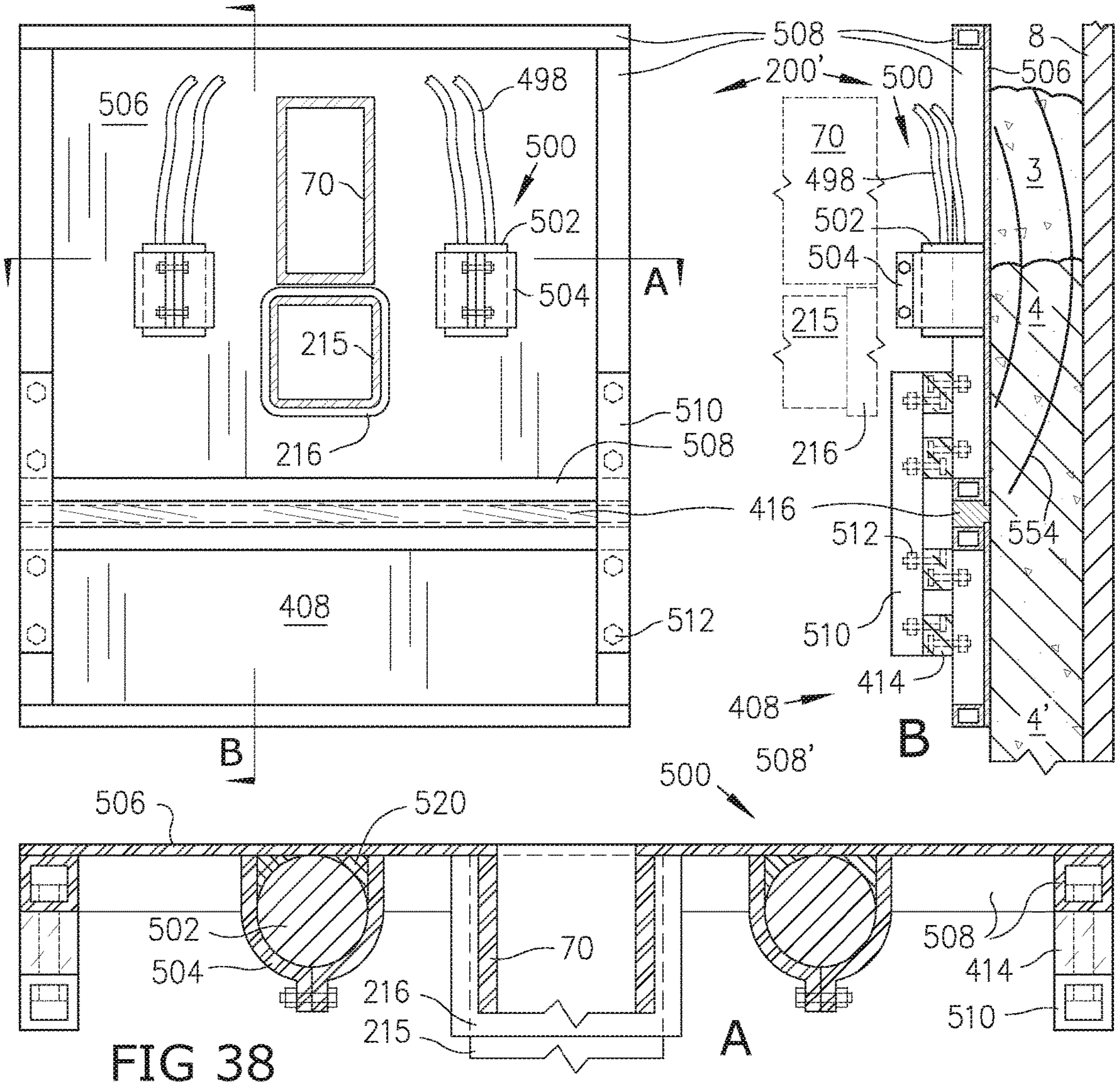
FIG. 38 Including Sections A and B shows a vertical screeding device modified to include attached vibrators.

FIGS. 38 though 41 show some variations of screeding devices having vibrators attached for the purpose of externally imparting a vibrational force though the screeding face and into the concrete, by means of flexible diaphragm action. This system is designed to maximize the consolidation effect of an externally vibrating diaphragm. The device supporting linkages as well as features of retractable side panels and active non-stick screeding surfaces are not shown in these drawing figures, for clarity. These types of features can all be included in the direct vibrating embodiments; please see previous disclosure for that information. These drawings show the device 200, the embodiment that is articulated by a set of lineal actuators, but the present vibrational and isolation features also apply directly to the variations of device 250, as was shown previously. Any of the internal vibrator systems disclosed previously can be combined with the external diaphragm vibration system. A combination of external and internal vibration can be an optimum system in that the external vibration can be designed to primarily benefit initial consolidation of the concrete, while the internal vibration can be designed to primarily remove remaining air voids and improve bond with previously placed concrete. In this case, the preferred vibrational frequency of the external vibration would differ from that of the internal vibration. Typically, the external would be of a lower frequency than the internal. It is known in the industry that lower frequencies, such as 100 Hz and lower, tend to be better for removing larger air voids, and that higher frequencies, such as 100 Hz and above, tend to be better at removing smaller air voids. The demising value of 100 Hz between higher and lower frequencies is arbitrarily chosen here, that can vary. The optimal frequencies for consolidating a given concrete placement with these methods may not be known until that specific project—having its own natural periods—is underway, and those values may change during the project; this is why having real time frequency adjustment is beneficial. The wall projects built with this method generally tend to have lower natural periods for the portion of concrete being vibrated, though the concrete is of a much lower slump, than is the case for typical wall or paving applications, so the more beneficial frequencies of vibration will differ from conventional concrete placement methods.

Having multiple simultaneous frequencies operating from different locations creates the consolidation benefits specific to each frequency simultaneously, and also creates a benefit of increased consolidation energy from harmonic beat resulting where the pressure waves from varied frequencies converge supposition energy at regular intervals. For example, there can be two sources of external vibration at different frequencies, and two sources of internal vibration at two other frequencies. At each wave supposition beat, the concrete consolidation effect can be greatly amplified, and the specific location of the wave supposition is also transient, as the vibration sources are all in discrete locations. The resulting energy-focusing effect is a very useful tool for speeding up concrete placement with these methods. To give a simplistic example, if one vibrator is running exactly at 120 Hz and another is running exactly at 180 Hz, then the primary resulting beat frequency is 72 Hz—the frequency at which the two wave systems converge by supposition. This effect allows a combined benefit of having multiple higher frequencies for smaller void removal with a resulting very effective lower frequency, in this case 72 Hz, for an improved initial consolidation effect. Most often the beat frequency would be much lower, as of course the actual primary frequencies would be more prime to each other than this example.

A goal here that diverges from conventional external vibration of formed concrete, is that existing practices have the intention to spread out the vibrational action over as large an area as possible, often by placement of the vibrators onto larger forming members of a conventional wall forming system—to minimize the number of vibrators needed; whereas the present method is the opposite, in that the vibration is intentionally targeted at only a very small area of concrete, and is preferably intensely focused at that small area, and significant vibration action outside of that area needs to be avoided. The area being targeted is right at the concrete while in the process of being placed, and the immediately-adjacent concrete—generally that is co-vibrated with the immediately-placed concrete, in order to create a monolithic casting without effect of cold joints at layers of concrete placement. Vibration applied outside of the targeted area is detrimental to this process, and must be avoided as possible to avoid unwanted slumping of the concrete that is not temporarily confined; vibration of unconfined concrete can jeopardize the stability of the concrete in confinement. Only a portion of concrete that is temporarily confined by the screeding device, and that also has support by confined concrete below the targeted area, where that lower confinement is created by a planar element having isolation from the vibration energy, is a location where the concrete can be vibrated using these rapid vertical build methods—without the risk of surface bulging or partial collapse of the fresh concrete.

FIG. 38

This shows a modified vertical screeding device 200' where two of a diaphragm vibrator system 500 is attached. Further description of the device, not repeated here, can be found on discussion of FIGS. 12 to 15. The modifications described here are made in reference to the device 200, however they apply equally to any of the placement and screeding devices disclosed, such as the rigid placement and screeding device 240, or the controlled screeding attachment 250.

One optional modification for any of the screeding devices is to include a roughened surface on the interior surface of the nozzle, such as nozzle 70 (roughened surface not shown in FIG. 38), for arrangements where the inline mixer 19 or 19' is placed adjacent to the nozzle, without an intervening length of concrete pump hose for continuing the mixing process. The roughened surface provides for sufficient continued intermixing of the injected admixture in that shortened distance, which can be as short as approximately 18 inches (0.5M). The roughened surface can be created by insertion of heavy wire mesh, such as a 1.5 inch (37 mm) square mesh of 10 gage (2.5 mm dia) wire (roughened surface not shown in FIG. 38), to the interior surface or surfaces of the nozzle, and affixed by welding or other attachment method.

The primary purpose of the system 500 is to direct vibrational energy into the concrete by inducing out-of-plane vibrational motion of a diaphragm plate 506, which is of a thickness and corresponding material stiffness to respond to preferred vibration action. This can be a sheet steel in the range of ⅛" (3 mm) thickness, or aluminum plate of a thickness in the range of 3/16" (4.5 mm), or it can be of fiberglass or other carbon composite in the range of ¼" (6 mm) thickness, for a faster vibration response. The panel stiffness and strength choices are a factor of the overall size chosen for the device 200', and particularly the span of that surface between supporting elements. An active non-stick surface, previously disclosed, can be attached to the exterior.

In this case, two of a vibrator motor 502 are securely attached to the diaphragm 506, preferably at a location that is preferably a few inches away from any other hard attachment to the diaphragm, and is preferably at least about 6 inches (150 mm) from a vertical edge. These other hard attachments are ones such as each of an edge member 508, which can be a 1.5" (37 mm)×⅛" (3 mm) wall steel tube section, and the nozzle 70, etc. This allows elastic out-of-plane strain of the diaphragm, and avoids connection failure, such as a weld of the nozzle, etc. The reason for a greater distance to a vertical edge is because the vibration action at the edges is preferably minimized, as explained below. The modified device 200' preferably includes the screed wing panels (224 of FIGS. 14 and 15) not shown here, and these are preferably vibrationally isolated as shown for isolated screed panel 408.

Shown are two of a hydraulically-powered vibrator motor 502, such as is utilized as the vibrating element inside a large inserted vibrator used for concrete consolidation of concrete pavement extrusion machines. The control of the vibration of these hydraulic motors 502 is well understood, by control of the flow of hydraulic fluid through each of a hydraulic line 498, that can be powered by the hydraulic system of the equipment moving the device 200', for example, or by another hydraulic power source. Sophisticated manifold controlling systems for arrays of these vibrators, are developed and manufactured by Minnich Manufacturing Inc, 1444 US-42, Mansfield, OH 44903, also a manufacturer of the type of motors shown. To transmit vibrational forces most efficiently, the motor 502 is very securely attached to diaphragm 506 by an attachment 504 that is of ¼" (6 mm) steel or the like, welded or securely fastened to the diaphragm, and is sized to clamp the cylinder motor 502 tightly. Also, two of a fitting block 520 are sized to provide more tight contact surface to maximize vibrational energy transfer into the diaphragm.

As seen in section view B, the vibrator is positioned to have effect on both the previously placed concrete 4 and the concrete being placed 3. This effect represented by the arc 554 representing the imparted vibrational waves. The zero-slump concrete previously disclosed, while being very sensitive to vibration in terms of liquefaction behavior, the low slump and high energy absorption of the concrete prevents the vibrational energy from traveling very far. This allows for providing a buffer zone that is confined by the isolated panel 408, so that the lower previously placed concrete 4' is not liquefied by vibration. Having been previously vibrated helps that lower concrete to remain stable.

Similarly, the device having its vertical edges configured to be generally non-vibrating, or having extension elements isolated from vibration, helps in not liquefying the fluid concrete at the edge areas, so assisting in the confinement of the fluid concrete where the consolidation is intended, so improving the consolidation process for a vertical surface.

Alternatively the vibrators can be external vibrators such as are utilized with conventional concrete forms, or for conveyance of dry materials in hoppers and silos, etc. These vibrators are meant for direct mount onto a surface, and can be mounted as such here, though for these installations doubler plates may be preferable for disbursing the vibrational force and for preventing damaging the diaphragm. The vibrators can be electrical or pneumatic, with power control or pneumatic control to allow adjustment of the vibrational frequency and amplitude, discussed more below. Vibrators that operate by rotational action will also impart movement components in the plane of the diaphragm. While providing some benefit in terms of avoiding concrete sticking—particularly at lower frequencies, the in-plane oscillations are largely wasted energy in terms of concrete consolidation, and can be detrimental in terms of not avoiding slump outside of the confined area. In any case where utilizing rotating vibrators, the rotational axis is preferably aligned to be vertical, so that vibrational components oscillating in the plane of the device are then largely horizontal, and so have less tendency to travel down to the lower panel 408.

The most efficient diaphragm vibration is where the motions are all normal to the diaphragm, such as is possible with electromagnetic and linear pneumatic vibrators, for example. Also, the linear vibrational action allows more directional control of the vibrational energy to a specific location, while transferring less residual vibration to the lower panel 408, so that a higher vibrational energy can be employed. An example of a linear vibrator is the Vibco pneumatic Piston Vibrator model 55-150S, made by Vibco Vibrators, Inc, 75 Stilson Road, Wyoming, RI 02898, USA, which can operate at up to 75 Hz, a suitable frequency for initial concrete placement consolidation. For a linear vibrator with a much higher frequency range, an example is the Syntron electromagnetic vibrator model VC-20, made by Syntron Material Handling, 2730 Hwy 145 South Saltillo, Mississippi 38866, USA, that normally operates at 60 Hz under single-phase 60 Hz power. This vibration amplitude is controlled by the appropriate power phase-angle controller, such as McMaster-Carr part number 5876K88, of McMaster-Carr, Inc, 200 Aurora Industrial Pkwy, Aurora, OH 44202-8087. The frequency can be adjusted with a single-phase VFD, discussed at FIG. 41 below. The electromagnetic vibrator has the benefit is instantaneous starting and stopping, allowing short, intense bursts of vibration to be employed as needed for consolidation.

As stated before, the vibrational frequency and amplitude can be optimized for more efficient consolidation. Generally, relatively lower frequencies with high amplitude will move material better, while higher frequencies are more efficient at removing air bubbles. This system allows both benefits to be realized. Optimally the vibrator 502 that leads the nozzle 70 (as the screeding device is translated sideways) is vibrating the previously placed concrete 4, and so can be run at a higher frequency, such as higher than 100 Hz, for optimizing removal of remaining air bubbles. The vibrator 502 that is following the nozzle will be vibrating the concrete just being placed 3, and so can be run at a lower frequency, such as lower than 50 Hz, to optimize initial placement consolidation. When screeder 200' later reverses translational direction, the relative vibration frequencies can switch positions for optimal consolidation and void removal in that opposite direction. The optimal consolidation frequency or frequencies depends upon factors such as various material properties of the particular concrete being placed (which is time-dependent), the thickness of the wall being cast, along with the size of the area being vibrated (the natural period), and the available intensity of vibrational energy, etc.

The isolated screed panel 408 is separated from the main panel above by an isolation strip 416, and the attachment at each edge by a connecting member 510, which can be a tube steel section 1.5" (37 mm) square with ⅛" (3 mm) wall. Each of two member connects with a set of isolators such as isolation mount 414 (described above at FIGS. 28 and 29), keeping the outer surface of panel 408 in plane with that of diaphragm 506, but vibrationally isolated.

FIG. 39

This shows a close-up detail of a modified vibrating system 500' where the vibrator attachment is made to a modified diaphragm 506' that is separated from the main structural screed panel 220' of the device 200', except where contact is necessary, such as the edge member 508'. In this case the diaphragm 506' can be thinner material, such a ⅛" (3 mm) or thinner, and a forcing plate 518 can provide stress riser reduction for the vibrator attachment to the thin diaphragm, and a means to connect a set of a guiding machine screw 514, which can slide freely through the other members it attaches through. The system where the guide 514 is aligned with a strengthening bar 516, that can be of 1.5" (37 mm) square×3/16" (5 mm) wall channel, allows more vibrational energy to transfer into the concrete through the more flexible diaphragm 506', with less vibration reaching plate 220', and so less vibration reaching the lower panel 408. The spring 522 and spring 522' provide planar positioning for the diaphragm 506 when the vibrator is at rest, and provide soft limiting stops for maximum vibration amplitude, avoiding damage.

The opening 542 in plate 220' allows it to be isolated from contact with the vibrator 502, and as the vibrator is not attached to the main structure of the screeding device, and so can have motion components in the plane of the device with minimized vibration transfer. Additionally, the vibrator attachment can be one that allows flexibility in the direction of the plane of the device. This geometry allows rotary vibrators to be more appropriate for this method in that less vibration is transferred to the lower panel 408. Three-phase rotary vibrators are very commonly available, as are three-phase variable-frequency power supplies that are powered by single-phase AC. This allows full control of a mechanical vibrator to operate at any most beneficial frequency, with low cost equipment at any jobsite, and the geometry presented allows minimal vibration transfer to the lower panel 408.

A suitable rotary vibrator for this application is a Dayton 3-phase electric rotary vibrator model 1DYL7, normally vibrating at 60 Hz under 60 Hz 3-phase AC. This vibrator can be driven by a 3-phase variable frequency power supply, known as a Variable Frequency Device, such as a Thincol VFD model 15wtqsxd2u which can create a 3-phase signal from 0 Hz to 400 Hz, so that this vibrator can be operated within this wide range above around 20 Hz. The intensity of this vibrator can be mechanically adjusted by adjustment of eccentric weights.

FIG. 40

This shows the most efficient diaphragm vibrating system, where the most energy possible can be the most effectively directed into the concrete from an external vibration source, because the vibration energy is effectively reflected off of the entire system mass. This allows the most control and focus of directed energy, and where it is possible to transmit the least amount of energy outside of where it is beneficial to the concrete placement. Also, this system allows instantaneous starting, stopping, and frequency changing of the vibration, for maximum effectiveness of a strong burst at any moment. This system is similar to a powerful version of a large "vibrational speaker" made to operate at wide range of frequencies, that can be driven by an audio signal generator or more efficiently by a controlled alternating current power source. In this case the AC signal forces relative displacements between the heavier rigid structure of the screeding device—including the equipment supporting it, and the light flexible diaphragm 506'. In effect, the base of the "speaker" is attached to the main structure, and the vibrating part of the "speaker" is the light flexible diaphragm—similar to a speaker diaphragm. With this system, the electromagnetic pulses directly drive motions of the diaphragm from a solid backing, compared to a conventionally attached vibrator that has only its own weight to drive oscillations. With this device, the means of directing the vibrational energy is more effective in vibrational wave transmittal, a lower vibrational energy is required for a given result—providing for less vibration transmitted into the screeding device, and for a given energy input, a more intense amount of energy is possible to be driven into the concrete.

Linear vibrational action is beneficial and preferable for this system, to avoid unwanted in-plane vibration to the screeding device, as the driving force is directly attached to the main structure of the device, it will transmit vibrational components to it. The beneficial out of plane vibrations will also transfer into the device; the effect of these can be minimized by increasing the natural period of the device to avoid a sympathetic response. This can be accomplished by both increasing the device mass and reducing its stiffness, particularly in relation to the diaphragm. For example if sympathetic vibration can be minimized by construction the diaphragm of light tempered steel, such as 10 gage (2.5 mm) high-carbon steel plate, or ⅛" (3 mm) composite carbon-fiber/epoxy, while the device can have primary spanning members, such as the strengthening bar 516 to have its interior filled with lead, for example.

Figure 40:
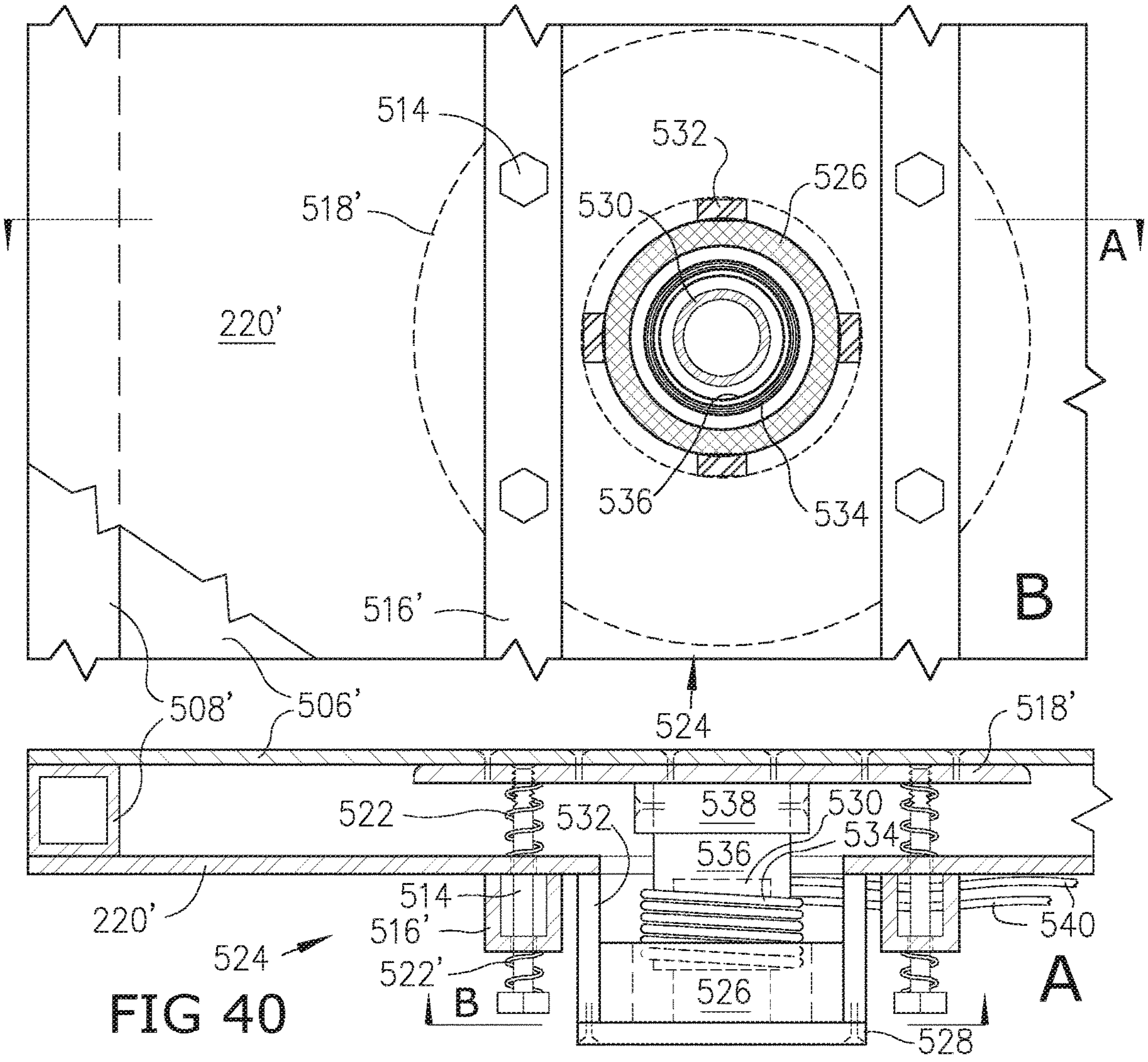
FIGS. 40 A and B shows two views of an electromagnetic diaphragm vibrating system.

The embodiment of the diaphragm driving system 524 shown in FIG. 40 is one of well understood and extensively employed electromagnetic principles that do not need to be reinvented here. An inductor is created with a permanent magnet 526 that is adjacent to or effectively surrounds a copper wire wound coil 534—this is the equivalent of the "voice coil" of a speaker, so that the magnetism developed by pulses of electrical current run through the coil creates an attractive magnetic force that moves the coil cylinder 536, so moving the forcing plate 518' and the diaphragm 506'. Please note that FIG. 40B cuts a section view though the permanent magnet, so one can see that it is a ring magnet. A permanent magnet is not required for this particular mechanism, in that another concentric coil can serve the same purpose—generally always activated while the device is on, such as are systems used for early loudspeakers. The additional energy consumption and any "loss of fidelity" or hum caused by a coil-coil system in this application, are relatively minor concerns in that efficient modified AC power itself, rather than an audio signal, can be the driving power, and this "speaker" need only hold particular frequencies within very crude parameters relative to conventional audible systems. The mechanics of this forced-driving system allow a lower level of AC power to deliver more consolidation of energy into the concrete, and to focus that energy where it is most effective; and this structural efficiency allowing a lower power requirement, provides for less vibrational energy available to be transmitted to the lower panel 408.

Figure 39:
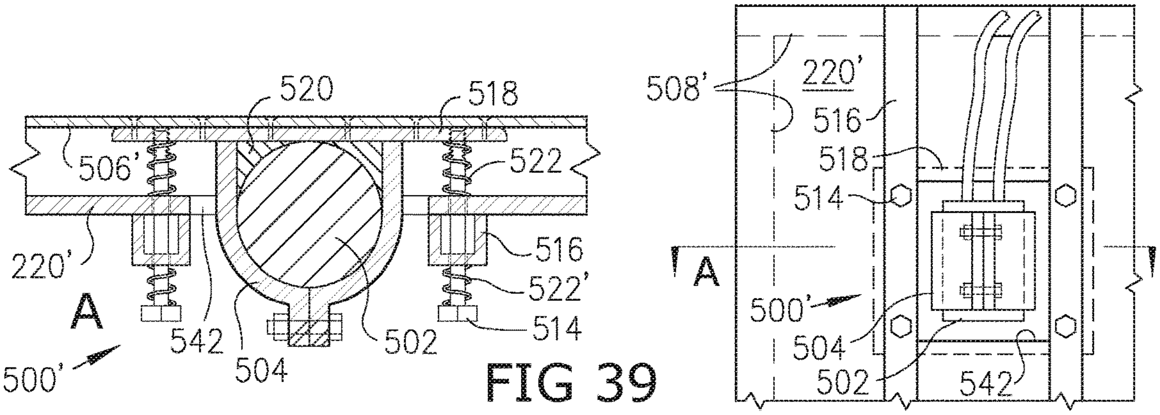
FIG. 39 Including Section A shows detail of a vibrator attached to a flexible diaphragm.

The guides 514 per FIG. 39 are shown here, though they are not essential to this device. The strengthening bars 516', or the equivalent, are necessary for providing a stronger platform for an improved response in the driving force of the diaphragm, and in fact additional structure and mass added to this portion of the plate 220' will provide for more effective driving force for this mechanical vibration system, with less vibrational feedback into the remainder of the screeding device, as discussed above. The more massive the device is built, and the more securely it is held in place by heavy operating equipment, the more intensely the vibrations will be forced into the concrete.

The permanent magnet 526 can be as small as the SKU #M3212R 3"×2"×½" Ring—Neodymium Magnet, by Apex Magnets, 157 RMX Way, Petersburg, WV 26847, USA. Alternatively, the coil driving system and magnet can be the components of a commercially available loudspeaker, such as one with a bass range response spectrum in the range of 20 Hz to 200 Hz, and should be of at least 300 watts RMS power capacity. The loudspeaker components can be repurposed directly for this application, where the voice coil 536 attaches to the forcing plate 518' or directly to the diaphragm 506'. Alternatively, a commercially available electromagnetic vibrator such as that listed above, with appropriate electronic control—such as noted above, can be modified to serve as this forced-driving diaphragm vibrating system 524, where the active part of the vibrator is attached to plate 518', and the reactive part of the vibrator, the connecting base, is attached to the remainder of the device, such as bolting onto the bar 516' or two of the bar 516'.

The energy creating the linear driving force between the screeding device and the diaphragm can alternatively be that made by a pneumatic piston vibrator such as the one noted above, where the mounting of the unit is modified so that the base is attached onto the bar 516' or two of the bar 516', and the piston end, extended as required, is attached to the cylinder receiver 538. This application, where the piston action more efficiently forces movement of the diaphragm, because of having the backing of the remainder of the device and the equipment supporting it, will drive more vibrational energy into the concrete with less air consumption.

FIG. 41

Electromagnetic vibrators, and loudspeakers in particular, need to have controlled AC power in order to operate without current overload. An audio signal generator provides a version of controlled AC power. This control of AC power can be as simple as another variable resistor in series of the same power supply circuit, or this control can be a phase-fired controller that is designed to dose the amount of power to the vibrator by controlling the amount of each AC wave that may pass through. For example, at 90-degree phase control, half of each wave passes though. This is existing technology that can take the solid-state form of a Silicon Controlled Rectifier SCR, also known as a Thyristor, for controlling AC power. These systems control the amount of excitation available for the coil, and so the amplitude of the vibrations. This is all well-developed technology that is constantly improving.

For example, Cleveland Vibrator Co. 4544 Hinckley Industrial Parkway, Cleveland, OH 44109, manufactures "VAF" controllers for their electromagnetic vibrators. The VAF is a variable amplitude and frequency controller mounted in a NEMA-12 enclosure. Amplitude is adjustable from 0% to 100%. The VAF controller can handle a wider range than what the vibrator is designed for. Such a controller can be appropriate for this controlling system.

An amplitude controller can be used in conjunction with the output signal from a VFD, though an issue is that most VFDs have 3-phase output only, and 3-phase is generally not used for electromagnetic vibrators (the induction from 3-phase AC power is a constant force). It is possible to build a 3-phase electromagnetic vibrator by reversing multiple separate concentric windings in order to utilized one of these VFDs. However, Leeson Power Generation Products, 1051 Cheyenne Avenue, Grafton, WI 53024, manufactures a Single-Phase output Variable Frequency Drive, model 175320. At 2.4 A at 110V, this drive can be sufficient to operate the diaphragm driving system 524 if a permanent magnet version is employed, given the system efficiencies and because multiple vibrating devices are preferably used, as discussed. A 220V single-phase VFD is available via Ebay sales, with no manufacture brand name given, only model #HAJ220-E02KW, with various sellers located in Honk Kong. The signal from this VFD can be combined with a phase control device, such as that above, so that the circuit excitation is also managed. More variations on VFDs are becoming available as the technology is evolving, so many more options for this electronic control system will become available.

Figure 41:
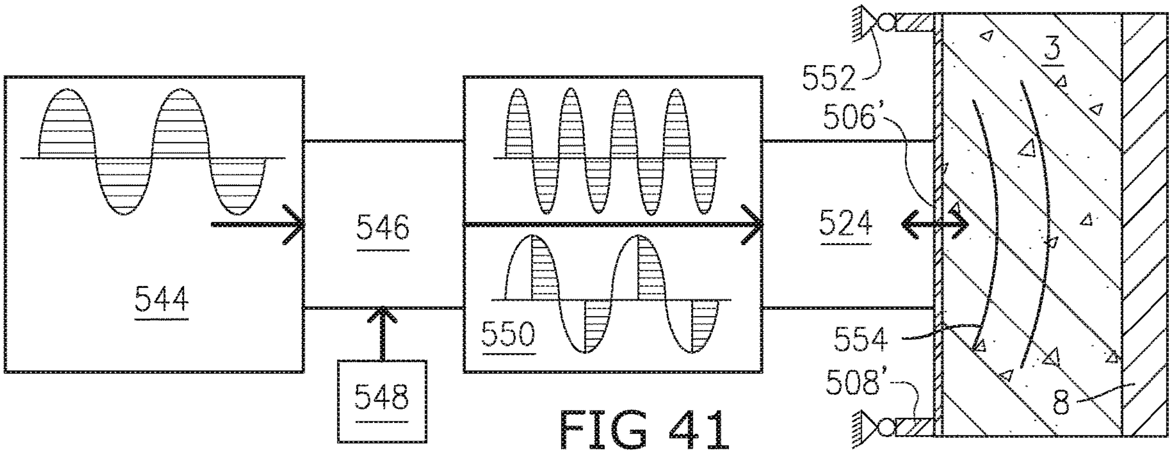
FIG. 41 shows a schematic diagram of an electronic system for controlling a diaphragm vibrator.

The overview of FIG. 41 is as follows: An AC power supply 544 is provided for a power converter 546, that can be controlled by low-voltage controls from a remote input controller 548, so creating a modified AC power 550. Shown are graphical representations of the modified AC power; one, of the frequency being doubled, and another, of the phase angle cut at 90 degrees—allowing half of the available power through. These are just representative examples of AC power modification to control the action of the vibrator 524, where the electrical energy is converted to reciprocal mechanical movement of the diaphragm 506' that is attached at locations such as the edge members 508', with those members fixed to the remainder of the device, represented by a reaction support point 522. The result is controlled energy waves imparted into the fluid concrete backed by the plane 8, which can also be a planar element that is supported and made repositionable by any of the mechanical means disclosed, or it can be a mirror image of this same system on the other side of the concrete being placed.

An aspect of the present invention includes new concrete construction methods that are now possible because of previously-invented methods of inline modification of pumped concrete, and also because of active non-stick surfaces developed for the definition of finished concrete surfaces. These advances allow variations of additive layering, with concrete placed from the side, without the use of a large gantry system.

With this method, horizontal and vertical reinforcing elements, and all required utilities, can be maintained in place before and during the additive layering process, without interference with the concrete placement equipment. This solves a primary problem with usual cementitious additive manufacturing methods, also known as 3D printing, that require the horizontal reinforcement to be placed after the fact, and are totally incompatible with vertical reinforcement, as well as utility conduits, etc. The present methods are termed "additive layering" to distinguish this difference, and also the difference in that a digital model is not required for additive layering, although it can be utilized when beneficial.

In the foregoing specification, the invention has been described with reference to specific embodiments; however, one of ordinary skill in the art appreciates that various modifications and changes can be made without departing from the scope of the present invention as set forth in the claims below. Accordingly, the specification is to be regarded in an illustrative, rather than a restrictive sense, and all such modifications are intended to be included within the scope of the present invention.

Benefits, other advantages, and solutions to problems have been described above with regard to specific embodiments; however, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A system to form a concrete structure, the system comprising:

a conduit having an open end to discharge a flow of a fluid concrete having a rheology allowing placement in a vertical orientation;

a planar element disposed proximate the open end of the conduit so as to contact the fluid concrete to define and smooth a substantially vertical surface of the fluid concrete;

a mechanical arm supporting the conduit and the planar element, the mechanical arm being movable so as to direct and control placement of the fluid concrete to form the substantially vertical surface of the concrete structure from the flow of the fluid concrete;

the system providing a geometry definition, and a finished surface definition of the substantially vertical surface, while operating from a side of the concrete structure, so allowing the system to avoid interference with reinforcement elements of any length prepositioned within the concrete structure, a pump connected with the conduit to pump the fluid concrete through the conduit, so that the planar element defines the finished surface of the concrete structure as the fluid concrete is pumped into place by conveyance through the planar element, the system including at least one of the following:

A. the conduit having a substantially rigid section, the planar element being rigidly attached to the substantially rigid section, the mechanical arm having a grasping mechanism to grasp and hold the substantially rigid section to accomplish movement of the substantially rigid section and the planar element;

B. a position indicating and control system and an array of linear actuators responsive to the control system, each of the linear actuators having a length of travel, the array supporting and articulating the planar element, each actuator having its action controlled by the position indicating and control system, so that the planar element maintains a predefined plane within the length of travel for each actuator, as the mechanical arm is moved for purposes of concrete placement;

C. a position indicating and control system and a combined articulation and translational system to accomplish at least one of a rotational action and a translational action, the combined articulation and translational system having its actions controlled by a position indicating and control system, wherein the position indicating and control system control position and alignment of the planar element to continuously maintain a predefined plane, as the mechanical arm is moved for purposes of concrete placement.

2. The system of claim 1, where movement of the planar element is accomplished by a backhoe, an excavator, a concrete boom truck, or a robot.

3. The system of claim 1, having a position indicating and control system to guide the path of travel of the planar element during the concrete placement, so as to provide the geometry definition and the finished surface definition.

4. The system of claim 1, further comprising at least one of a concrete vibrator.

5. The system of claim 1, wherein the planar surface and the conduit are connected so the fluid concrete flows through a hole in the planar element.

6. A device attached to the end of a conduit, through which is pumped a fluid concrete having a rheology allowing placement in a vertical orientation, the device having a planar face, a mechanical arm being attached to the device in order to direct and control a placement of the fluid concrete, and to simultaneously define a vertically-oriented surface of the concrete with controlled alignment of the planar face, to create a hardened concrete structure, wherein the device, the conduit, and the mechanical arm can all be positioned to a side of the concrete structure, and the fluid concrete placement is made from the same side of the structure where the device expels concrete under pressure into the wall plane from the side, so confining the fluid concrete utilizing the pump line pressure, while defining the plane of the finished surface of that wall, while the concrete is being placed, so that a conventionally-reinforced vertically-oriented concrete structure with a smooth planar surface can be cast in-situ, the device including at least one of the following:

A. a length the conduit which is rigid, with the planar face rigidly attached, the conduit length of a size and strength to serve as a means to grasp onto the device and manipulate it to place and screed the concrete, by manual-control of the mechanical arm having a grasping mechanism, B. an array of a linear actuator, each having a length of travel, the array supporting and articulating the device, each actuator having its action controlled by a position indicating and control system, so that the planar face maintains a predefined plane within the length of travel for each actuator, as the mechanical arm is moved for purposes of concrete placement C. a combined articulation and translational system, including at least one of a rotational action and a translational action, the combined articulation and translational system having its actions controlled by a position indicating and control system, where the position indicating and control system provides a means of control of position and alignment of the planar face, to continuously maintain a predefined plane, as the mechanical arm is moved for purposes of concrete placement.

7. The device of claim 6, where the mechanical arm is that of an excavator, a backhoe, a concrete boom truck, or a robot.

8. The device of claim 6, having a position indicating system that provides guidance for a path of travel.

9. The device of claim 6, including at least one of a concrete vibrator attached to the device.

10. A reinforced concrete wall construction method whereby a fluid concrete has a rheology modified to hold a vertical shape without form support, the fluid concrete being pumped from a side of a vertical plane containing reinforcement elements, and the fluid concrete being vibrated to assist flow about the reinforcement elements, while a finished surface is defined for the subsequently hardened concrete, wherein both a process of concrete placement and surface definition are achieved simultaneously by a use of a single device mechanically guided along a path of travel that is predetermined, so avoiding a need for forms to define the concrete geometry, or a pneumatic placement means.

11. The method of claim 10, where the means of movement of the device is accomplished by a backhoe, an excavator, a concrete boom truck, or a robot.

12. The method of claim 10, including a position indicating system as a means of guiding the path of travel of the device during the concrete placement, so providing the surface definition of the wall.

13. The method of claim 10, where a position indicating system provides a means of control for the path of travel and alignment of the device, utilizing a set of actuators automatically responding to the position indicating system, so providing the surface definition of the wall.

14. The method of claim 13, utilizing a robot having at least 3 axes of movement, as a means of controlling the path of travel, the system also providing the additional rotational and translational axes required for alignment of the device.

15. The method of claim 13, where the means of control is provided by a laser guidance system.

16. The method of claim 13, where the means of control is provided by a GPS or GNSS or inertial guidance system.

17. The method of claim 13, where the means of control is provided by a digital model.

18. A system for constructing of a structure cast of concrete, the structure meeting generally accepted construction standards for reinforced concrete structures, the structure having a vertically oriented surface, the system including:

a means to pump concrete though a pressurized conduit, a means to modify the concrete within the pressurized conduit so creating a modified fluid concrete having a rheology to hold a vertical shape without confinement unless vibrated, a means of utilizing a planar element to create a temporarily confined space, the planar element aligned with the vertically oriented surface, the temporarily confined space one of many that will become the structure, a means of pumping the modified fluid concrete into the temporarily confined space, a means of vibrating the modified fluid concrete within the temporarily confined space, so that the modified fluid concrete will temporarily liquefy so that the modified fluid concrete is capable of flowing about any prepositioned reinforcing elements that may be present in the temporarily confined space and to allow consolidation as required to become part of the concrete structure, a means of moving the planar element away from the temporarily confined space, then to a new location to create a new temporarily confined space, before repeating the process, then repeating this process as required to provide completion of the structure.

19. The system of claim 18, where at least one vibrator is attached to the planar element for purposes of vibrating the modified fluid concrete.

20. The system of claim 18, where at least one of a vibrator is attached to the planar element for purposes of vibrating the modified fluid concrete, and the vibrator has a plunging action into the modified fluid concrete that is remotely controlled.

* * * * *